(12) United States Patent
Bourgeois et al.

(10) Patent No.: US 11,019,835 B2
(45) Date of Patent: *Jun. 1, 2021

(54) METHOD FOR EXTRACTING PEA PROTEINS

(71) Applicant: COSUCRA GROUPE WARCOING S.A., Warcoing (BE)

(72) Inventors: Audrey Bourgeois, Epernay (FR); Anthony Gramain, Bruille-Saint-Amand (FR); Mary Descamps, Havinnes (BE)

(73) Assignee: COSUCRA GROUPE WARCOING S.A., Warcoing (BE)

(*) Notice: Subject to any disclaimer, the term of this patent is extended or adjusted under 35 U.S.C. 154(b) by 0 days.

This patent is subject to a terminal disclaimer.

(21) Appl. No.: 15/035,298

(22) PCT Filed: Nov. 18, 2014

(86) PCT No.: PCT/EP2014/074940
§ 371 (c)(1),
(2) Date: May 9, 2016

(87) PCT Pub. No.: WO2015/071499
PCT Pub. Date: May 21, 2015

(65) Prior Publication Data
US 2016/0316785 A1 Nov. 3, 2016

(30) Foreign Application Priority Data

Nov. 18, 2013 (EP) .................................. 13193383
Nov. 18, 2013 (EP) .................................. 13193388
Mar. 13, 2014 (BE) .................................. 2014/0174

(51) Int. Cl.
*A23J 1/14* (2006.01)
*A23J 3/14* (2006.01)

(52) U.S. Cl.
CPC .............. *A23J 1/148* (2013.01); *A23J 1/14* (2013.01); *A23J 3/14* (2013.01); *A23Y 2220/03* (2013.01); *A23Y 2220/35* (2013.01)

(58) Field of Classification Search
CPC ................................... A23J 1/148; A23J 3/14
USPC ............................................................ 426/46
See application file for complete search history.

(56) References Cited

U.S. PATENT DOCUMENTS

| | | | |
|---|---|---|---|
| 4,060,203 A | 11/1977 | Edwards et al. | |
| 4,766,204 A | 8/1988 | Nickel | |
| 8,124,162 B2* | 2/2012 | Passe | A23J 1/14 426/507 |
| 2004/0091600 A1* | 5/2004 | Salome | C08B 30/04 426/622 |
| 2008/0226810 A1* | 9/2008 | Passe | A23J 1/14 426/656 |
| 2008/0226811 A1 | 9/2008 | Boursier et al. | |
| 2010/0063254 A1 | 3/2010 | Lotz et al. | |
| 2013/0017310 A1* | 1/2013 | Dhalleine | A23J 3/14 426/656 |

FOREIGN PATENT DOCUMENTS

| | | |
|---|---|---|
| CN | 102250201 A | 11/2011 |
| FR | 2196754 A1 | 3/1974 |
| FR | 2 889 416 A1 | 2/2007 |
| FR | 2 889 417 A1 | 2/2007 |
| GB | 1569339 A | 6/1980 |
| WO | 2008049385 A1 | 5/2008 |
| WO | 2010022702 A1 | 3/2010 |
| WO | 2011137524 A1 | 11/2011 |
| WO | 2014008578 A1 | 1/2014 |
| WO | 2014068226 A1 | 5/2014 |
| WO | 2014138875 A1 | 9/2014 |

OTHER PUBLICATIONS

Swanson, B. G. JAOCS, 67: 276-280. (1990) (Year: 1990).*
Granato, T. M. et al. J. Agric. Food Chem. 58: 11969-11976 (2010) (Year: 2010).*
PCT International Search Report and Written Opinion dated Jan. 26, 2015 for PCT International Patent Application No. PCT/EP2014/074940, 12 pages.
Camacho L M et al., entitled "Mejoramieto nutricional de legumbres de consumo habitual fermentado por cultivos del grano lactobacilus," vol. 16, Jan. 1, 1991, pp. 5-11.
Chapter 4: Fermentation of Grain Legumes, Seeds and Nuts in Latin America and the Caribbean ED—Deshpande; S S, Fermented Grain Legumes, Deeds and Nuts: A global perspective (Book Series: FAO Agricultural Services Bulletin), vol. 142, Jan. 1, 2000, pp. 99-105.
Schindler S et al., entitled "Improvement of the Aroma of Pea (*Pisum sativum*) Protein Extracts by Lactic Acid Fermentation," Food Biotechnology, vol. 26, No. 1, Jan. 1, 2012, pp. 58-74.
Khattab R Y et al., entitled "Nutritional quality of legume seeds as affected by some physical treatments, Part 1: Protein quality evaluation," LWT—Food Science and Technology, vol. 42, No. 6, Jul. 1, 2009, pp. 1107-1112.
Third Party Observations submitted to the European Patent Office in connection with EP 14809775.1 on Jan. 5, 2018.
Third Party Observations submitted to the European Patent Office in connection with EP 14815249.9 on Jan. 8, 2018.

(Continued)

*Primary Examiner* — Hamid R Badr
(74) *Attorney, Agent, or Firm* — Amster, Rothstein & Ebenstein LLP

(57) ABSTRACT

The present invention relates to a method for extracting and purifying pea proteins, comprising the steps of (a) providing an aqueous composition comprising pea proteins; (b) isolating said pea proteins from said aqueous composition comprising pea proteins; (c) obtaining said isolated pea proteins as an aqueous slurry having a pH ranging from 4.0 to 5.8; and (d) subjecting said aqueous slurry having a pH ranging from 4.0 to 5.8 to a temperature of at least 75° C. Also described herein are pea protein compositions and are food or feed products comprising said pea protein compositions.

13 Claims, 13 Drawing Sheets

(56) References Cited

OTHER PUBLICATIONS

Frederikson et al., Production Process for High-Quality Pea-Protein Isolate with Low Content of Oligosaccharides and Phytate, J. Agric. Food Chem., 2001, 49, 1208-1212.
Gibson et al., Functional Foods, Woodhead Publishing Limited, 2001, 9.2 "Improving pea protein," p. 213.
Sanni et al., "Production of α-galactosidase by Lactobacillus plantarum isolated from diverse sources," J. Basic Microbiol., 35, (1995), 6, 427-432.
Leblanc et al., "Reduction of α-galactooligosaccharides in soyamilk by Lactobacillus fermentum CRL 722: in vitro and in vivo evaluation of fermented souamile," J. Applied Microbiology 2004, 97, 876-881.
Notice of Opposition against European Patent No. EP 3 071 045 filed by opponent Roquette Frères dated Dec. 28, 2020.
Notice of Opposition against European Patent No. EP 3 071 045 filed by opponent Cargill, Incorporated dated Jan. 11, 2021.
Taherian et al., "Comparative Study of Functional Properties of Commercial and Membrane Processed Yellow Pea Protein Isolates," Food Research International, vol. 44, 2011, pp. 2505-2514.
Sumner et al., "Production and Evaluation of Pea Protein Isolate," Journal of Food Science, vol. 46, 1981, pp. 364-372.
Roquette Frères—Invoice dated May 24, 2013 for Nutralys Pea CA85 EXP, Order No. 20060510, Batch W094H.
Roquette Frères—Delivery Note, delivery date May 24, 2013, for Nutralys Pea CA85 EXP, Order No. 20060510.
Roquette Frères—Analysis Report for Nutralys Pea CA85 EXP, Batches W094H and 172S, analysis carried out in Oct. 2013.
Roquette Frères—Report of Testing, Solubility and Function of pH, 3 pages.
Definition of "slurry," The American Heritage Dictionary of the English Language, 4th edition, copyright 2000, Houghton Mifflin Company, p. 1,640.
Küppers, "The Reference Protein Determination Methods Kjeldahl and Dumas in Comparison," by Gerhardt Analytical Systems, C. Gerhardt GmbH & Co. KG, 1 p.
"Nitrogen Solubility Index (NSI)—Official Method Ba 11-65," AOCS, revised 2017, American Oil Chemists' Society, page 1.
Owusu-Ansah et al., "Pea Proteins: A Review of Chemistry, Technology of Production, and Utilization," Food Reviews International, vol. 7, No. 1, 1991, pp. 103-134.
Thesis of Uken Sukaeni Sanusi Soetrisno for the degree of Doctor of Philosophy in Nutrition and Food Management presented on Sep. 12, 1991, Title: "Characterization of Yellow Pea (Pisum sativum L. Miranda) Proteins and the Proteinate Functional Properties.".
Thomspon, "Preparation and Evaluation of Mung Bean Protein Isolates," Journal of Food Science, vol. 42, 1977, pp. 202-206.
Soetrisno et al., "Functional Properties of Acid and Salt Extracted Proteins of Yellow Peas (Pisum sativum L. Miranda)," J. Agric. Food Chem., vol. 40, 1992, pp. 975-980.
"Nitrogen Solubility Index," AACC International Method 46-23.01, first approval Apr. 25, 1965, reapproval Nov. 3, 1999, pp. 1-2.
Thesis of Shaojun Tian for the degree of Doctor of Philosophy presented in Dec. 1998, Title: "The Isolation, Modification and Evaluation of Field Pea Proteins and Their Applications in Foods.".
Park, S.J. et al. Relationship between proportion and composition of albumins, and in vitro protein digestibility of raw and cooked peas seeds (Pisum sativum L.). J Sci Food Agric. 90 (10): 1719-25, 2010. Abstract only.
Rao, R. et al. Variation in polypeptides of the major albumin protein of pea (Pisum sativum L.): Inheritance and molecular analysis. Mol Gen Genet. 219: 277-281, 1989.
Tao, A. et al. Variation in Yield, Starch, and Protein of Dry Pea Grown across Montana. Agron. J. 109: 1491-1501, 2017.

* cited by examiner

METHOD FOR EXTRACTING PEA PROTEINS

CROSS-REFERENCE TO RELATED APPLICATIONS

This application is a U.S. national stage entry under 35 U.S.C. § 371 of PCT International Patent Application No. PCT/EP2014/074940, filed Nov. 18, 2014, which claims priority to European Patent Application No. 13193388.9, filed Nov. 18, 2013, European Patent Application No. 13193383.0, filed Nov. 18, 2013, and Belgian Patent Application No. 2014/0174, filed Mar. 13, 2014, the contents of which are incorporated herein by reference in their entirety.

FIELD OF THE INVENTION

The present invention relates to methods for extracting and purifying proteins. In particular, the present invention relates to extraction of pea protein. The invention further relates to pea proteins obtainable by the above methods, as well as food or feed products containing such pea proteins. The invention also relates to the use of such pea proteins in food or feed industry.

BACKGROUND OF THE INVENTION

Protein isolates from plant origin represent a valuable alternative or supplement to animal proteins in foods or feeds. For instance in foods, addition of plant proteins can effectively replace animal proteins, often at lower cost. In addition, many products traditionally containing animal proteins, in particular dairy products, may be a major cause of food allergies.

Leguminosae are notable in that most of them have symbiotic nitrogen-fixing bacteria in structures called root nodules. This arrangement means that the root nodules are sources of nitrogen for leguminosae, making them relatively rich in plant proteins. All proteins contain nitrogenous amino acids. Nitrogen is therefore a necessary ingredient in the production of proteins. Hence, leguminosae are among the best sources of plant protein. As leguminosae, such as peas (*Pisum sativum*), besides having a high protein content, are readily available and have a particularly well balanced amino acid composition, these represent a protein source which is a valuable alternative for animal proteins.

Major challenges in providing plant proteins revolve around protein composition and purity, and include aspects relating to for instance extraction, fractionation, and pre- and post-isolation treatments. By the time the plant protein is isolated and available in a more or less pure form, all prior manipulations have a large impact on the quality of the isolated plant protein. For instance, the type and quantity of impurities in protein isolates or extracts determine its final value. Such impurities include for instance carbohydrates. While in general carbohydrates are unwanted impurities in the final protein isolate, some other impurities, such as vitamins or minerals may not per definition be undesirable, or may even be beneficial for nutritional and/or physico-chemical aspects of the protein isolate. In addition to impacting on the final composition of the protein isolates or extracts, the extraction and/or purification process may dramatically impact on the physicochemical or functional properties of the protein isolate. In particular protein solubility, viscosity, emulsifying capacity, color, taste, or smell are heavily influenced by the used techniques. As can be appreciated from the above, obtaining a high quality protein isolate having specific desired properties can be cumbersome, and often involves multiple expensive and/or time consuming manipulations. In view hereof, there is still a need to improve protein isolation from plants, in particular leguminosae, such as pea.

It is accordingly one of the objects of the present invention to overcome or ameliorate at least one of the disadvantages of the prior art, or to provide a useful alternative.

SUMMARY OF THE INVENTION

According to a first aspect of the present invention, a method for extracting pea proteins is provided. The method for extracting pea proteins comprises the steps of:
(a) providing an aqueous composition comprising pea proteins;
(b) isolating said pea proteins from said aqueous composition comprising pea proteins;
(c) obtaining said isolated pea proteins as an aqueous slurry having a pH ranging from 4.0 to 5.8;
(d) subjecting said aqueous slurry having a pH ranging from 4.0 to 5.8 to a temperature of at least 75° C.

According an embodiment of said method, pea protein extraction involves providing pea proteins which are subjected to isoelectric precipitation followed by heat treatment of the protein precipitate.

According to a second aspect of the present invention, pea proteins are provided which are obtainable or obtained by the method according to the first aspect of the invention.

According to a third aspect of the present invention, a pea protein composition is provided, comprising at least 60 wt % of protein based on the total dry matter of the composition, wherein said pea protein composition has a nitrogen solubility index at pH 7.0 of at most 15%, as measured on a aqueous composition comprising 3 wt % of said pea protein composition based on the total weight of the aqueous composition.

According to a fourth aspect of the present invention, an edible composition is provided, preferably a food or feed product, comprising the pea proteins according to the second aspect of the invention, or pea protein composition according to the third aspect of the invention, or pea proteins obtained by the method according to the first aspect of the invention.

In a fifth aspect, the present invention provides the use of pea proteins according to the second aspect of the invention, or pea protein composition according to the third aspect of the invention, or pea proteins obtained by the method according to the first aspect of the invention in food or feed products, preferably, in bakery and confectionary food products.

In a sixth aspect, the present invention provides the use of pea proteins according to the second aspect of the invention, or pea protein composition according to the third aspect of the invention, or pea proteins obtained by the method according to the first aspect of the invention for clarifying beverages or drinks, preferably wine or fruit juices.

The present inventors have surprisingly found that pea proteins having particular functional, physicochemical and organoleptic characteristics can be obtained when an aqueous composition comprising pea proteins is subjected to isolation steps such as protein precipitation, after which the isolated proteins are subjected to heat treatment.

In particular, it has unexpectedly been found that the methods according to the invention as described herein allow to obtain pea proteins, pea protein compositions, or pea protein extracts or concentrates which have among others lower ash content, higher density (both bulk and tapped), better flowability, better wettability, lower solubility, lower viscosity, and lower gel strength, compared to pea protein extracts which are not obtained according to the methods of the invention as described herein.

The pea protein compositions of the invention have low water affinity which is interesting in applications with low water availability.

The specific characteristics of the pea proteins and pea protein compositions according to the invention as described herein in particular make such pea proteins and pea protein compositions particularly suitable for use in the food or feed industry, in particular in bakery or confectionary food products, such as biscuits, breads, waffles, cakes, fudges, extruded cereals, and bars, etc. It has surprisingly been found that the pea proteins and pea protein compositions according to the invention as described herein can be used in the above bakery and confectionary products and allow for less water to be added during the preparation of these food products, while maintaining or even improving the quality (such as texture or taste) or shelf-life of such food products and without compromising workability of for instance the dough used to prepare the bakery products. Another advantage of using less water in the preparation of in particular bakery food products is that evaporation of water during baking of such food products is facilitated, which not only is more cost-effective, but also beneficially affects the overall quality of the (baked) food products. Also the conservation time of the food products containing pea proteins and pea protein compositions according to the invention as described herein can be prolonged. The pea proteins and pea protein compositions as described herein according to the invention are also particularly suitable for replacing for instance animal proteins, such as milk proteins in food products, but also for replacing other vegetable proteins, in particular allergenic vegetable proteins such at wheat protein, in food products. For instance, the pea proteins and pea protein compositions according to the invention as described herein may be used to replace partially or completely milk proteins in confectionery products, such as for instance fudge, or in fudge bars, for which it has surprisingly been observed that a softer texture can be obtained with the proteins according to the invention.

It has further unexpectedly been found that the pea proteins and pea protein compositions according to the invention as described herein are particularly suitable for use in clarification or fining of liquids, for instance beverages or drinks, such as wine, beer, or fruit juices. Without wishing to be bound by theory, it is hypothesized that the particularly low solubility of the pea proteins and pea protein compositions according to the invention as described herein may be responsible for the clarifying or fining capacity of the proteins, in particular in connection with reducing the turbidity of the liquids.

The independent and dependent claims set out particular and preferred features of the invention. Features from the dependent claims may be combined with features of the independent or other dependent claims as appropriate. The appended claims are hereby also explicitly included by reference in the description.

DETAILED DESCRIPTION OF THE INVENTION

Figure 1:
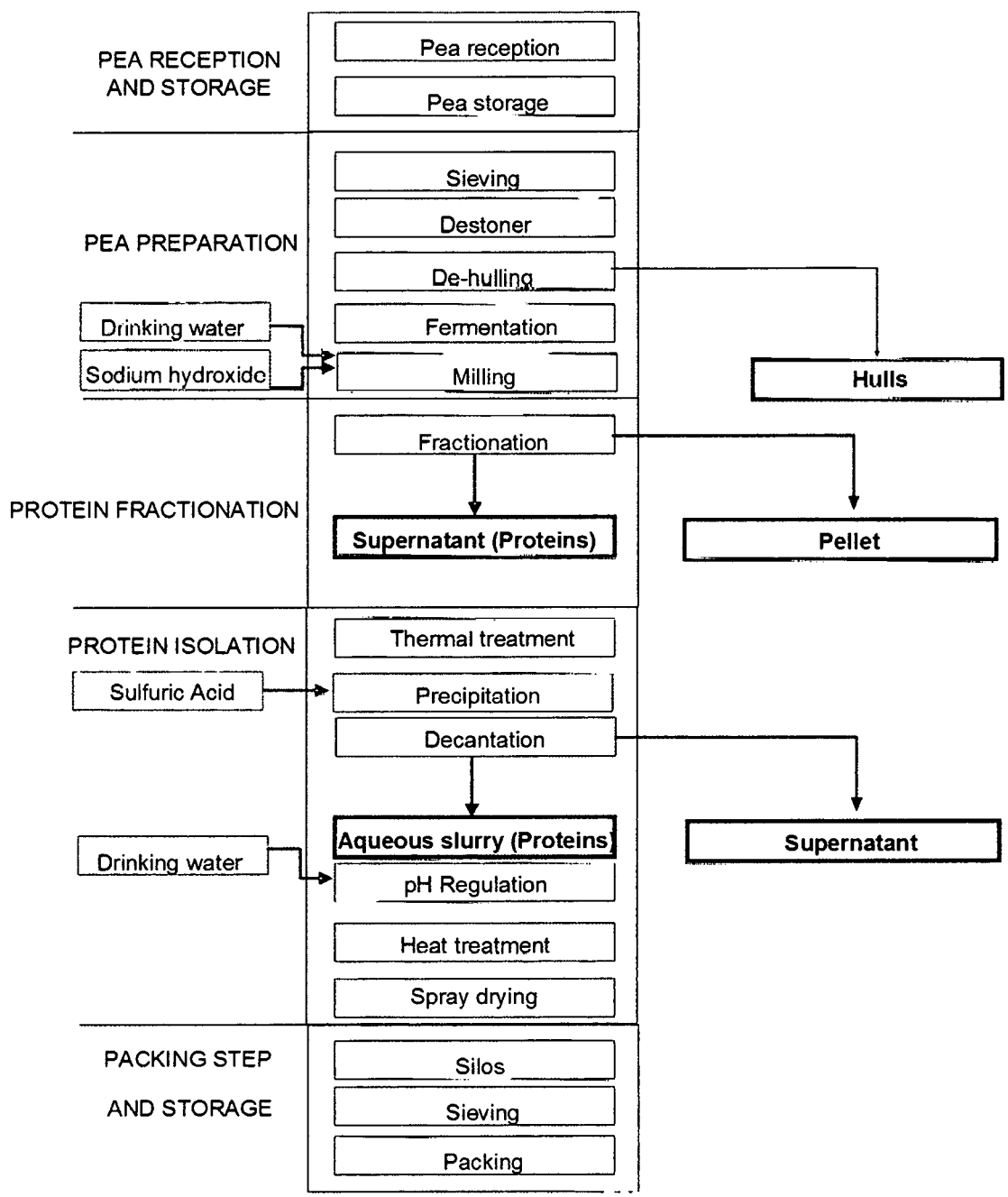
FIG. 1 schematically represents an extraction process according to an embodiment of the invention.

Before the present method of the invention is described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of", as well as the terms "consisting essentially of", "consists essentially" and "consists essentially of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−20% or less, preferably +/−10% or less, more preferably +/−5% or less, and still more preferably +/−1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, 24, 25, 26 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the following detailed description of the invention, reference is made to the accompanying drawings that form a part hereof, and in which are shown by way of illustration only of specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Hereto, the present invention is in particular captured by any one or any combination of one or more of the below aspects and embodiments and numbered statements 1 to 68.

1. A method for extracting pea proteins, comprising the steps of:
   (a) providing an aqueous composition comprising pea proteins;
   (b) isolating said pea proteins from said aqueous composition comprising pea proteins, preferably using precipitation, flocculation, filtration, and/or chromatography;
   (c) obtaining said isolated pea proteins as an aqueous slurry having a pH ranging from 4.0 to 5.8;
   (d) subjecting said aqueous slurry having a pH ranging from 4.0 to 5.8 to a temperature of at least 75° C.

Preferably, the aqueous slurry comprising pea proteins in step (c) has a dry matter of at most 45%, preferably at most 40%, preferably at most 35%, preferably at most 30%, preferably at most 25%, and in an embodiment the dry matter may be adjusted to this extent by dilution with water.

2. The method according to statement 1, wherein step (d) comprises subjecting said aqueous slurry to a heat treatment at a temperature ranging from 75° C. to 210° C., preferably ranging from 85° C. to 160° C., for example from 90° C. to 150° C.

3. The method according to statement 1 or 2, wherein step (d) comprises subjecting said aqueous slurry to a heat treatment for at least 0.01 second, preferably for a time ranging from 0.01 second to 20 minutes, preferably ranging from 10 seconds to 10 minutes.

4. The method according to any one of statements 1 to 3, wherein step (d) comprises subjecting said aqueous slurry to a heat treatment at a temperature ranging from 115° C. to 210° C. for a time ranging from 15 s to 0.01 s; at a temperature ranging from 95° C. to 115° C. for a time ranging from 5 min to 15 s; at a temperature ranging from 75° C. to 95° C. for a time ranging from 15 min to 5 min; at a temperature ranging from 75° C. to 110° C. for a time ranging from 10 min to 2 min; at a temperature ranging from 80° C. to 100° C. for a time ranging from 8 min to 5 min; or at a temperature ranging from 130° C. to 150° C. for a time ranging from 8 s to 1 s.

5. The method according to any one of statements 1 to 4, wherein the time of subjecting said aqueous slurry having a pH ranging from 4.0 to 5.8 to a temperature of at least 75° C. in step (d) decreases when the temperature increases.

6. The method according to any one of statements 1 to 5, wherein said step (b) comprises concentrating said pea proteins.

7. The method according to any one of statements 1 to 6, wherein said step (b) comprises at least one of precipitation, flocculation, filtration, and/or chromatography step.

8. The method according to any one of statements 1 to 7, wherein step (b) comprises isoelectric precipitation.
9. The method according to any one of statements 1 to 8, wherein step (b) comprises adjusting the pH of said aqueous composition comprising pea proteins to a value ranging from 4.0 to 5.8, preferably ranging from 4.5 to 5.5.
10. The method according to any one of statements 1 to 9, wherein step (c) comprises adjusting or maintaining the pH of the aqueous slurry to range from 4.0 to 5.8.
11. The method according to any one of statements 1 to 10, wherein said aqueous composition comprising pea proteins in step (a) has a pH of at least 6.0, preferably ranging from 6.0 to 9.0, preferably ranging from 6.5 to 8.5.
12. The method according to any one of statements 1 to 11, wherein the pH of said aqueous composition comprising pea proteins in step (a) is adjusted to at least 6.0, preferably ranging from 6.0 to 9.0, preferably ranging from 6.5 to 8.5.
13. The method according to any one of statements 1 to 12, wherein prior to step (a) an aqueous composition comprising peas, preferably dehulled peas, is subjected to fermentation, preferably in the presence of lactic acid bacteria.
14. The method according to statement 13, wherein said fermentation is performed in the presence of one or more *Lactobacillus* sp.
15. The method according to any one of statements 1 to 14, wherein prior to or during step (b) said aqueous composition comprising pea proteins, or said pea proteins are subjected to a heat treatment, preferably subjected to a temperature of at least 30° C., for example of at least 40° C., for example of at most 80° C., for example of at least 50° C. and at most 80° C., for example of at least 53° C. and at most 78° C., for example of at least 54° C. and of at most 75° C.
16. The method according to any one of statements 1 to 15, wherein prior to or during step (b) said aqueous composition comprising pea proteins, or said pea proteins are subjected to pasteurization.
17. The method according to any one of statements 1 to 16, further comprising the step of drying said aqueous slurry after step (d), preferably spray drying, preferably obtaining pea protein composition having a pH ranging from 4.0 to 5.8, as measured at room temperature on 10 g of pea protein composition suspended in 90 g of water
18. Pea proteins obtainable by the method according to any one of statements 1 to 17.
19. Pea protein composition, comprising at least 60 wt % of protein based on the total dry matter of the composition, wherein said pea protein composition has a nitrogen solubility index (NSI) at pH 7.0 of at most 15%, as measured on a aqueous composition comprising 3 wt % of said pea protein composition based on the total weight of the aqueous composition, and preferably a NSI of at most 11%, preferably at most 10%, preferably at most 9%, preferably at most 8%. Preferably, the pea protein composition has a dry matter of at least 90% based on the total weight of the composition.

The nitrogen content (atomic wt. %) of select samples was determined using a LECO analyzer. The technique used was the classical Dumas method, which uses thermal conductivity detection (TCD): Weighed samples are combusted in oxygen at 1200° C. The combustion products (including $N_2$ and $NO_x$) are swept with a helium carrier gas through combustion catalysts, scrubbers, and through a tube filled with reduced copper. The copper removes excess oxygen and reduces $NO_x$ to $N_2$. The $N_2$ is then measured with TCD.

20. Pea protein composition according to statement 19, wherein said composition has a pH ranging from 4.0 to 5.8, as measured at room temperature on 10 g of pea protein composition suspended in 90 g of water.
21. An edible composition, preferably a food or feed product, comprising the pea proteins according to statement 18, or the pea protein compositions according to any one of statements 19 or 20.
22. Use of the pea proteins according to statement 18, or the pea protein compositions according to any one of statements 19 or 20, in food or feed products, preferably, in bakery food products and in confectionary food products, such as biscuits, breads, waffles, cakes, fudges, extruded cereals, and bars, etc.
23. Use of the pea proteins according to statement 18, or the pea protein compositions according to any one of statements 19 or 20, for clarifying drinks and/or beverages, preferably wine, fruit juice, beer.
24. The method according to statement 13 or 14, wherein after said fermentation, the peas are milled.
25. The method according to any one of statement 1 to 17, and 24, wherein prior to step (a) said method comprises the steps of:
    providing peas, preferably dehulled peas,
    optionally milling said peas; and
    hydrating said peas, or said optionally milled peas;
26. The method according to any one of statements 1 to 17, 24 and 25, wherein prior to step (a) said method comprises the steps of:
    (a1) subjecting an aqueous composition comprising peas to fermentation, preferably in the presence of one or more lactic acid bacteria;
    (b1) milling said peas; thereby obtaining milled peas;
    (c1) fractinnating said milled peas so as to obtain at least one protein comprising fraction also referred as aqueous composition comprising pea proteins.
27. The method according to any one of statements 13, 14, 24, or 26, wherein said peas in stop (a1) are subjected to fermentation until the pH in said peas is at most 5.5, preferably at most 5.0, more preferably ranging from pH 3.5 to pH 5.0, as measured at room temperature on 1 g of said peas which have been milled and then suspended in 9 g of water.
28. The method according to any one of statements 13, 14, 24, or 26 and 27, wherein said peas in step (a1) are subjected to fermentation until the pH in said peas is reduced by at least 1 pH unit, preferably by at least 1.5 pH unit, as measured at room temperature on 1 g of said peas which have been milled and then suspended in 9 g of water.
29. The method according to any one of statements 13, 14, 24, or 26 to 28, wherein step (a1) comprises adding dry peas and/or dehulled peas to an aqueous solution, preferably adding dry peas having a dry matter content ranging from 80% to 95% based on the total weight of the dry peas.
30. The method according to any one of statements 13, 14, 24, or 26 to 29, wherein said peas after step (a1) and before step (b1) have a dry matter content ranging from 35% to 60% based on the total weight of the peas.
31. The method according to any one of statements 13, 14, 24, or 26 to 30, wherein step (a1) comprises fermenting said peas until they have a dry matter content ranging from 35% to 60% based on the total weight of the peas.

32. The method according to any one of statements 13, 14, 24, or 26 to 31, wherein said peas in step (a1) are subjected to fermentation for at least 3 h, preferably for at least 3 h and at most 24 h.
33. The method according to any one of statements 13, 14, 24, or 26 to 32, wherein said peas in step (a1) are subjected to fermentation at a temperature ranging from 30° C. to 50° C., preferably ranging from 35° C. to 45° C.
34. The method according to any one of statements 13, 14, 24, or 26 to 33, wherein step (a1) comprises fermenting said peas in the presence of lactic acid bacteria, preferably in the presence of one or more *Lactobacillus* sp.
35. The method according to any one of statements 13, 14, 24, or 26 to 34, wherein said peas in step (a1) are subjected to fermentation in the presence of at least $10^2$ cfu to at most $10^{10}$ cfu of lactic acid bacteria per ml of said aqueous composition comprising peas.
36. The method according to any one of statements 13, 14, 24, or 26 to 35, wherein fractionating said milled peas in step (c1) comprises separating at least part of the proteins comprised in the peas from the rest of the pea, preferably in a fraction comprising at least 50 wt % of protein based on the total dry matter of said fraction.
37. The method according to any one of statements 26 to 36, wherein fractionating said milled peas in step (c1) comprises adjusting the pH of the milled peas to a pH of at least 6, preferably at least 7, most preferably a pH of at least 8 and of at most 9. This pH adjustment can be performed using any suitable base, such as sodium hydroxide, potassium hydroxide, calcium hydroxide. Preferably, this pH adjustment is performed on an aqueous composition comprising milled peas having a dry matter of at most 15%, preferably at most 40%, preferably at most 35%, preferably at most 30%, preferably at most 25%. In an embodiment, the dry matter content of the milled peas is adjusted to the above cited dry matter content by addition of water accordingly.
38. The method according to any one of statements 26 to 37, wherein fractionating said milled peas in step (c1) comprises subjecting said milled peas to one or more separation steps, preferably one or more decantation steps, preferably one or more centrifugal decantation steps.
39. The method according to any one of statements 13, 14, 24, or 26 to 38, wherein step (a1) comprises contacting dehulled peas with an aqueous solution.
40. The method according to any one of statements 13, 14, 24, or 26 to 39, wherein step (a1) comprises contacting dry dehulled peas with an aqueous solution, preferably dry dehulled peas having a dry matter content ranging from 80% to 95% based on total weight of the dry dehulled pea.
41. The method according to any one of statements 13, 14, 24, or 26 to 40, wherein step (a1) comprises fermenting said peas until they have a dry matter content ranging from 40% to 60% based on the total weight of the peas.
42. The method according to any one of statements 13, 14, 24, or 26 to 41, wherein said peas after step (a1) and before step (b1) have a dry matter content ranging from 40% to 50% based on the total weight of the peas.
43. The method according to any one of statements 13, 14, 24, or 26 to 42, wherein before, during and/or after the milling step (b1) an aqueous solution is added, preferably water, preferably such as to obtain an aqueous composition comprising the milled peas, said composition comprising from 15% to 35% dry matter based on the total weight of the composition, preferably comprising from 15% to 35%, preferably from 18% to 33%, for example from 20% to 30%, such as at least 20%, for example at least 21%, for example at least 22%, for example at least 23%, for example at least 24%, for example at least 25%, 26%, 27%, 28%, 29%, for example at most 30%, for example at most 35%.
44. The method according to any one of statements 13, 14, 24, or 26 to 43, wherein said peas in step (a1) are subjected to fermentation for at most 24 h, for example for at most 20 h, for example for at most 18 h, for example for at most 12 h, for example for at most 10 h.
45. The method according to any one of statements 13, 14, 24, or 26 to 44, wherein at the end of step (a1) said peas have an acidity ranging from 25 to 250 mEq OH⁻ per g of peas.
46. The method according to any one of statements 13, 14, 24, or 26 to 45, wherein fractionating said milled peas in step (c1) comprises adjusting the pH of the aqueous composition comprising the milled peas to a pH of at least 6, preferably at least 7, preferably at least 8, most preferably a pH of at least 7.5 and of at most 9, preferably a pH of at least 7.5 and of at most 8.5, and separating a protein comprising fraction from said milled peas. Preferably, this pH adjustment is performed on the aqueous composition comprising milled peas having a dry matter of at most 45%, preferably at most 40%, preferably at most 35%, preferably at most 30%, preferably at most 25%. In an embodiment, the dry matter content of the milled peas is adjusted to the above cited dry matter content by addition of water accordingly.
47. The method according to statement 46, wherein said at least one protein comprising fraction is subjected to a temperature of at least 30° C., for example of at least 40° C., for example of at least 50° C., for example of at least 55° C., for example of at most 80° C., for example of at least 50° C. and at most 80° C., for example of at least 53° C. and at most 78° C., for example of at least 54° C. and of at most 75° C.
48. The method according to any one of statements 13, 14, 24, or 26 to 47, wherein said aqueous composition comprising peas in step (a1), comprises an aqueous solution, preferably water.
49. The method according to any one of statements 13, 14, 24, or 26 to 48, wherein the amount of peas in said aqueous composition comprising peas in step (a) preferably ranges from 150 to 500 kg peas per m³ of aqueous composition comprising the peas.
50. The method according to any one of statements 13, 14, 24, or 26 to 49, wherein said aqueous composition comprising peas before or at the start of the fermentation of step (a1) has a pH of at least 6, for example at least 6.2 for example at least 6.4, as measured on the aqueous composition comprising the peas, after said composition had been milled.
51. The method according to any one of statements 1 to 17, or 24 to 50, wherein prior to step (b) said aqueous composition comprising pea protein is subjected to a temperature of at least 30° C., for example of at least 55° C., for example of at most 80° C., for example of at least 50° C. and at most 80° C., for example of at least 55° C. and at most 78° C.
52. The method according to any one of statements 13, 14, 24, or 26 to 51, wherein said lactic acid bacteria are selected from the group comprising *Lactobacillus, Leuconostoc, Pediococcus, Streptococcus, Aerococcus, Carnobacterium, Enterococcus, Oenococcus, Sporolactobacillus, Tetragenococcus, Vagococcus*, and *Weisella*, and combinations thereof.

53. The method according to any one of statements 13, 14, 24, or 26 to 52, wherein the lactic acid bacteria are *Lactobacillus* sp, most preferably selected from the group comprising *Lactobacillus fermentum, Lactobacillus crispatus, Lactobacillus panis, Lactobacillus mucosae, Lactobacillus pontis, Lactobacillus acidophilus, Lactobacillus plantarum, Lactobacillus helveticus, Lactobacillus buchneri, Lactobacillus delbrueckii* and *Lactobacillus casei* and mixtures thereof.
54. The method according to any one of statements 13, 14, 24, or 26 to 53, wherein the lactic acid bacteria are selected from the group comprising *Lactobacillus fermentum, Lactobacillus crispatus, Lactobacillus panis, Lactobacillus mucosae, Lactobacillus pontis*, and mixtures thereof.
55. The method according to any one of statements 13, 14, 24, or 26 to 54, wherein the lactic acid bacteria are selected from the group comprising *Lactobacillus fermentum, Lactobacillus crispatus, Lactobacillus panis, Lactobacillus mucosae, Lactobacillus pontis*, and mixtures thereof.
56. The method according to any one of statements 13, 14, 24, or 26 to 55, wherein said lactic acid hacteria is *Lactobacillus fermentum*, or *Lactobacillus crispatus*.
57. The method according to any one of statements 13, 14, 24, or 26 to 53, wherein said lactic acid bacteria is *Lactobacillus fermentum, Lactobacillus crispatus, Lactobacillus acidophilus*, or *Lactobacillus plantarum*.
58. The method according to any one of statements 13, 14, 24, or 26 to 53, wherein said lactic acid bacteria is *Lactobacillus fermentum, Lactobacillus crispatus*, or *Lactobacillus acidophilus*.
59. The method according to any one of statements 13, 14, 24, or 26 to 58, wherein the dry peas before the start of step (a1) have a pH of at least 6.0, preferably a pH ranging from 6.0 to 7.0 (i.e. before fermentation), such as for instance at least 6.0, for example at least 6.1, for example at least 6.2, for example at least 6.3, for example at most 6.9, for example at most 7.0, preferably ranging from 6.25 to 6.75, as measured at room temperature on 5 g of dry peas which have been milled with 95 g of water
60. The method according to any one of statements 13, 14, 24, or 26 to 59, wherein said fermentation is anaerobic fermentation.
61. The method according to any one of statements 1 to 17, or 24 to 60, comprising the steps of:
    (i1) subjecting an aqueous composition comprising peas to fermentation, preferably in the presence of one or more lactic acid bacteria;
    (ii1) milling said peas in the presence of water; thereby obtaining an aqueous composition comprising milled peas;
    (iii1) fractionating said aqueous composition comprising milled peas so as to obtain at least one aqueous composition comprising pea proteins, preferably by adjusting the pH of said aqueous composition to a pH of at least 6.

This pH adjustment can be performed using any suitable base, such as sodium hydroxide, potassium hydroxide, calcium hydroxide. Preferably, this pH adjustment is performed on an aqueous composition comprising milled peas having a dry matter of at most 45%, preferably at most 40%, preferably at most 35%, preferably at most 30%, preferably at most 25%, In an embodiment, the dry matter content of the milled peas is adjusted to the above cited dry matter content by addition of water accordingly.

62. The method according to any one of statements 1 to 17, or 24 to 61, comprising the steps of:
    (i) milling said peas; preferably dry peas;
    (ii) fractionating said milled peas in the presence of an aqueous solution so as to obtain at least one aqueous composition comprising pea proteins;
    (iii) isolating or concentrating said pea proteins from said aqueous composition comprising pea proteins;
    (iv) obtaining said isolated or concentrated pea proteins as an aqueous slurry having a pH ranging from 4.0 to 5.8; and
    (v) subjecting said aqueous slurry having a pH ranging from 4.0 to 5.8 to a temperature of at least 75° C.

Preferably, the aqueous slurry comprising pea proteins in step (iv) has a dry matter of at most 45%, preferably at most 40%, preferably at most 35%, preferably at most 30%, preferably at most 25%, and in an embodiment the dry matter may be adjusted to this extent by dilution with water.

63. The method according to any one of statements 1 to 17, or 24 to 62, comprising the steps of:
    (i) subjecting an aqueous composition comprising peas to fermentation, preferably in the presence of one or more lactic acid bacteria;
    (ii) milling said peas;
    (iii) fractionating said milled peas in the presence of an aqueous solution so as to obtain at least one aqueous composition comprising pea proteins;
    (iv) isolating or concentrating said pea proteins from said aqueous composition comprising pea proteins;
    (v) obtaining said isolated or concentrated pea proteins as an aqueous slurry having a pH ranging from 4.0 to 5.8; and
    (vi) subjecting said aqueous slurry having a pH ranging from 4.0 to 5.8 to a temperature of at least 75° C.

Preferably, the aqueous slurry comprising pea proteins in step (v) has a dry matter of at most 45%, preferably at most 40%, preferably at most 35%, preferably at most 30%, preferably at most 25%, and in an embodiment the dry matter may be adjusted to this extent by dilution with water.

64. The method according to any one of statements 26 to 63, wherein said fractionation step, comprises fractionating said milled peas in a fraction comprising at least 50 wt % of protein based on the total dry matter of said fraction.
65. The method according to any one of statements 26 to 64, wherein said fractionation step comprises separating at least part of the proteins comprised in the peas from the rest of the pea, preferably in a fraction comprising at least 50 wt % of protein based on the total dry matter of said fraction.
66. The method according to any one of statements 61 to 65, wherein obtaining said isolated or concentrated pea proteins as an aqueous slurry having a pH ranging from 4.0 to 5.8 comprises adjusting or maintaining the pH of the aqueous slurry to range from 4.0 to 5.8.
67. Pea protein composition obtainable by the method according to any one of statements 1 to 17, or 24 to 66, comprising at least 60 wt. % of protein based on the total dry matter of the composition, wherein said pea protein composition has a nitrogen solubility index at pH 7.0 of at most 15%, as measured on a aqueous composition comprising 3 wt % of said pea protein composition based on the total weight of the aqueous composition, and preferably said pea protein composition has a NSI of at most 11%, preferably at most 10%, preferably at most 9%, preferably at most 8%.
68. Pea protein composition according to any one of statements 19, 20 and 67, wherein said composition has a pH ranging from 4.0 to 5.8, as measured at room temperature on 10 g of pea protein composition suspended in 90 g of water.

In a first aspect, the invention relates to a method for extracting pea proteins, comprising the steps of:
(a) providing an aqueous composition comprising pea proteins;
(b) isolating or concentrating said pea proteins from said aqueous composition comprising pea proteins preferably using precipitation, flocculation, filtration, and/or chromatography;
(c) obtaining said isolated or concentrated pea proteins as an aqueous slurry having a pH ranging from 4.0 to 5.8;
(d) subjecting said aqueous slurry having a pH ranging from 4.0 to 5.8 to a temperature of at least 75° C.

Preferably, the aqueous slurry comprising pea proteins in step (c) has a dry matter of at most 45%, preferably at most 40%, preferably at most 35%, preferably at most 30%, preferably at most 25%, and in an embodiment may be adjusted to this extent by dilution with water.

According to the invention, steps (a) to (d) of the method according to the invention as specified above may be, and preferably are performed in the following order, i.e. step (a) precedes step (b), which in its turn precedes step (c), which in its turn precedes step (d). It is however to be understood that the heat treatment in step (d) in any case is performed after the isolation of the precipitated proteins in step (c).

As used herein, the term "pea" refers to the round seeds contained in the pod of *Pisum sativum* and its subspecies, varieties or cultivars. Preferably, the peas are yellow peas, preferably dry yellow peas, i.e. yellow peas which have been harvested in a dry state. "Pea proteins" as used herein therefore refers to the proteins contained in the pea seeds.

As used herein, "extracting pea proteins" refers to liberating and separating pea proteins from other constituents of peas. Extraction of pea proteins according to certain embodiments of the invention may encompass isolation or purification of pea proteins. The skilled person will understand that pea protein extracts do not entirely consist of proteins, and that a certain amount of additional components (impurities) may be present in pea protein extracts, such as lipids, carbohydrates, minerals, etc.

In some embodiments of the invention, pea proteins, pea protein compositions, and pea protein extracts comprise based on dry matter at least 50 wt % proteins (i.e. 50 g of proteins per 100 g total dry matter), preferably at least 75 wt % proteins. In some embodiments, pea protein extracts comprise based on dry matter at least 50 wt % to at most 95 wt % or 99 wt % proteins, such as at least 75 wt % to at most 99 wt % proteins. Raw extracts typically comprise a lower fraction of protein than refined or purified extracts.

As used herein, the term "aqueous composition comprising pea proteins" or "aqueous solution comprising pea proteins" refers to a composition or solution comprising water and pea proteins. In some embodiments, such solution may comprise further constituents.

In an embodiment, the aqueous composition comprising pea proteins in step (a) of the method according to the invention as described above comprises at least 1.0% dry matter based on the total weight of the composition, preferably at least 2.0% dry matter, more preferably at least 3.0% dry matter, such as for instance at least 4.0% dry matter, such as for instance at least 5.0% dry matter.

In another embodiment, the aqueous composition comprising pea proteins in step (a) of the method according to the invention as described above comprises from 1.0% to 40% dry matter, preferably from 2.0% to 30% dry matter, more preferably from 3.0% to 20% dry matter, more preferably from 3.0% to 15% dry matter, such as from 3.0% to 10%

In an embodiment, the dry matter of the protein comprising fraction comprises at least 50 wt % pea proteins, preferably at least 60 wt % pea proteins, more preferably at least 65 wt % pea proteins, such as for instance at least 70 wt %, such as from at least 55 wt % and at most 80 wt %, for example from 60 wt % to 80 wt %, for example from 60 wt % to 78 wt %.

In one embodiment, the pH of aqueous composition comprising pea proteins has a pH or is adjusted to a pH of at least 6.0, preferably the pH is or is adjusted to a pH of at least 6.5, preferably ranging from pH 6.0 to 8.5, preferably ranging from pH 6.5 to 8.5, preferably ranging from pH 7.0 to 8.5, preferably from pH 7.3 to 8.0, such as for instance at least pH 7.2, for example at least 7.3, 7.4, 7.5, 7.6, 7.7, 7.8, 7.9, 8.0. To this effect, for instance sodium hydroxide or any suitable base may be used to adjust the pH to the desired level.

In some embodiments, the aqueous composition comprising pea proteins in step (a) of the method according to the invention as described above is an aqueous composition comprising milled peas.

As used herein, the term "milling" has its ordinary meaning in the art. By means of further guidance, milling, as used herein may refer to the process of grinding of solid matters, i.e. peas, under exposure of mechanical forces that trench the structure by overcoming of the interior bonding forces. Milling may thus disintegrate the native structure of the peas. In a preferred embodiment, the milled particle size of a milled pea comprising at least 25 wt % dry matter have a D50 of at most 300 µm, preferably of at most 250 µm, for example at most 200 µm, with D50 being defined as the particle size for which fifty percent by volume of the particles have a size lower than the D50; and D50 being measured by laser diffraction analysis on a Malvern type analyzer.

For example, the D50 can be measured by sieving or by laser diffraction analysis. For example, Malvern Instruments' laser diffraction systems may advantageously be used. The particle size may be measured by laser diffraction analysis on a Malvern type analyzer. The particle size may be measured by laser diffraction analysis on a Malvern type analyzer after the peas have been milled and are in a water suspension having a 25% dry matter. Suitable Malvern systems include the Malvern 2000, Malvern MasterSizer 2000 (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 µm, by applying the theory of Mie, using appropriate optical means.

In certain embodiments, the milled peas are milled dehulled peas, i.e. peas from which the hull is removed. Dehulled peas are peas from which the outer seed coating is removed. Removing of the hull can be performed by techniques known in the art, such as for instance mechanically with dehullers. It is to be understood that when referring herein to dehulled peas, in some embodiments not all, but nevertheless the vast majority of individual peas are dehulled, such as preferably more than 90% of the peas are dehulled.

In an embodiment, prior to, during, or after milling the peas, an aqueous solution, preferably water, such as tap water, or treated well water, preferably drinking water, i.e.

water suitable for human consumption, is added to the peas. In a further embodiment, an amount of aqueous solution is added to the peas such that said composition comprises from 15% to 35% dry matter based on the total weight of the composition, preferably comprising from 15% to 35%, preferably from 20% to 30%, such as at least 19%, such as at least 20%, such as at least 21%, such as at least 22%, for example at least 23%, for example at least 24%, for example at least 25%, for example at least 26%, for example at least 27%, for example at least 28%, for example at least 29%, for example at most 30%, for example at most 35% dry matter based on the total weight of the composition. In a preferred embodiment, the milling process is a wet milling process, such that an aqueous solution is added to the peas prior to or during milling.

The skilled person will understand that if the aqueous composition comprising pea proteins is an aqueous composition comprising milled peas, all, or substantially all the constituents of the pea are comprised in the aqueous composition.

In a preferred embodiment, the aqueous composition comprising pea proteins in step (a) of the method according to the invention as described herein refers to a fraction comprising pea proteins, preferably obtained after milling the peas, and more preferably obtained after fractionating said milled peas. In an embodiment, step (c1) of the method according to the invention as described above, comprises fractionating said milled peas in a fraction comprising at least 50 wt % of protein based on the total dry matter of said fraction. As used herein, the term "fractionating" refers to a process by which at least part of the proteins comprised in the peas are separated from the rest of the pea. It is to be understood that when referring to the fractionation step, in some embodiments not all, but nevertheless the majority of individual proteins are separated, such as preferably at least 50 wt %, preferably at least 60 wt % of the proteins, based on the total protein content of the milled peas, are separated.

Providing an aqueous composition comprising pea proteins in step (a) may be achieved by any means known in the art, such as fractionation of milled pea into a protein fraction. Fractionation of the milled peas into a protein comprising fraction may be achieved by any means known in the art such as adding a suitable base, or a salt.

Preferably, the milled peas are fractionated by adjusting the pH of the milled peas. Preferably, the milled peas are fractionated by increasing the pH of an aqueous composition comprising milled peas. Preferably fractionation step (c1) comprises adjusting the pH of the milled peas to a pH of at least 6, preferably at least 7, most preferably a pH of at least 8 and at most 9. Preferably fractionation step (c1) comprises increasing the pH of an aqueous composition comprising the milled peas. In a preferred embodiment, the pH of the composition is adjusted to a pH of at least 6, more preferably at least 7. In another preferred embodiment, the pH of the composition is adjusted to a value ranging from pH 6 to pH 9, more preferably from pH 7 to pH 9, such as at least 7.0, for example at least 7.1, for example at least 7.2, for example at least 7.3, for example at least 7.4, for example at least 7.5, for example at least 7.6, for example at least 7.7, for example at least 7.8, for example at least 7.9, for example at least 8.0, for example at least 8.1, for example at least 8.2, for example at least 8.3, for example at least 8.4, for example at most 8.5, for example at most 8.6, for example at most 8.7, for example at most 8.8, for example at most 8.9, for example at most 9.0, most preferably ranging from pH 7.5 to pH 8.5, most preferably pH 8 or about pH 8. Preferably, this pH adjustment is performed on an aqueous composition comprising milled peas having a dry matter of at most 45%, preferably at most 40%, preferably at most 35%, preferably at most 30%, preferably at most 25%. In an embodiment, the dry matter content of the milled peas is adjusted to the above cited dry matter content by addition of water accordingly. This pH adjustment can be performed using any suitable base, such as sodium hydroxide, calcium hydroxide, potassium hydroxide and the like. In a preferred embodiment, the pH of the milled pea containing compositions is adjusted by addition of sodium hydroxide.

In a preferred embodiment, after adjustment of the pH the protein comprising fraction is separated from the aqueous composition comprising milled peas, by decantation or by the use of a hydrocyclone, preferably by decantation, preferably centrifugal decantation (i.e. by means of a decanting centrifuge), wherein the protein comprising fraction is the supernatant, and the pellet is a fraction comprising among others the rest of the content of the milled peas and some residual proteins. In an embodiment, more than one fractionation step may be performed sequentially. For instance, after decantation, the pellet may be suspended in an aqueous solution (preferably in an aqueous solution, preferably having a pH similar or higher (preferably pH 8.5 or about pH 8.5) than in the first fractionation step) and subjected to a decantation step, such as to retrieve additional proteins in the supernatant.

It is to be understood that the process of milling the peas may be performed simultaneously with fractionation of the milled peas, or in the alternative, the process of milling the peas may be performed prior to the fractionation step.

It is to be understood that the protein comprising fraction may also comprise further constituents, notably those which are rendered soluble by or remain soluble by the fractionation step. In a preferred embodiment, the concentration (based on dry weight) of proteins in the protein comprising fraction is at least 50 wt %, preferably at least 60 wt %, such as from at least 55 wt % and at most 80 wt %, for example from 60 wt % to 80 wt %, for example from 60 wt % to 78 wt %.

In an embodiment, the protein comprising fraction comprises at least 1.0% dry matter based on the total weight of the composition, preferably at least 2.0% dry matter, more preferably at least 3.0% dry matter, such as for instance at least 4.0% dry matter, such as for instance at least 5.0% dry matter.

In another embodiment, the protein comprising fraction comprises from 1.0% to 40% dry matter, preferably from 2.0% to 30% dry matter, more preferably from 3.0% to 20% dry matter, more preferably from 3.0% to 15% dry matter, such as from 3.0% to 10%.

In an embodiment, the dry matter of the protein comprising fraction comprises at least 50 wt % pea proteins, preferably at least 60 wt % pea proteins, more preferably at least 65 wt % pea proteins, such as for instance at least 70 wt %, such as from at least 55 wt % and at most 80 wt %, or between 60 wt % and 80 wt %, or between 60 wt % and 78 wt %.

In some embodiments, in one additional step, the protein comprising fraction, also referred herein as the aqueous composition comprising pea proteins is subjected to at least one heat treatment, preferably said protein comprising fraction is subjected to a temperature of at least 30° C., for example at least 40° C., for example at least 50° C., for example said protein comprising fraction is subjected to a temperature ranging from 30° C. to 90° C., more preferably ranging from 50° C. to 80° C., even more preferably ranging from 55° C. to 75° C., such as for instance 55° C., 60° C., 65° C., 70° C., or 75° C. In an embodiment, the heat treatment is from 50° C. to 60° C., for example from 55° C. to 65° C., for example from 60° C. to 70° C., for example from 65° C. to 75° C., for example from 70° C. to 80° C. The skilled person will understand that such heat treatment may be pasteurization. Pasteurization is well known in the art and may comprise a heat treatment at a specific temperature or temperature range for a specific time or time range. The skilled person will understand that generally, when the temperature of the heat treatment, increases, the duration of the heat treatment decreases.

Step (b) of the present process comprises isolating said pea proteins from said aqueous composition comprising pea proteins (i.e. from said protein comprising fraction). As used herein, the term "isolated" or "isolating" may refer to a process which separates proteins from said proteins comprising fraction. The term "concentration" can also be used interchangeably with "isolation". Accordingly, in an embodiment, in step (b) of the method according to the invention as described above, pea proteins are concentrated from said aqueous composition comprising pea proteins. Preferably said isolating or concentrating step can be performed using precipitation, flocculation, filtration, and/or chromatography, or a combination thereof.

In an embodiment, the invention relates to a method for extracting pea proteins, comprising the steps of:
(a) providing an aqueous composition comprising pea proteins, wherein said composition is obtained by a method comprising the steps of:
  (a1) milling peas, preferably dehulled peas;
  (b1) fractionating said milled peas so as to obtain at least one protein comprising fraction thereby forming an aqueous composition comprising pea proteins;
(b) isolating or concentrating said pea proteins from said aqueous composition comprising pea proteins preferably using precipitation, flocculation, filtration, and/or chromatography;
(c) obtaining said isolated or concentrated pea proteins as an aqueous slurry having a pH ranging from 4.0 to 5.8;
(d) subjecting said aqueous slurry having a pH ranging from 4.0 to 5.8 to a temperature of at least 75° C.

Preferably, the aqueous slurry comprising pea proteins in step (c) has a dry matter of at most 45%, preferably at most 40%, preferably at most 35%, preferably at most 30%, preferably at most 25%, and in an embodiment may be adjusted to this extent by dilution with water.

In an embodiment, isolating or concentrating said pea proteins from said aqueous composition comprising pea proteins can be performed using precipitation, flocculation, filtration, and/or chromatography.

Preferably, the proteins are isolated or concentrated by means of isoelectric precipitation or by ultrafiltration. In a preferred embodiment, isolating or concentrating pea proteins from said composition comprises at least one step of isoelectric precipitation of said proteins. Preferably, the pH of the composition comprising the pea proteins is adjusted to the isoelectric point of the proteins. As used herein, the term "isoelectric point" refers to the pH at which proteins have a net ionic charge of 0, or substantially 0 (i.e. the sum of positive and negative charges is N, or substantially 0). While it is appreciated that the isoelectric point of individual proteins may vary, as used herein, the isoelectric pH of the protein compositions as used herein refers to the pH of the composition at which the overall charge of the proteins in the composition is 0, or substantially 0. The isoelectric pH of proteins and protein compositions can be determined by techniques known in the art. Herein the isoelectric pH is determined as the pH at which the Nitrogen Solubility Index is the lowest. In a preferred embodiment, the pH of the composition comprising the proteins is adjusted in the range from 4.0 to 5.8, preferably from 4.5 to 5.5, such as for instance 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8. The pH adjustment may be effected by addition of an acid, such as sulfuric acid, or hydrochloric acid. At the isoelectric point, most proteins precipitate or aggregate.

In certain embodiments, isolation of the precipitated or aggregated proteins is effected by separating a liquid fraction from an insoluble fraction, the latter which comprises the precipitated or aggregated pea proteins. Separation of the precipitated or aggregated proteins may be effected by decantation, preferably centrifugal decantation. In a preferred embodiment, the dry matter content (on weight basis) after separation of the precipitated or aggregated proteins ranges from 20% to 40%, such as for instance at least 25%, for example at least 26%, for example at least 27%, for example at least 28%, for example at least 29%, 30%, 31%, 32%, 33%, 34%, or 35%, preferably at least 27% and at most 38% based on the total weight of the precipitated or aggregated proteins. The dry matter content may be further adjusted, for instance by addition of an aqueous solution to the precipitated or aggregated proteins, thereby obtaining a composition of precipitated proteins, preferably water, preferably drinking water, i.e. water suitable for human consumption. Preferably the dry matter content can be adjusted to range from 10% to 25%, preferably from 15% to 20%, such as for instance at least 15%, for instance at least 16%, preferably at least 17%, 18%, 19%, 20% based on the total weight of the composition of precipitated proteins. Optionally, the process of isolating the proteins can be repeated at least one more time. Preferably, the step of concentrating the proteins is performed only once.

In a preferred embodiment, the precipitated or aggregated proteins are resuspended preferably in an aqueous solution, preferably water, preferably drinking water, i.e. water suitable for human consumption. The dry matter content preferably ranges from 10% to 25%, preferably from 15% to 20%, such as for instance at least 15%, for example at least 16%, 17%, 18%, 19%, 20% of the resuspended protein composition.

In an embodiment, the pH of the composition comprising the reconstituted proteins is adjusted (if needed) or maintained to range from 4.0 to 5.8, preferably from pH 4.5 to 5.5, such as for instance pH 4.5, 4.6, 4.7, 4.8, 4.9, 5.0, 5.1, 5.2, 5.3, 5.4, 5.5. To this effect, for instance sodium hydroxide or sulfuric acid may be used to adjust the pH to the desired level. Accordingly, in an embodiment, obtaining said isolated or concentrated pea proteins as an aqueous slurry having a pH ranging from 4.0 to 5.8 in step (c) of the above described method comprises adjusting or maintaining the pH of the aqueous slurry to range from 4.0 to 5.8, preferably from pH 4.5 to 5.5, such as for instance pH 4.5, 4.6, 4.7, 4.8, 4.9, 5.0, 5.1, 5.2, 5.3, 5.4, 5.5. Preferably, this pH adjustment is performed on an aqueous composition comprising the reconstituted proteins having a dry matter of at most 45%, preferably at most 40%, preferably at most 35%, preferably at most 30%, preferably at most 25%. In an embodiment, the dry matter content of the composition is adjusted to the above cited dry matter content by addition of water accordingly.

In step (d) of the method according to the invention as described herein, said aqueous slurry having a pH ranging from 4.0 to 5.8 is subjected to heat treatment at a temperature of at least 75° C., preferably the aqueous slurry is subjected to a temperature of at least 77° C., preferably at least 78° C., preferably at least 80° C., yet more preferably at least 85° C., yet more preferably at least 90° C., for example at least 95° C., preferably at most 160° C., yet more preferably at most 210° C. Preferably said proteins are subjected to a heat treatment at a temperature ranging from 75° C. to 210° C., preferably ranging from 85° C. to 160° C., more preferably ranging from 90° C. to 150° C. The heat treatment may advantageously be effected by means of one or more heat exchanger or by direct or indirect injection of steam. In an embodiment, the duration of the heat treatment is of at least 0.01 second, preferably ranging from 0.01 second to 20 min, preferably ranging from 10 seconds to 10 minutes. The skilled person will appreciate that the higher the temperature, the shorter the duration of heat treatment. For instance, the heat treatment may be at a temperature ranging from 115° C. to 210° C. for a time ranging from 0.01 s to 15 s. Alternatively, for instance, the heat treatment may be at a temperature ranging from 95° C. to 115° C. for a time ranging from 15 s to 5 min. Alternatively, for instance, the heat treatment may be at a temperature ranging from 75° C. to 95° C. for a time ranging from 5 min to 15 min. In a preferred embodiment, the heat treatment is performed at a temperature ranging from 75° C. to 110° C., even more preferably at a temperature ranging from 80° C. to 100° C., for a time ranging from 2 min to 10 min, preferably for a time ranging from 5 min to 8 min. In another preferred embodiment, the heat treatment is performed at a temperature ranging from 130° C. to 150° C. for a time ranging from 1 s to 8 s. After the heat treatment, the protein containing compositions may be maintained at a temperature ranging from 70° C. to 90° C.; preferably ranging from 70° C. to 85° C., before drying.

In an embodiment, in step (d) of the method according to the invention as described herein, said aqueous slurry having a pH ranging from 4.0 to 5.8 is subjected to heat treatment at a temperature ranging from 115° C. to 210° C. for a time ranging from 15 s to 0.01 s; at a temperature ranging from 95° C. to 115° C. for a time ranging from 5 min to 15 s; at a temperature ranging from 75° C. to 95° C. for a time ranging from 15 min to 5 min; at a temperature ranging from 75° C. to 110° C. for a time ranging from 10 min to 2 min; at a temperature ranging from 80° C. to 100° C. for a time ranging from 8 min to 5 min; or at a temperature ranging from 130° C. to 150° C. for a time ranging from 8 s to 1 s. Preferably the time of the heat treatment decreases when the temperature of the heat treatment increases.

In an embodiment, said aqueous slurry having a pH ranging from 4.0 to 5.8 to a temperature of at least 75° C. may be subjected to drying after step (d) of the method according to the invention as described herein. Drying may be effected by any means in the art, such as by application of hot air, evaporation, freeze drying, contact drying, steam drying, dielectric drying, roller drying, flash drying, etc. In a preferred embodiment, the aqueous slurry having a pH ranging from 4.0 to 5.8 to a temperature of at least 75° C. is dried by spray drying. Optionally, the proteins may be subjected to granulation, by techniques known in the art.

In certain embodiments, the pea proteins in the aqueous composition comprising pea proteins in step (a) of the methods according to the invention as described herein may be derived from milled peas. In an embodiment, said milled peas, are issued from peas which have been hydrated, or said peas are milled dry and hydrated.

In another embodiment, said milled peas have been fermented prior to milling. When whole peas are subjected to fermentation prior to milling, advantageously removal of the fermenting microorganisms, as well as fermentation by-products, such as lactic acid, but also secreted compounds such as enzymes, which may affect downstream processing, are easily and in a cost-effective manner separated from the peas after fermentation. Moreover, unexpectedly, when fermenting whole peas the mono-, di-, and/or oligosaccharides content of the peas, and in particular the mono- or dimeric sugars, such as glucose, fructose, saccharose, galactose, and/or the flatulent sugars, such as raffinose, stachyose, and verbascose, all of which are inside the peas are drastically reduced, which is even more surprising when taking into account the limited duration of the fermentation in some embodiments.

As used herein, the term "sugar" or "free sugar" refers to mono-, di-, and/or oligosaccharides consisting of up to 10 monomer units. In some embodiments, when referring to "total sugars" or "total free sugars", such encompasses the total of mono-, di-, and/or oligosaccharides consisting of up to 10 monomer units. In other embodiments, a specific subset of sugars is specified.

In an embodiment, an aqueous composition comprising peas is subjected to fermentation, preferably in the presence of one or more lactic acid bacteria. Preferably, the peas which are fermented are unmilled peas (i.e. whole peas). The peas may however in an embodiment be split peas. In an embodiment, the peas are round when harvested and dry. After the hull is removed, the natural split in the seed's cotyledon can be manually or mechanically separated, resulting in "split peas".

Peas as used herein may be sorted prior to subjecting to fermentation. For instance stones or larger plant material, but also damaged peas, may be removed from the peas to be used according to the invention.

In such embodiments where peas are subjected to fermentation, peas, preferably dry peas, preferably dehulled peas, such as dehulled dry peas are suspended in an aqueous solution. In a preferred embodiment, the aqueous solution is water. In an embodiment, the water can be drinking water, or well water which has been treated so as to render it drinkable. The water used is preferably drinking water, i.e. water suitable for human consumption.

In some embodiments, the amount of peas which is added to the aqueous solution to reconstitute the aqueous composition comprising peas preferably ranges from 150 to 500 kg peas per $m^3$ of aqueous composition comprising the peas, i.e. per 150 to 500 kg peas an aqueous solution is added until a final volume of 1 $m^3$ is reached.

In an embodiment, the aqueous composition comprising the peas at the start of fermentation, has a pH of at least 6.0, preferably at least 6.2, for example at least 6.4, as measured on the aqueous composition comprising the peas, after said composition had been milled.

In a preferred embodiment, the peas which are contacted with the aqueous composition are naturally harvested dry, or in an embodiment the peas can be fresh peas. Preferably the peas are dry peas, and have a dry matter content (on weight basis) of at least 80% (i.e. at least 80 g of dry matter per 100 g of total weight of the dry peas), more preferably of at least 85%, for example of at least 90%, for example of at least 95%, such as for instance ranging from 80% to 95%, for example from 85% to 95%, for example from 90% to 95%.

As used herein, the term "fermentation" has its ordinary meaning in the art. By means of further guidance, fermentation is a microbiological metabolic process comprising conversion of sugar to acids, and/or gases using yeast and/or bacteria. Subjecting an aqueous composition comprising peas to fermentation as used herein therefore may refer to incubating the aqueous composition comprising peas with bacteria and/or yeast, preferably lactic acid bacteria, under conditions suitable for the bacteria and/or yeast to be metabolically active.

As used herein, "lactic acid bacteria" refers to a population of Gram-positive, low-GC, acid-tolerant, generally non-sporulating, non-respiring rod or cocci that are associated by their common metabolic and physiological characteristics, and produce lactic acid as the major metabolic end-product of carbohydrate fermentation. These bacteria, can be usually found in decomposing plants and lactic products. As used herein, lactic acid bacteria may be non-pathogenic in the sense that they do not cause harm or does not lead to deleterious effects when ingested. Preferably, the lactic acid bacteria as used herein are one or more bacterial genera selected from *Lactobacillus, Pediococcus, Lactococcus, Leuconostoc, Streptococcus, Aerococcus, Carnobacterium, Enterococcus, Oenococcus, Sporolactobacillus, Tetragenococcus, Vagococcus*, and *Weisella*, and combinations thereof. Most preferably, the lactic acid bacteria are *Lactobacillus* sp, most preferably selected from the group consisting of *Lactobacillus fermentum, Lactobacillus crispatus, Lactobacillus panis, Lactobacillus mucosae, Lactobacillus pontis, Lactobacillus acidophilus, Lactobacillus plantarum, Lactobacillus helveticus, Lactobacillus buchneri, Lactobacillus delbrueckii*, and *Lactobacillus casei*, and mixtures thereof, for example from the group consisting of *Lactobacillus fermentum, Lactobacillus crispatus, Lactobacillus panis, Lactobacillus mucosae, Lactobacillus pontis, Lactobacillus acidophilus* and mixtures thereof, for example from the group consisting of *Lactobacillus fermentum, Lactobacillus crispatus, Lactobacillus panis, Lactobacillus mucosae, Lactobacillus pontis*, and mixtures thereof, for example said bacteria is *Lactobacillus fermentum*, or *Lactobacillus crispatus*. In some embodiments, fermentation may be spontaneous fermentation (i.e. in which no fermenting microorganisms are deliberately added, but fermentation is effected by microorganisms, preferably lactic acid bacteria, which naturally occur on/in peas and/or in the environment) or may be inoculated fermentation (i.e. in which fermenting microorganisms, preferably lactic acid bacteria, are deliberately added). Fermentation may also be effected by transferring part or all of the aqueous fraction of one fermentation step to a next fermentation which is to be started up, for example by transferring at least $1/10^{th}$ of the first fermentation volume to at least one second fermentation step. In a preferred embodiment, the fermentation is anaerobic fermentation, (not strictly anaerobic). In a preferred embodiment, said *Lactobacillus fermentum* is *Lactobacillus fermentum* LMG 6902 or LMG 18026. In a preferred embodiment, said *Lactobacillus Crispatus* is *Lactobacillus Crispatus* LMG 12005. In a preferred embodiment, said *Lactobacillus Acidophilus* is *Lactobacillus Acidophilus* LMG 8151.

In an embodiment, the aqueous composition comprising peas is subjected to fermentation until the pH in the peas is at most 5.5, preferably at most 5.0, more preferably ranging from 3.5 to 5, preferably, as measured at room temperature on 1 g of said peas which have been milled and then suspended in 9 g of water, as described in the experimental section. In an embodiment, the aqueous composition comprising peas is subjected to fermentation until the pH in the peas ranges from 3.5 to 4.5, for example from 4.0 to 5.0, preferably from 4.5 to 5.5, such as for instance at least 3.5, for example at least 3.75, for example at least 4.0, for example at least 4.25, for example at least 4.50, for example at least 4.75, for example at most 5.0, for example at most 5.25, for example at most 5.5, preferably, as measured at room temperature on 1 g of said peas which have been milled and then suspended in 9 g of water, as described in the experimental section.

In an embodiment, the dry peas have a pH of at least 6.0, preferably ranging from 6.0 to 7.10 before fermentation, such as for instance at least 6.0, for example at least 6.1, for example at least 6.2, for example at least 6.3, for example 6.4, for example 6.5, for example 6.6, for example 6.7, for example 6.8, for example 6.9, for example 7.10, preferably ranging from 6.25 to 6.75, preferably, as measured at room temperature on 1 g of said peas which have been milled and then suspended in 9 g of water, as described in the experimental section.

In an embodiment, the aqueous composition comprising peas is subjected to fermentation until the pH in the peas lowers by at least 1 pH unit, preferably by at least 1.5 pH unit, such as for instance at least 1, for example at least 1.1, for example at least 1.2, for example at least 1.3, for example at least 1.4, for example at least 1.5, for example at least 1.6, for example at least 1.7, for example at least 1.8, for example at least 1.9, for example at least 2, for example at least 2.1, for example at least 2.2, for example at least 2.3, for example at least 2.4, for example at least 2.5, for example at least 2.6, for example at least 2.7, for example at least 2.8, for example at least 2.9, for example at least 3 pH unit, preferably, as measured at room temperature on 1 g of said peas which have been milled and then suspended in 9 g of water, as described in the experimental section. In another embodiment, the aqueous composition comprising peas is subjected to fermentation until the pH in the peas lowers by 1 pH unit to 3 pH units, preferably by 1.5 pH units to 3 pH units, such as for instance by 1.5 pH units to 2.5 pH units, for example by 2.0 pH units to 3.0 pH units, preferably, as measured at room temperature on 1 g of said peas which have been milled and then suspended in 9 g of water, as described in the experimental section. By means of example, and without limitation, at the start of fermentation, the pH in the peas may be 6.5, and at the end of fermentation, the pH in the peas may be 5.0, preferably, as measured at room temperature on 1 g of said peas which have been milled and then suspended in 9 g of water, as described in the experimental section.

In an embodiment, the aqueous composition comprising peas is subjected to fermentation for a duration of at least 3 h, preferably at least 4 h, more preferably at least 6 h. In another embodiment, the aqueous composition comprising peas is subjected to fermentation for a duration ranging from 3 h to 24 h, preferably ranging from 4 h to 24 h, more preferably ranging from 4 h to 20 h, such as for instance at least 3 h, for example at least 4 h, for example at least 5 h, for example at least 6 h, for example at least 7 h, for example at least 8 h, at least 9 h, about 10 h, about 11 h, about 12 h, about 13 h, about 14 h, for example at most 15 h, for example at most 16 h, for example at most 17 h, for example at most 18 h, for example at most 19 h, for example at most 20 h, for example at most 21 h, for example at most 22 h, for example at most 23 h, for example at most 24 h. The skilled person will appreciate that for instance spontaneous fermentations may take longer than fermentations which are effected by addition of bacteria, in view of the different amounts of microorganisms at the start of the fermentation.

In an embodiment, the aqueous composition comprising peas are subjected to fermentation at a temperature which is optimal for the fermenting microorganism, preferably at a temperature which is maximally 5° C. higher or lower than the temperature which is optimal for the fermenting microorganism. Optimal temperatures for the bacteria and/or yeasts as defined herein are known in the art. By means of further guidance, and without limitation, an optimal temperature as defined herein refers to the temperature at which growth is maximized. In a further embodiment, the aqueous composition comprising peas is subjected to fermentation at a temperature of at least 30° C., for example ranging from 30° C. to 50° C., preferably ranging from 35° C. to 45° C. In another embodiment, the aqueous composition comprising peas is subjected to fermentation at a temperature ranging from 30° C. to 40° C., from 35° C. to 45° C., or from 40° C. to 50° C., preferably 40° C., or about 40° C.

In an embodiment, the aqueous composition comprising peas is subjected to fermentation in the presence of fermenting microorganisms, such as bacteria and/or yeast, preferably comprising one or more lactic acid bacteria, more preferably said lactic acid bacteria are selected from the group comprising one or more *Lactobacillus* sp. In an embodiment, the fermentation is performed in the presence of one or more of the above specified microorganisms, preferably lactic acid bacteria, at a concentration ranging from $10^2$ cfu/ml to $10^{10}$ cfu/ml of said aqueous composition comprising the peas, such as at least $10^4$ cfu/ml, for example at least $10^5$ cfu/ml, for example at least $10^6$ cfu/ml, for example at least $10^7$ cfu/ml, for example at least $10^8$ cfu/ml, for example at least $10^9$ cfu/ml of said aqueous composition comprising the peas. "cfu" (colony forming units) are well known in the art and can for instance be determined by plate counting. It is to be understood that "cfu/ml" refers to the amount of cfu per ml of the total aqueous composition comprising peas, i.e. including the peas.

In another embodiment, the aqueous composition comprising the peas is subjected to fermentation in the presence of fermenting microorganisms, preferably comprising one or more lactic acid bacteria, preferably comprising one or more *Lactobacillus* sp., wherein the microorganisms, preferably lactic acid bacteria, are added at a concentration of at least $10^2$ cfu/ml of aqueous composition comprising peas.

In an embodiment, the peas at the end of fermentation and before the milling step, have a dry matter content (on weight basis) ranging from 35% to 60%, preferably from 35% to %, for example from 40% to 50%, such as for instance at least 40%, for example at least 41%, at least 42%, for example at least 43%, for example at least 44%, for example at least 45%, for example at least 46%, for example at least 47%, about 48%, about 49%, for example at least 50%, for example at most 55%, for example at most 60% based on the total weight of the peas at the end of the fermentation, i.e. after the peas have been isolated from the aqueous composition.

In a further embodiment, the peas are fermented until they have a dry matter content (on weight basis) ranging from 35% to 60%, preferably from 35% to 55%, for example from 40% to 50%, such as for instance at least 40%, for example at least 41%, at least 42%, for example at least 43%, for example at least 44%, for example at least 45%, for example at least 46%, for example at least 47%, about 48%, about 49%, for example at most 50%, for example at most 55%, for example at most 60% based on the total weight of the peas at the end of the fermentation, i.e. after the peas have been isolated from the aqueous composition. In this embodiment, the peas preferably have a dry matter content (on weight basis) before fermentation, or at the start of fermentation of at least 80% (i.e. at least 80 g of dry matter per 100 g of total weight of the dry peas), more preferably of at least 85%, for example of at least 90%, for example of at least 95%, such as for instance ranging from 80% to 95%, for example from 85% to 95%, for example from 90% to 95%.

In an embodiment, the peas which have been subjected to fermentation are milled. To this effect, in an embodiment, the peas may be removed from the aqueous composition after fermentation and then subjected to milling. Preferably, the peas are washed or rinsed after fermentation and before milling. Washing or rinsing may be performed with an aqueous solution, preferably water, such as water, or treated well water, preferably drinking water, i.e. water suitable for human consumption.

In a preferred embodiment, the method for extracting pea proteins from *Pisum sativum* ssp., comprises the steps of:
(i) providing peas;
(ii) milling said peas;
(iii) fractionating said milled peas in the presence of an aqueous solution so as to obtain at least one aqueous composition comprising pea proteins;
(iv) isolating or concentrating said pea proteins from said aqueous composition comprising pea proteins;
(v) obtaining said isolated or concentrated pea proteins as an aqueous slurry having a pH ranging from 4.0 to 5.8; and
(vi) subjecting said aqueous slurry having a pH ranging from 4.0 to 5.8 to a temperature of at least 75° C.

Preferably, the aqueous slurry comprising pea proteins in step (v) has a dry matter of at most 45%, preferably at most 40%, preferably at most 35%, preferably at most 30%, preferably at most 25%, and in an embodiment may be adjusted to this extent by dilution with water.

In a preferred embodiment, the method for extracting pea proteins from *Pisum sativum* ssp, comprises the steps of:
(i) subjecting an aqueous composition comprising peas to fermentation, preferably in the presence of one or more lactic acid bacteria;
(ii) milling said peas;
(iii) fractionating said milled peas in the presence of an aqueous solution so as to obtain at least one aqueous composition comprising pea proteins;
(iv) isolating or concentrating said pea proteins from said aqueous composition comprising pea proteins;
(v) obtaining said isolated or concentrated pea proteins as an aqueous slurry having a pH ranging from 4.0 to 5.8; and
(vi) subjecting said aqueous slurry having a pH ranging from 4.0 to 5.8 to a temperature of at least 75° C.

Preferably, the aqueous slurry comprising pea proteins in step (v) has a dry matter of at most 45%, preferably at most 40%, preferably at most 35%, preferably at most 30%, preferably at most 25%, and in an embodiment may be adjusted to this extent by dilution with water.

In a preferred embodiment, the method for extracting pea proteins from *Pisum sativum* ssp., comprises the steps of:
(i1) providing an aqueous composition comprising pea proteins;
(ii1) isolating or concentrating said pea proteins from said aqueous composition comprising pea proteins preferably using isoelectric precipitation, preferably by adjusting the pH of said aqueous composition to a pH ranging from 4.0 to 5.8;
(iii1) obtaining said isolated or concentrated pea proteins as an aqueous slurry having a pH ranging from 4.0 to 5.8;
(iv1) optionally adjusting the dry matter content of the aqueous slurry to a value ranging from 10% to 25%, preferably 15% to 20%;
(v1) subjecting said aqueous slurry having a pH ranging from 4.0 to 5.8 to a temperature of at least 75° C.;
(vi1) drying said aqueous slurry having a pH ranging from 4.0 to 5.8, preferably obtaining pea protein composition having a pH ranging from 4.0 to 5.8, as measured at room temperature on 10 g of pea protein composition suspended in 90 g of water.

Preferably, the aqueous slurry comprising pea proteins in step (iii1) has a dry matter of at most 45%, preferably at most 40%, preferably at most 35%, preferably at most 30%, preferably at most 25%, and in an embodiment may be adjusted to this extent by dilution with water.

The pea proteins obtained by the methods according to the present invention as described herein have different characteristics, such as different biochemical and/or organoleptic characteristics, as well as a difference in quality associated parameter values compared to known prior art pea proteins.

Accordingly, in an aspect, the present invention encompasses pea proteins and pea protein compositions obtained by or obtainable by the methods according to the invention as described herein.

In a further aspect, the invention relates to pea protein composition comprising at least 60 wt % of protein based on the total dry matter of the composition, wherein said pea protein composition has a nitrogen solubility index at pH 7.0 of at most 15%, as measured on an aqueous composition comprising 3 wt % of said pea protein composition based on the total weight of the aqueous composition, and preferably a NSI at pH 7.0 of at most 11%, preferably at most 10%, preferably at most 9%, preferably at most 8%. In a preferred embodiment, said composition is obtained by the method of the invention.

In a further aspect, the invention relates to pea protein composition having a gel strength at pH 6 of at most 100 g, preferably at most 75 g, even more preferably at most 50 g. In a further aspect, the invention relates to pea proteins having a gel strength at pH 6 ranging from 10 g to 100 g, preferably ranging from 10 g to 75 g, even more preferably ranging from 10 g to 50 g.

In a further aspect, the invention relates to pea protein composition comprising at least 60 wt % of protein based on the total dry matter of the composition, wherein said pea protein composition has a nitrogen solubility index at pH 7.0 of at most 15%, as measured on an aqueous composition comprising 3 wt % of said pea protein composition based on the total weight of the aqueous composition, and preferably a NSI at pH 7.0 of at most 11%, preferably at most 10%, preferably at most 9%, preferably at most 8%, and a gel strength at pH 6 of at most 100 g, preferably at most 75 g, even more preferably at most 50 g. In a further aspect, the invention relates to pea proteins having a gel strength at pH 6 ranging from 10 g to 100 g, preferably ranging from 10 g to 75 g, even more preferably ranging from 10 g to 50 g.

In further aspects, the invention relates to pea proteins having one or more, preferably all of characteristics A to H as indicated in Table 1.

TABLE 1

| | | |
|---|---|---|
| A | solubility (NSI %); pH 7.0 | <15; preferably between 1 and 10 |
| B | gel strength (g) | <100; preferably between 10 and 100 |
| C | tapped density (kg/l) | >0.5; preferably between 0.5 and 1.0 |
| D | bulk density (kg/l) | >0.5; preferably between 0.5 and 1.0 |
| E | Flowability (Brabender units) using viscograph | <1000; preferably between 200 and 1000 |
| F | Wettability (s) | <60; preferably between 1 and 60 |
| G | Viscosity (cP), pH 5.8 | <200; preferably between 50 and 200 |
| H | viscosity (cP); pH 6.0 | <200; preferably between 50 and 200 |

In preferred embodiments, the pea proteins have any one of the following combination of characteristics of Table 1:

A, B, C, D, E, F, G, H, A+B, A+C, A+D, A+E, A+F, A+G, A+H, B+C, B+D, B+E, B+F, B+G, B+H, C+D, C+E, C+F, C+G, C+H, D+E, D+F, D+G, D+H, E+F, E+G, E+H, F+G, F+H, G+H, A+B+C, A+B+D, A+B+E, A+B+F, A+B+G, A+B+H, A+C+D, A+C+E, A+C+F, A+C+G, A+C+H, A+D+E, A+D+F, A+D+G, A+D+H, A+E+F, A+F+G, A+E+H, A+F+G, A+F+H, A+G+H, B+C+D, B+C+E, B+C+F, B+C+G, B+C+H, B+D+E, B+D+F, B+D+G, B+D+H, B+E+F, B+E+G, B+E+H, B+F+G, B+F+H, B+G+H, C+D+E, C+D+F, C+D+G, C+D+H, C+E+F, C+E+G, C+E+H, C+F+G, C+F+H, C+G+H, D+E+F, D+E+G, D+E+H, D+F+G, D+F+H, D+G+H, E+F+G, E+F+H, E+G+H, F+G+H, A+B+C+D, A+B+C+E, A+B+C+F, A+B+C+G, A+B+C+H, A+B+D+E, A+B+D+F, A+B+D+G, A+B+D+H, A+B+E+F, A+B+E+G, A+B+E+H, A+B+F+G, A+B+F+H, A+B+G+H, A+C+D+E, A+C+D+F, A+C+D+G, A+C+D+H, A+C+E+F, A+C+E+G, A+C+E+H, A+C+F+G, A+C+F+H, A+C+G+H, A+D+E+F, A+D+E+G, A+D+E+H, A+D+F+G, A+D+F+H, A+D+G+H, A+E+F+G, A+E+F+H, A+E+G+H, A+F+G+H, B+C+D+E, B+C+D+F, B+C+D+G, B+C+D+H, B+C+E+F, B+C+E+G, B+C+E+H, B+C+F+G, B+C+F+H, B+C+G+H, B+D+E+F, B+D+E+G, B+D+E+H, B+D+F+G, B+D+F+H, B+D+G+H, B+E+F+G, B+E+F+H, B+E+G+H, B+F+G+H, C+D+E+F, C+D+E+G, C+D+E+H, C+n+F+G, C+D+F+H, C+D+G+H, C+E+F+G, C+E+F+H, C+E+G+H, C+F+G+H, D+E+F+G, D+E+F+H, D+E+G+H, D+F+G+H, E+F+G+H, A+B+C+D+E, A+B+C+D+F, A+B+C+D+G, A+B+C+D+H, A+B+C+E+F, A+B+C+E+G, A+B+C+E+H, A+B+C+F+G, A+B+C+F+H, A+B+C+G+H, A+B+D+E+F, A+B+D+E+G, A+B+D+E+H, A+B+D+F+G, A+B+D+F+H, A+B+D+G+H, A+B+E+F+G, A+B+E+F+H, A+B+E+G+H, A+B+F+G+H, A+C+D+E+F, A+C+D+E+G, A+C+D+E+H, A+C+D+F+G, A+C+D+F+H, A+C+D+G+H, A+C+E+F+G, A+C+E+F+H, A+C+E+G+H, A+C+F+G+H, A+D+E+F+G, A+D+E+F+H, A+D+E+G+H, A+D+F+G+H, A+E+F+G+H, B+C+D+E+F, B+C+D+E+G, B+C+D+E+H, B+C+D+F+G, B+C+D+F+H, B+C+D+G+H, B+C+E+F+G, B+C+E+F+H, B+C+E+G+H, B+C+F+G+H, B+D+E+F+G, B+D+E+F+H, B+D+E+G+H, B+D+F+G+H, B+E+F+G+H, C+D+E+F+G, C+D+E+F+H, C+D+E+G+H, C+D+F+G+H, C+E+F+G+H, D+E+F+G+H, A+B+C+D+E+F, A+B+C+D+E+G, A+B+C+D+E+H, A+B+C+D+F+G, A+B+C+D+F+H, A+B+C+D+G+H, A+B+C+E+F+G, A+B+C+E+F+H, A+B+C+E+G+H, A+B+C+F+G+H, A+B+D+E+F+G, A+B+D+E+F+H, A+B+D+E+G+H, A+B+D+F+G+H, A+B+E+F+G+H, A+C+D+E+F+G, A+C+D+E+F+H, A+C+D+E+G+H, A+C+D+F+G+H, A+C+E+F+G+H, A+D+E+F+G+H, B+C+D+E+F+G, B+C+D+E+F+H, B+C+D+E+G+H, B+C+D+F+G+H, B+C+E+F+G+H, B+D+E+F+G+H, C+D+E+F+G+H, A+B+C+D+E+F+G, A+B+C+D+E+F+H, A+B+C+D+E+G+H, A+B+C+D+F+G+H, A+B+C+E+F+G+H, A+B+D+E+F+G+H, A++D+E+F+G+H, B+C+D+E+F+G+H, A+B+C+D+E+F+G+H

The skilled person will understand that when referring to "pea proteins" in some embodiments, in fact a composition is described, which predominantly, but not exclusively comprises pea proteins. Residual impurities may be present in such compositions. Such residual impurities may include for instance minerals, sugars, etc. In a preferred embodiment, the term pea proteins preferably refers to a composition comprising (based on the total dry matter of the composition) at least 60 wt % proteins, preferably at least 75 wt % proteins, more preferably at least 80 wt %. In another preferred embodiment, the term pea proteins refers to a pea protein extract or a pea protein composition comprising (based on the total dry matter of the composition) from 70 wt % to 98 wt % proteins, preferably from 75 wt % to 98 wt % proteins, more preferably from 80 wt % to 98 wt % proteins, more preferably from 85 wt % to 98 wt %, yet more preferably from 88 wt % to 98 wt %.

In a further aspect, the present invention relates to a composition comprising pea proteins obtained by or obtainable by the methods according to the invention as described herein. In a preferred embodiment, such composition is an edible composition. As used herein, and as will be understood by the person skilled in the art, an "edible" composition refers to a composition which is suitable for human or animal consumption. Preferably said composition is a food or feed, more preferably a bakery food product, or a confectionary food product. In a preferred embodiment, said food product is a biscuit, bread, cake, waffle, fudge, extruded cereal, or bar.

Accordingly, in a further aspect, the present invention relates to the use of the pea proteins as described herein, in particular the pea proteins obtained or obtainable according to the methods as described herein, in food or feed products. In a preferred embodiment, the food products are bakery food products or confectionary food products. The pea proteins as described herein may for instance partially or completely replace other proteins in food or feed products, such as for instance proteins of animal origin, such as dairy proteins. Particularly suited applications of the pea proteins as described herein may for instance be used in processes for preparing bakery food products or confectionary products.

In a further aspect, the invention relates to the use of the pea proteins as described herein, in particular the pea proteins obtained or obtainable according to the methods as described herein for clarifying or fining liquids, such as for instance beverages and drinks.

As used herein, the terms "clarifying" and "fining" have their ordinary meaning in the art. By means of further guidance, and without limitation, the term "clarifying" relates to a process by which for instance (suspended) insolubles are removed from a liquid by addition of a fining agent. Addition of a fining agent can cause the insolubles to aggregate, but also certain solubles (e.g. proteins) such that larger particles are formed, which may be easily removed, such as by filtration or centrifugation. In an embodiment, the liquid which can be clarified or fined is a drink, i.e. a liquid suitable for human or animal consumption. In a particularly preferred embodiment, said drink is a fermented drink, such as an alcoholic drink, preferably wine (including but not limited to red wine, white wine, rose wine, champagne, porto, sherry, etc.). Also the uses of the pea proteins as described herein according to the invention in clarifying fermented beverages or drinks other than wine are envisaged herein.

The aspects and embodiments of the invention are further supported by the following non-limiting examples.

EXAMPLES

Protocols

Unless otherwise specified, in the examples below, all parameters are measured as defined in this section. The measurement of the parameters as defined in this section also represent in preferred embodiments the method for measuring said parameters according to the invention as indicated in the respective aspects and embodiments of the above detailed description.

Unless otherwise specified, in the examples below, all parameters are measured as defined in this section. The measurement of the parameters as defined in this section also represent in preferred embodiments the method for measuring said parameters according to the invention as indicted in the respective aspects and embodiments of the above detailed description.

pH Measurement on Dry Peas or Aqueous Composition Comprising Peas or Milled Peas pH was measured with a pH meter WTW SERIES Inolab Termil 740. The apparatus was calibrated with buffer solutions at pH 4.01 (WTW pH 4.01 Technical Buffer, Model STP4, Order no 108706) and pH 7 (WTW pH 7.00 Technical Buffer, Model STP7, Order no 108708).

When the pH was measured on the aqueous composition excluding peas, a sample of aqueous solution was taken directly from the fermentation vessel. The pH of the sample was measured once the value was stabilized.

When the pH was measured on peas, peas were taken from the fermentation vessel. Peas were drained in a strainer and then laid on absorbent paper during two minutes in order to remove juice excess. Peas were milled during one minute with a blender (Magic Bullet, Homeland Housewares). 1 g of milled peas was suspended in 9 g of deionized water (water conductivity <15 µS). The suspension was then milled again with the blender. Finally the pH of the suspension (at room temperature) was measured once the value was stabilized.

When the pH was measured on dry peas, peas were milled dry for one minute with a grinder (Kenwood). 5 g of milled dry peas were suspended in 95 g of deionized water (water conductivity <15 µS). The suspension was then homogenized on a stirring plate for 1 minute. The pH of the suspension was measured once the value was stabilized.

pH Measurement on Protein Extract Powder pH was measured with a pH meter WTW pH/Cond 340i/SET. The apparatus was calibrated with buffer solutions at pH 4.01 (WTW pH 4.01 Technical Buffer, Model STP4, Order no 108706) and pH 7 (WTW pH 7.00 Technical Buffer, Model STP7, Order no 108708). 5.0 g of protein extract powder were introduced in a 100 ml beaker and made up to 50 g (balance Ohaus ARC120, sensitivity 0.01 g, capacity 3100 g) with demineralized water at room temperature. The suspension was stirred for 5 minutes on a stirring plate (Stuart US151) at intensity 4. The pH of the suspension was measured (at room temperature) under stirring once the value was stabilized.

pH Measurement on Protein Suspension pH was measured with a pH meter WTW pH/Cond 340i/SET. The apparatus was calibrated with buffer solutions at pH 4.01 (WTW pH 4.01 Technical Buffer, Model STP4, Order no 108706) and pH 7 (WTW pH 7.00 Technical Buffer, Model STP7, Order no 108708). 50 ml of protein suspension was placed in a 100 ml beaker with no additional dilution. The pH of the sample was measured (at room temperature) once the value was stabilized.

pH Measurement of Food Products

The pH meter (Knick Portavo 902 PH) was calibrated with buffer solutions at pH 4.01 (WTW pH 4.01 Technical Buffer, Model STP4, Order no 108706) and pH 7 (WTW pH 7.00 Technical Buffer, Model STP7, Order no 108708). pH was measured by introducing the probe of pH meter (Knick Portavo 902 PH) directly inside the product (liquid food product, batter, dough . . . ) at room temperature. In case of solid food product, a dilution at 50% in demineralized water was performed and the solution was analyzed. After stabilization, pH value was noted.

Lactic Acid Bacteria Enumeration

Dilutions of sample were performed with EPT Dilucups 9 ml Led techno.

The medium used was MRS agar (acc. to DE MAN, ROGOSA and SHARPE) from Merck Cat. No 1.10661.0500.

Peas or peas suspension were milled with a blender, Magic Bullet, Homeland Housewares.

When a sample of the aqueous composition excluding peas was analyzed, a sample was taken directly from the fermentation vessel. 1 ml of sample was plated. If a dilution was needed, 1 ml of sample was added to dilucup and this step was repeated until the correct dilution was reached and then 1 ml of diluted sample was plated. The petri dishes were incubated 48 hours at 45° C.

When a sample of peas was analyzed, whole peas were taken from the fermentation vessel. Peas were drained in a strainer and then laid on absorbent paper during two minutes in order to remove juice excess. Peas were milled during one minute. The milled peas were suspended (1 g of peas in 9 g of deionized water) in deionized water (conductivity <15 µS). The suspension was then milled with the blender. 1 ml of suspension was plated. If dilution was needed, 1 ml of suspension was added to dilucup and this step was repeated until the correct dilution was reached and then 1 ml of diluted sample was plated. The petri dishes were incubated 48 hours at 45° C.

Dry Matter Determination

Total dry matter was determined gravimetrically as residue remaining after drying. Moisture was evaporated from sample by oven drying.

5 g of sample were weighed in a dry aluminium dish previously weighed (precision balance Ohaus, capacity 410 g, sensitivity 0.001 g). The sample was placed in an oven at 103° C. until the residual weight remained constant (at least 24 h). Sample was cooled in a desiccator for 1 h and then immediately weighed. Results are expressed in % (g of dry matter per 100 g of sample).

Dry matter (%)=($m3-m1$)/($m2-m1$)×100 m1=weight of the dry aluminium dish (in g)
m2=weight of the aluminium dish with the sample before drying (in g)
m3=weight of the aluminium dish with the sample after drying (in g)

Dry Matter Determination of Food Products

Dry matter content of food products was determined in duplicate after desiccation of 5 g sample at 104° C. for one night.

Ash Determination

Ash content was determined gravimetrically as residue remaining after heating in a high temperature muffle furnace. Moisture was evaporated from sample by oven drying.

2 g of sample were weighed in a dry porcelain crucible previously weighed (precision balance Ohaus, capacity 410 g, sensitivity 0.001 g). The crucible was placed in a muffle furnace at 550° C. for 24 h. The crucible was placed for 1 h in an oven at 103° C. and then in a desiccator for 1 h. After cooling the crucible was weighed. Results are expressed in % (g of ash per 100 g of sample).

Ash (%)=($m3-m1$)/($m2-m1$)×100 m1=weight of the crucible (in g)
m2=weight of the crucible with sample (in g)
m3=weight of the crucible with ash (in g)

Determination of Protein Content by the Dumas Method

The apparatus (Leco FP2000) was calibrated with EDTA marketed by Leco under reference 502092. The Quantities of EDTA weighed for the realization of the calibration ranged from 0.08 g to 0.50 g (0.08 g, 0.15 g, 0.25 g, 0.35 g, 0.40 g, 0.50 g). 0.3 g to 1 g of sample was weighed on a precision balance (Sartorius BP61S, capacity 61 g, sensitivity 0.1 mg) and placed into a ceramic boat. The ceramic boat was automatically placed in an oven at 1200° C. wherein the sample was burnt in a combustion tube by pyrolysis under controlled oxygen flow. Nitrogen compounds are converted to N2 and NOx while other volatile decomposition compounds are retained through adsorbent filters and series of purification regents. All nitrogen compounds are reduced to molecular N, which is quantitatively determined by a thermal conductivity detector. The Nitrogen content was then calculated by a microprocessor.

Results are expressed as a percentage of protein (% N*6.25):

% Nitrogen=g of Nitrogen per 100 g of sample

% protein=% Nitrogen×6.25

Determination of Nitrogen Content in NSI Samples by the Dumas Method

The apparatus (Leco FP2000) was calibrated with a solution of glycine 15 mg/ml (glycine powder marketed by Merck under reference 1.04201.1000). The quantities of the glycine solution 15 mg/ml weighed for the realization of the calibration ranged from 0.1 g to 1.8 g (0.1 g, 0.4 g, 0.7 g, 1.1 g, 1.4 g, 1.8 g). 1 g to 1.8 g of sample was weighed on a precision balance (Sartorius BP61S, capacity 61 g, sensitivity 0.1 mg) and placed into a ceramic boat covered by a nickel insert. The ceramic boat was automatically placed in an oven at 1200° C. wherein the sample was burnt in a combustion tube by pyrolysis under controlled oxygen flow. Nitrogen compounds are converted to N2 and NOx while other volatile decomposition compounds are retained through adsorbent filters and series of purification regents. All nitrogen compounds are reduced to molecular N, which is quantitatively determined by a thermal conductivity detector. The Nitrogen content was then calculated by a microprocessor.

Results are expressed as a percentage of Nitrogen:

% Nitrogen=g of Nitrogen per 100 g of sample

Determination of Nitrogen Solubility Index (NSI)

After dispersion of proteins in demineralized water, nitrogen solubility index was determined by measuring the ratio between the percentage of nitrogen in the supernatant after centrifugation and the percentage of nitrogen in the starting suspension. The method was used on a protein extract powder with a dry matter content of 90 to 99% (weight basis) and was done in the month after drying of the protein extract. The measurement was done at room temperature.

9.0 g of sample were introduced in a 400 ml beaker and made up to 300 g (balance Ohaus ARC120, sensitivity 0.01 g, capacity 3100 g) with demineralized water at room temperature. The suspension was homogenized with a spoon and then stirred for 5 minutes on a stirring plate (Stuart US151) at intensity 4. 10 ml of the starting suspension were collected and analyzed for the nitrogen content on a protein analyzer Leco FP 2000. The suspension was split into two beakers of 150 ml, the pH was raised in one and decreased in the other. The pH of the suspension was adjusted to pH 3.5, 4.5, 5.5, 6.5, 7 and 8 with HCl 1N or NaOH 1N (pH-meter WTW pH/Cond 340i/SET). For each pH adjustment, the pH value was recorded once stabilized and 10 ml of the suspension were collected in a 10 ml centrifuge tube. Aliquots of the suspension at different pH were centrifuged 15 min at 6000 rpm (centrifuge ALC 4239 R). The different supernatants were collected and analyzed for the nitrogen content on a protein analyzer Leco FP 2000. For each tested pH, the nitrogen solubility index was calculated according to the following expression:

% Nitrogen solubility index=% Nitrogen in supernatant/% Nitrogen in starting solution×100

Determination of Isoelectric pH of the Protein Comprising Fraction 300 g of protein comprising fraction having a protein content of 1 wt % based on the total weight of the protein comprising fraction were introduced in a 400 ml beaker at room temperature. The suspension was stirred for 5 minutes on a stirring plate (Stuart US151) at intensity 4. 10 ml of the starting suspension were collected and analyzed for the nitrogen content on a protein analyzer Leco FP 2000. The suspension was split into two beakers of 150 ml, the pH was raised in one and decreased in the other. The pH of the suspension was adjusted to pH 3.5, 3.75, 4.0, 4.25, 4.5, 4.75, 5.0, 5.25, 5.5, 5.75, 6.0, 6.25, 6.5, 6.75, and 7.0 with HCl 1N or NaOH 1N (pH-meter WTW pH/Cond 340i/SET). For each pH adjustment, the pH value was recorded once stabilized and 10 ml of the suspension were collected in a 10 ml centrifuge tube. Aliquots of the suspension at different pH were centrifuged 15 min at 6000 rpm (centrifuge ALC 4239 R). The different supernatants were collected and analyzed for the nitrogen content on a protein analyzer Leco FP 2000. For each tested pH, the nitrogen solubility index was calculated according to the following expression:

% Nitrogen solubility index=% Nitrogen in supernatant/% Nitrogen in starting solution×100

The isoelectric pH was determined as the pH at which the nitrogen solubility index was the lowest.

Sugar Determination

Sample was prepared with a centrifuge eppendorf Centrifuge 5417R and with Centrifugal Devices NANOSEP 100 k OMEGA.

Peas or peas suspension were milled with a blender, Magic Bullet, Homeland Housewares.

When a sample of the aqueous composition excluding peas was analyzed, a sample was taken directly from the fermentation vessel. The sample was diluted 20 times (1 g of pea juice in 19 g of deionized water) with deionized water (conductivity <15 µS). 0.5 ml of this dilution was placed in a filtering eppendorf and centrifuged at 14000 rpm during 10 minutes. The filtrate was then used for sugar analysis.

When a sample of peas was prepared, a whole peas were taken from the fermentation vessel. Peas were drained in a strainer and then laid on absorbent paper during two minutes in order to remove juice excess. Peas were milled during one minute. The milled peas were suspended (1 g of peas in 9 g of deionized water) in deionized water (conductivity <15 µS). The suspension was then milled with the blender.

The suspension was diluted 8 times (1 g of suspension of pea in 8 g of deionized water) with deionized water (conductivity <15 µS). 0.5 ml of this dilution was placed in a filtering eppendorf and centrifuged at 14000 rpm during 10 minutes. The filtrate was then used for sugar analysis.

A Thermo scientific—Dionex ICS 5000 chromatographic system with chromeleon 6.80 SR11 Build 3161 software has been used for the sugar analysis. Separation was done by a Carbopac PA100 4 mm*250 mm (+ guard) at 40° C. Elution was done with NaOH 40 mM at a flow rate of 1 ml/min. Injection volume was 10 µL. The quadruple pulse detection was used for the PAD detection. Calibration was done with appropriate standard solutions ranging for each of the following sugars:

Concentration of the sugars standard solution (st1, 2, 3 and 4) (mg/l) are given in the below table.

|  | st1 | st2 | st3 | st4 |
|---|---|---|---|---|
| Glucose | 15.3 | 45.8 | 5.2 | 30.5 |
| Fructose | 3.3 | 7.4 | 1.1 | 5.5 |
| Saccharose | 99.9 | 200.5 | 50.1 | 150.0 |
| Raffinose | 15.3 | 45.1 | 5.0 | 30.6 |
| Stachyose | 75.0 | 159.7 | 40.0 | 119.7 |
| Verbascose | 57.0 | 118.6 | 37.9 | 85.0 |

Acidity Measurement

Acidity was measured with a pH meter WTW SERIES Inolab Termil 740. The apparatus was calibrated with buffer solutions at pH 4.01 (WTW pH 4.01 Technical Buffer, Model STP4, Order no 108706) and at pH 7 (WTW pH 7.00 Technical Buffer, Model STP7, Order no 108708).

Peas or peas suspension were milled with a blender, Magic Bullet, Homeland Housewares.

When the acidity of the "pea juice" was measured, a sample (A) was taken directly from the fermentation vessel. The sample (A) was weighed. 1 mol/L sodium hydroxide solution (C) (no 1.09137.1000 TitriPURR; Density=d=1.04 kg/l) was added slowly until the pH of the sample was stabilized at pH 7 during at least two minutes. The mass of sodium hydroxide (B) was then calculated.

$$Acidity(mEq/kg)=(B*(C/d)/A)*1000$$

When the acidity of the peas was measured, whole peas were taken from the fermentation vessel. Peas were drained in a strainer and then laid on absorbent paper during two minutes in order to remove juice excess. Peas were milled during one minute. Milled peas were suspended (1 g of peas in 9 g of deionized water) in deionized water (conductivity <15 µS). The suspension was then milled with the blender. A pea suspension was obtained.

An exact amount of the pea suspension (A') was weighed. 1 mol/L sodium hydroxide solution (C') (no 1.09137.1000 TitriPURR; Density=d=1.04 kg/l) was added slowly until the pH of the suspension was stabilized at pH 7 during at least two minutes. The mass of sodium hydroxide (B') was then calculated.

$$Acidity(mEq/kg)=(B'*(C'/d)/(A'/10))*1000$$

Determination of Viscosity with the Viscometer Brookfield DVII

The determination of a protein suspension viscosity with a viscometer Brookfield DVII is the measure of its resistance to flow imposed by the rotation of a cylindrical probe. This resistance causes the twist of a spring fixed to the sensor of a drive system. The value of viscosity, expressed in centiPoise (cP), is proportional to the percentage of torsion indicated by the viscometer and to a multiplicative factor depending on the used probe and its rotation speed. The method was used on a protein extract powder with a dry matter content of 90 to 99% (weight basis) and was done in the month after drying of the protein extract. The measurement was done at room temperature.

A suspension of 13.5% proteins (weight basis) was prepared. 75 g of sample were weighed (balance Ohaus ARC120, sensitivity 0.01 g, capacity 3100 g) in a 250 ml beaker and the necessary amount of demineralized water was weighed in a 1 L plastic beaker, both at room temperature. The powder was suspended in water under mechanical stirring (IKA, EURO-ST.P CV) at 700 rpm for 5 minutes with the use a dissolver 80 cm diameter (marketed by Roth under reference A322.1). The pH of the suspension was measured under stirring (pH-meter WTW pH/Cond 340i/SET). The agitation was stopped for 3 minutes and the viscosity of the suspension was measured at three different locations with a viscometer Brookfield DVII+Pro at speed 50 rpm. The probe used for the measure was chosen between SO1 to SO7 such that the percentage of torsion was between 20% and 80%. The viscosity value was recorded after 4 seconds of probe rotation. The suspension was placed again under mechanical stirring for 5 minutes at 700 rpm during which the pH was adjusted to 6.4 with HCl 3N. The agitation was stopped for 3 minutes and the viscosity of the suspension was measured in the same way as previously. Similarly, the viscosity of the suspension was measured at pH 6.2, 6.0 and 5.8 after 5 min of stirring at 700 rpm and 3 minutes of rest.

When the initial pH of the suspension at 13.5% of proteins was equal to or below 5.8, the pH was raised to pH 7.5 with NaOH 3N, instead of being decreased with HCl 3N.

Determination of Bulk and Tapped Density

The bulk density of a powder is the ratio of the mass of an untapped powder sample and its volume including the contribution of the interparticulate void volume. The tapped density was obtained by mechanically tapping a graduated cylinder containing the powder sample. Bulk and tapped density are expressed in grams per milliliter (g/ml). The method was used on protein extract powder and the measurement was done at room temperature. 60 g of powder were weighed in a graduated cylinder of 250 ml (balance Ohaus ARC120, sensitivity 0.01 g, capacity 3100 g). The powder volume before shaking was measured. The bulk density was calculated as follows:

Bulk density=$m/V1$ m=mass of protein extract powder (expressed in g)
V1=Volume of untapped powder (expressed in ml)
60 g of powder was weighed in a graduated cylinder of 250 ml (balance Ohaus ARC120, sensitivity 0.01 g, capacity 3100 g). The graduated cylinder was placed in the center of a settling apparatus (Retsch) and shaken for 12 minutes on intensity 60. The powder volume after shaking was measured. The tapped density was calculated as follows:

Tapped density=$m/V2$ m=mass of protein extract powder (expressed in g)
V2=Volume of tapped powder (expressed in ml)

Gel Strength Determination

The gel strength was determined by the maximum resistance of a gel to a compression applied by a probe directed by a texture analyzer. The formation of a protein gel consisted of making a protein suspension which was subjected to heat treatment followed by cooling. Gel strength was expressed either in g or N. The method was used on a protein extract powder with a dry matter content of 90 to 99% (weight basis) and was done in the month after drying of the protein extract. The measurement was done at room temperature.

A suspension of 13.5% proteins (weight basis) was prepared. 75 g of sample were weighed (balance Ohaus ARC120, sensitivity 0.01 g, capacity 3100 g) in a 250 ml beaker and the necessary amount of demineralized water was weighed in a 1 L plastic beaker, both at room temperature. The powder was suspended in water under mechanical stirring (IKA, EURO-ST.P CV) at 700 rpm for 10 minutes exactly with the use of a dissolver 80 cm diameter (marketed by Roth under reference A322.1). Meanwhile, the pH of the suspension was adjusted to 6.0 with HCl 3N or NaOH 3N according to the initial pH of the suspension (pH-meter WTW pH/Cond 340i/SET). The suspension was poured into two 220 ml glass jars which were placed in a water bath at 80° C. for 1 h. The glass jars were cooled for 10 min in a water bath at room temperature and then placed for 16 h in a cold room at 4° C. The glass jars were placed at room temperature for 15 min so as to bring them to room temperature. The gel strength was measured on a Texture Analyzer TA-XT2i (Stable Micro Systems, Ltd) with a Compression load cell of 5 kg and a conical probe (P45C Cone 45° Perspex). The gel strength was the maximum force recorded at the end of the penetration, expressed in g.

TA XT2i settings:
Measure force in compression—Hold until time
Pre-test speed: 2 mm/s
Test speed: 1 mm/s
Post test speed: 1 mm/s
Distance of penetration: 35 mm
Trigger type: Auto—3 g
Time 10 s Powder Flowability Measurement The rheological behavior of a powder is characterized by measurement of resistance to flow. The flowability was measured with a Brabender Micro Visco Amylograph (MVA). 20 g of sample were weighed (balance Ohaus ARC120, sensitivity 0.01 g, capacity 3100 g) in the measuring bowl of the apparatus. The measure was run for 5 min at 20° C. using a cooling water bath. The bowl rotation speed was set to 75 rpm and the measurement range to 70 cmg. The apparatus measured the force required to maintain the rotational speed of the bowl at 75 rpm. Results corresponded to the average of the measurements recorded during the last minute of the test and are expressed in Brabender unit (BU). The lower the result, the higher the powder's free-flowing.

Wettability Determination

The wettability is defined as the time in seconds required for all the particles of a powder to become wetted when placed on the surface of water. A powder sample is considered wetted when it has sunk below the water surface or has a wet appearance. 1 g of powder sample was weighed in a glass cup. 100 ml of demineralized water at room temperature were introduced in a 250 ml beaker (height 9 cm, diameter 7 cm). The test portion was poured from the glass cup to the surface of the water. The time was recorded from the beginning of the transfer of the powder until all the particles have become wetted. Results are expressed in seconds.

Color Measurement

L*a*b* coordinates were measured at 20° C. using a Chroma meter CR5 (Konica Minolta TA Sensing, Europe). L* denotes lightness on a 0-100 scale from black to white; a*, (+) red or (−) green; and b*, (+) yellow or (−) blue.

Apparatus:
Chromameter CR5 (Konica Minolta TA Sensing Europe).
Petri-dish CR-A502

Procedure: Preparation of Sample
the Petri-dish was filled with the sample to analyze in a uniform surface.

Method
the Petri-dish was placed on the apparatus at the place specifically reserved and start the analysis Results
L* a*b* values are given by the Chromameter (average of 3 measurements).

Water Activity

Water activity is a measure of the energy status of the water in a system. It is defined as the vapor pressure of water in a substance divided by that of pure water at the same temperature; therefore, pure distilled water has a water activity of exactly one. Water activity (aw) determination was carried out using Rotronic Hygroskop DT, Krautli.

A cell was filled with the sample to be characterized and placed in the measurement chamber (Rotronic Hygroskop DT, Krautli). After stabilization, water activity value was recorder.

Sensory Analysis for Proteins in Solution

Sensory evaluation was conducted by a 5-member trained panel. Training of the panelists was based on the recognition of 6 characteristics (sweetness, bitterness, metallic taste, saltiness, acidity, umami and astringency). A descriptive analysis was performed based on 4% dispersions. After discussion to reach a consensus, the descriptive terms that were most important for characterizing the appearance, texture and flavor of the solutions were selected.

Sensory Analysis for Baked Goods

Sensory evaluation was conducted by a 5-member trained panel. Training of the panelists was based on the recognition of 6 characteristics (sweetness, bitterness, metallic taste, saltiness, acidity, umami and astringency). A descriptive analysis was performed on the finished products. After discussion to reach a consensus, the descriptive terms that were most important for characterizing the appearance, texture and flavor of the products were selected.

Spreadability in the Oven:

Biscuits spreadability was determined by measuring the length and the width of 20 biscuits with a caliper. The average valued was then determined and expressed in mm.

Biscuit Hardness:

Biscuit hardness is defined as the force required for breaking a biscuit by a knife. Biscuit hardness was assessed by Texture Analyzer Ta-XT2i.

Apparatus:
  Texture Analyzer TA-XT2i (Stable Micro Systems, Ltd)
  Compression load cell, 25 kg
  Blade set with knife (HDP/BSK)
Procedure:
  Position upper crosshead limit so that Warner Bratzler blade is 1 mm above the surface of the sample
  TA-XT2i settings:
  Measure force in compression—Return to start
  Pre-test speed: 3 mm/s
  Test speed: 2 mm/s
  Post-test speed: 10 mm/s
  Distance of penetration: 5 mm
  Trigger type: Auto—3 g
  Penetration test begin. Results were recorded by Texture Analyzer and plotted into a graph
Results
  Biscuit hardness was the maximum force recorded during the test (expressed as "max force"). Test results were obtained from 20 samples and the average value was calculated.

Biscuit Crispness:

Biscuit crispness is defined as the number of peaks recorded during the compression of a biscuits by a punch. Biscuit crispness was assessed by Texture Analyzer Ta-XT2i as described below.

Apparatus:
  Texture Analyzer TA-XT2i (Stable Micro Systems, Ltd)
  Compression load cell, 25 kg
  Punch T1 (9 cm length-0.5 cm diameter)
Procedure:
  Position upper crosshead limit so that the punch is 1 mm above the surface of the sample
  TA-XT2i settings:
  Measure force in compression—Return to start
  Pre-test speed: 2 mm/s
  Test speed: 0.1 mm/s
  Post-test speed: 5 mm/s
  Distance of penetration: 4 mm
  Trigger type: Auto—3 g
  Penetration test begin. Results were recorded by Texture Analyzer and plotted into a graph
Results
  Biscuit crispness was the number of peaks recorded during the test (expressed as "crispness"). Test results were obtained from 20 samples and the average value is calculated.

Leavening Index for Fermented Dough

This test evaluates the capacity of a bread dough to be developed during fermentation:

After kneading, the dough was taken out of the kneader and left resting for 10 minutes. 7 small loaves (30-g each) were taken and rounded into small balls (by hands). After shaping they were placed in graduated glasses. Initial height was noted (Vi). The graduated glass was placed in a leavening cabinet at 32° C./100% relative humidity for 35 minutes. At the end of the proofing, glasses were removed from the cabinet and final height after proofing was noted (Vf).

Leavening index (LI) was the difference in volume between the beginning and the end of the proofing:

$$LI=(Vf-Vi)\times 3.14\times r^2 \text{ (where } r \text{ is the radius of the graduated glass)}$$

Breadcrumb Hardness

Crumb hardness was carried out in a Texture Analyzer (TA XT2i, Stable Micro Systems, UK). Two 12.5 mm-thick slices were compressed with a 36 mm-diameter cylindrical stainless steel probe, up to 50% penetration (distance=6 mm) of its original height at a crosshead speed of 1 mm/s speed.

Apparatus:
  Texture Analyzer TA-XT2i (Stable Micro Systems, Ltd)
  Compression load cell, 5 kg
  Probe P36R dia radius aluminium AACC
Procedure:
  Position upper crosshead limit so that the probe is 1 mm above the surface of the sample
  TA-XT2i settings:
  Measure force in compression—Return to start
  Pre-test speed: 1 mm/s
  Test speed: 1.7 mm/s
  Post test speed: 10 mm/s
  Distance of penetration; 6 mm
  Trigger type: Auto—5 g
  Penetration test begin. Results were recorded by Texture Analyzer and plotted into a graph.
Results
  Breadcrumb hardness was defined as the force after 2.21 s (expressed as "breadcrumb hardness" in g)
  Test results were obtained from 20 samples and the average value was calculated.

Bread Volume

Bread volume was determined by the rapeseed displacement method (AACC Standard 10-05) in five replicates. The average specific volume (volume/weight) was calculated.

Bars Hardness

Bars hardness was defined as the maximum force recorded during the compression of the bars by a punch. Bars hardness was assessed by Texture Analyzer Ta-XT2i as described below.

Apparatus:
  Texture Analyzer TA-XT2i (Stable Micro Systems, Ltd)
  Compression load cell, 5 kg
  Punch 52 mm length—5.7 mm diameter)

Procedure:
  Position upper crosshead limit so that the punch is 1 mm above the surface of the sample
  TA-XT2i settings:
  Measure force in compression—Return to start
  Pre-test speed: 2 mm/s
  Test speed: 0.5 mm/s
  Post-test speed: 5 mm/s
  Distance of penetration: 10 mm
  Trigger type: Auto—3 g
  Penetration test begin. Results were recorded by Texture Analyzer and plotted into a graph Results
  Bars hardness was the maximum force recorded during the test (expressed as "bars hardness")
  Test results were obtained from 12 samples and the average value was calculated.

Example 1

Method for Extracting Pea Proteins According to an Embodiment of the Present Invention This example was performed following the protocol as schematically represented in FIG. 1.

Step 1—Preparation of the Pea Protein Concentrates:

Peas harvested dry, herein referred as "dry peas" (having a dry matter content (based on weight) of about 87.7%) were sieved and destoned by passage through a destoner. Subsequently, the peas were dehulled in a dehuller.

The peas were next subjected to fermentation with lactic acid bacteria (with *Lactobacillus fermentum*). Hereto the peas were soaked in drinkable water in a batchwise fashion. The drinkable water was well water treated so as to be safe for human consumption in accordance with European directive 98/83/CE. In subsequent batches, part of the fermentation medium (aqueous phase excluding peas) of a previous batch was used as an inoculum to effect subsequent fermentation. Peas were subjected to fermentation in the presence of $10^8$ cfu of lactic acid bacteria per ml of aqueous composition comprising peas. 400 kg of peas per m$^3$ of total volume of aqueous composition comprising peas were placed in a vessel. Fermentation was effected anaerobically in a closed vessel without degassing at a temperature of 40° C., until a pH in the peas of 4.2 was reached. During fermentation, the aqueous phase in the fermentation vessel was recirculated at about 20 m$^3$/hour. The peas were fermented for a duration of about 540 min. At the end of fermentation, the peas had absorbed water in a quantity of about their initial mass before fermentation and had a dry matter content of about 45% (based on weight).

After fermentation, the peas were removed from the fermentation medium. The peas were then placed in a perforated rotating drum and washed to remove the remaining fermentation medium. After cleaning, the peas were subjected to wet milling. During milling, additional drinkable water was added such that the final composition had a dry matter content of about 25% (on weight basis). During the milling step, the pH was adjusted to about 8.0 by addition of sodium hydroxide.

After milling, the milled pea paste was subjected to centrifugal decantation. The supernatant containing proteins and soluble impurities (also referred herein as aqueous composition comprising pea proteins) had a dry matter content of about 4% (on weight basis).

The aqueous composition comprising pea proteins was subsequently subjected to heat treatment at 75° C. for 15 sec in a plate heat exchanger.

Subsequently, the pea proteins were concentrated by isoelectric precipitation. Hereto, the pH of the aqueous composition comprising pea proteins was adjusted to 4.7 with sulfuric acid. Separation of the precipitated/aggregated proteins was performed by centrifugal decantation. The resulting pea proteins concentrate was obtained as an aqueous slurry having a dry matter content of about 25% (based on weight). Drinkable water was added until a dry matter content of 13% was reached (based on weight).

Step 2—Preparation of Pea Protein Extracts from the Concentrates of Step 1:

Next, the pH of the aqueous slurry was adjusted to pH 5.3 with sodium hydroxide. The slurry was then subjected to heat treatment by heating to about 90° C. by means of plate heat exchanger and maintaining the aqueous slurry at a temperature of about 90° C. for 7 min.

Finally, the aqueous slurry was spray dried. The inlet temperature of the spray dryer was about 190° C. and the outlet temperature was about 72° C.

Example 2

The Effect of Acidification and Heat Treatment on the Properties of the Pea Protein Extracts Step 1—Preparation of the Pea Protein Concentrates:

Peas harvested dry, herein referred as "dry peas" (having a dry matter content (based on weight) of about 87%) were sieved and destoned by passage through a destoner. Subsequently, the peas were dehulled in a dehuller.

The peas were next subjected to fermentation with lactic acid bacteria (with *Lactobacillus fermentum*). Hereto the peas were soaked in drinkable water in a batchwise fashion. In subsequent batches, part of the fermentation medium (aqueous phase excluding peas) of a previous batch was used as an inoculum to effect subsequent fermentation. Peas were subjected to fermentation in the presence of $10^8$ cfu of lactic acid bacteria per ml of aqueous composition comprising peas. 400 kg of peas per m$^3$ of total volume of aqueous composition comprising peas were placed in a vessel. Fermentation was effected anaerobically in a closed vessel without degassing at a temperature of 40° C., until a pH in the peas of 4.6 was reached. During fermentation, the aqueous phase in the fermentation vessel was recirculated at about 20 m$^3$/hour. The peas were fermented for a duration of about 480 min. At the end of fermentation, the peas had absorbed water in a quantity of about their initial mass before fermentation and had a dry matter content of about 47% (based on weight).

After fermentation, the peas were removed from the fermentation medium. The peas were then placed in a perforated rotating drum and washed to remove the remaining fermentation medium. After cleaning, the peas were subjected to wet milling. During milling, additional drinkable water was added such that the final composition had a dry matter content of about 27% (on weight basis). During the milling step, the pH was adjusted to about 8 by addition of sodium hydroxide.

After milling, the milled pea paste was subjected to centrifugal decantation. The supernatant containing proteins and soluble impurities (also referred herein as aqueous composition comprising pea proteins) had a dry matter content of about 4.5% (on weight basis).

The aqueous composition comprising pea proteins was subsequently subjected to heat treatment at 75° C. for 15 sec in a plate heat exchanger.

Subsequently, the pea proteins were concentrated by isoelectric precipitation. Hereto, the pH of the aqueous composition comprising pea proteins was adjusted to 4.7 with sulfuric acid. Separation of the precipitated/aggregated proteins was performed by centrifugal decantation. The resulting pea proteins concentrate was obtained as an aqueous slurry having a dry matter content of about 25% (based on weight).

Step 2—Preparation of Pea Protein Extracts from the Concentrates of Step 1. Different Pea Protein Extracts were Prepared Starting from the Above Described Pea Proteins Concentrate Extract (A) was obtained by adjusting the dry matter content of the aqueous slurry obtained in step 1 to about 15% (on weight basis) after water addition; followed by the adjustment of the pH of the slurry with sodium hydroxide until a pH of about 7.5 was reached; and after heating at a temperature of about 98° C., the temperature was maintained at about 95° C. for about 6.5 minutes; and then the slurry was spray dried so as to obtain a powder having a dry matter content of about 95% (weight basis).

Extract (B) was obtained by adjusting the dry matter content of an aqueous slurry prepared as described in step 1 to about 12.5% (weight basis); and spray drying said aqueous slurry with no adjustment of the pH (pH remained at 4.7) and no subsequent heat treatment.

Extract (C) was obtained by adjusting the dry matter content of an aqueous slurry prepared as described in step 1 to about 12.5% (weight basis); followed by a heat treatment of the slurry at a temperature of about 90° C. for about 7 minutes with no adjustment of the pH (pH remained at 4.5), and then spray drying the aqueous slurry so as to obtain powder having a dry matter content of about 95% (weight basis).

Extract (D) was obtained by adjusting the dry matter content of an aqueous slurry prepared as described in step 1 to about 12.5% (on weight basis) after water addition; followed by the adjustment of the pH of the slurry with sodium hydroxide until a pH of about 5.4 was reached; and subsequent heat treatment at a temperature of about 90° C. for about 7 minutes, and by then spray drying the slurry so as to obtain a powder having a dry matter content of about 95% (weight basis).

The gel strength, tapped and bulked density, flowability and wettability of the protein extracts (A) to (D) were measured. The results are shown in Table 2.

Figure 2:
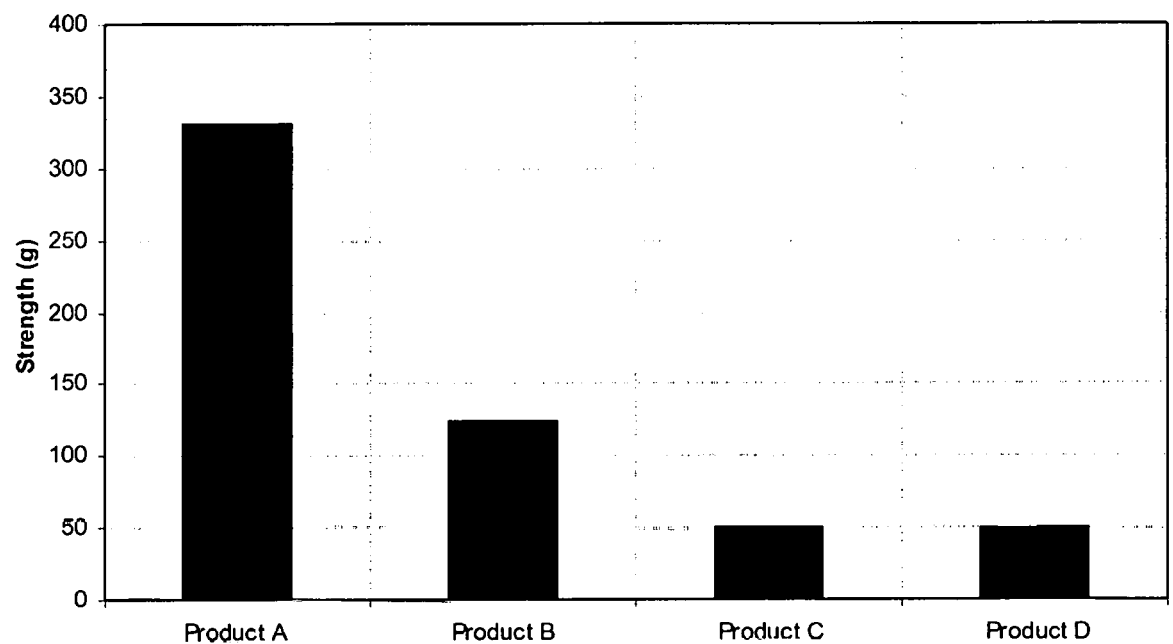
FIG. 2 represents a graph plotting the gel strength at pH 6 of each extract (A) to (D).

The gel strength at pH 6 is represented in FIG. 2.

TABLE 2

| Extract Units | pH — | Gel strength (pH 6) (g) | Tapped density (kg/L) | Bulk density (kg/L) | Flowability (Brabender unit) | Wettability (sec) |
|---|---|---|---|---|---|---|
| A | 7.7 | 330 | 0.4 | 0.3 | 2000 | >600 |
| B | 4.7 | 125 | 0.8 | 0.6 | 377 | 19 |
| C | 4.7 | <50 | 0.6 | | 250 | 20 |
| D | 5.6 | <50 | 0.7 | | 650 | — |

Figure 3:
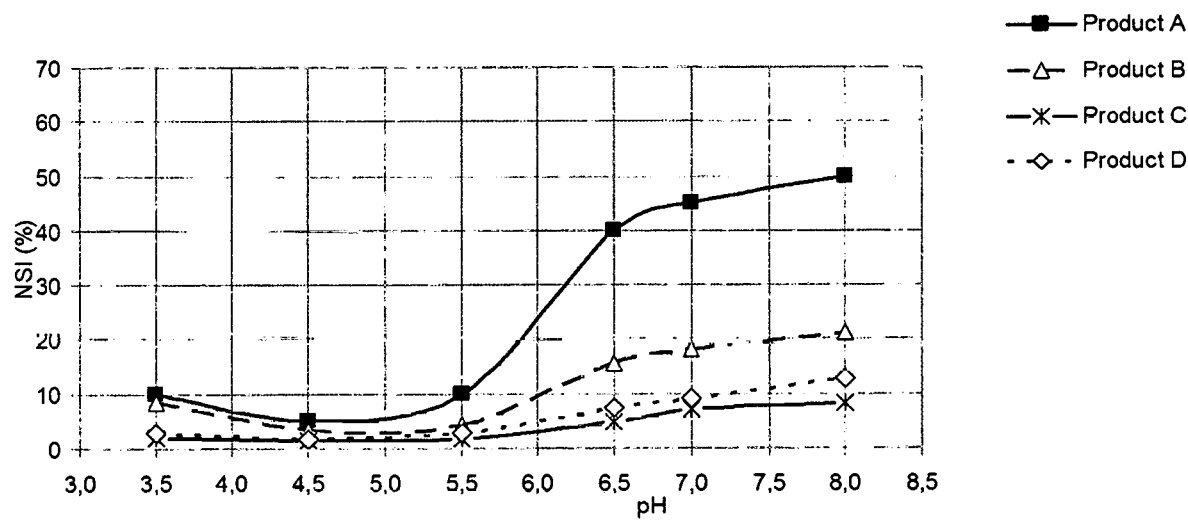
FIG. 3 represents a graph plotting the nitrogen solubility index profile as a function of the pH for each extract (A) to (D).

The nitrogen solubility index (NSI) of each extract as a function of pH is given in Table 3 and shown in FIG. 3.

TABLE 3

| | Nitrogen solubility index (%) | | | | | |
|---|---|---|---|---|---|---|
| Product | pH 3.5 | pH 4.5 | pH 5.5 | pH 6.5 | pH 7 | pH 8 |
| A | 10 | 3 | 6 | 40 | 45 | 50 |
| B | 8.4 | 3.5 | 4.1 | 16.7 | 18.2 | 21.2 |
| C | 2 | 1 | 2 | 5 | 7 | 8 |
| D | 2.9 | 1.6 | 2.8 | 7.4 | 9.0 | 12.7 |

Figure 4:
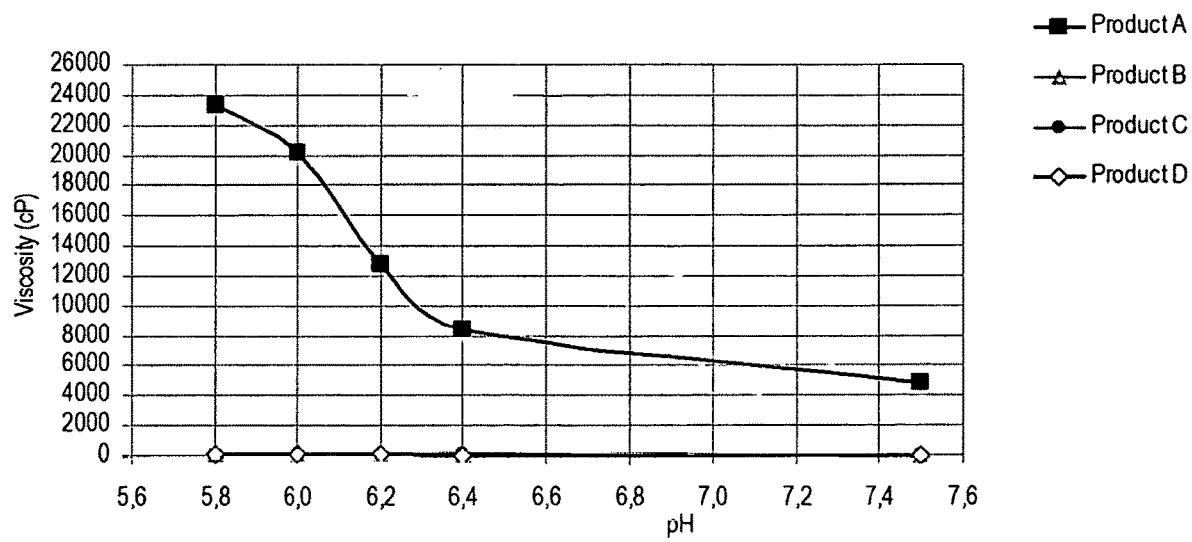
FIG. 4 represents a graph plotting the viscosity profile expressed as a function of the pH for each extract (A) to (D).

The viscosity measured for each extract at different pH is given in Table 4 and the viscosity profile is shown in FIG. 4.

TABLE 4

| | Viscosity (cP) | | | | | |
|---|---|---|---|---|---|---|
| Product | pH 7.5 | pH 6.4 | pH 6.2 | pH 6 | pH 5.8 | pH 4 |
| A | 4800 | 8400 | 12800 | 20200 | 23300 | 600 |
| B | 20 | 63 | 69 | 78 | 108 | 523 |
| C | 27 | 69 | 89 | 98 | 133 | — |
| D | 46 | 56 | 64 | 68 | 80 | — |

Example 3

Characterization of an Extract According to an Embodiment of the Invention

Step 1—Preparation of the Pea Protein Concentrates:

Peas harvested dry, herein referred as "dry peas" (having a dry matter content (based on weight) of about 87%) were sieved and destoned by passage through a destoner. Subsequently, the peas were dehulled in a dehuller.

The peas were next subjected to fermentation with lactic acid bacteria (with *Lactobacillus fermentum*). Hereto the peas were soaked in drinkable water in a batchwise fashion. In subsequent batches, part of the fermentation medium (aqueous phase excluding peas) of a previous batch was used as an inoculum to effect subsequent fermentation. Peas were subjected to fermentation in the presence of $10^8$ cfu of lactic acid bacteria per ml of aqueous composition comprising peas. 400 kg of peas per $m^3$ of total volume of aqueous composition comprising peas were placed in a vessel. Fermentation was effected anaerobically in a closed vessel without degassing at a temperature of about 40° C., until a pH in the peas of 4.7 was reached. During fermentation, the aqueous phase in the fermentation vessel was recirculated at about 20 $m^3$/hour. The peas were fermented for a duration of about 430 min. At the end of fermentation, the peas had absorbed water in a quantity of about their initial mass before fermentation and had a dry matter content of about 47% (based on weight).

After fermentation, the peas were removed from the fermentation medium. The peas were then placed in a perforated rotating drum and washed to remove the remaining fermentation medium. After cleaning, the peas were subjected to wet milling. During milling, additional drinkable water was added such that the final composition had a dry matter content of about 25% (on weight basis). During the milling step, the pH was adjusted to about 8 by addition of sodium hydroxide.

After milling, the milled pea paste was subjected to centrifugal decantation. The supernatant containing proteins and soluble impurities (also referred herein as aqueous composition comprising pea proteins) had a dry matter content of about 4% (on weight basis).

The aqueous composition comprising pea proteins was subsequently subjected to heat treatment at 75° C. for 15 sec in a plate heat exchanger.

Subsequently, the pea proteins were concentrated by isoelectric precipitation. Hereto, the pH of the aqueous composition comprising pea proteins was adjusted to 4.8 with sulfuric acid. Separation of the precipitated/aggregated proteins was performed by centrifugal decantation. The resulting pea proteins concentrate was obtained as an aqueous slurry having a dry matter content of about 25% (based on weight).

Step 2—Preparation of Pea Protein Extracts.

Extract (E) was obtained by adjusting the dry matter content of the aqueous slurry obtained in step 1 to about 16% (on weight basis) after water addition; followed by adjustment of the pH of the slurry with sodium hydroxide until a pH of about 7.4 was reached; and subsequent heat treatment at a temperature of about 90° C. for about 7 minutes; and then spray drying the slurry so as to obtain a powder having a dry matter content of about 95% (weight basis).

Extract (F) the pea protein concentrate prepared according to the invention as described in example 1.

Extract (G) was obtained by adjusting the dry matter content of the aqueous slurry obtained in step 1 to about 16% (on weight basis) after water addition; followed by the adjustment of the pH of the slurry with sodium hydroxide until a pH of about 6.1 was reached; and subsequent heat treatment of the slurry at a temperature of about 98° C. for about 7 minutes; and then by spray drying the slurry so as to obtain a powder having a dry matter content of about 95% (weight basis).

The wettability, flowing properties, tapped and bulk densities were measured for each extracts.

The results are given in Table 5.

TABLE 5

|  | wettability (sec) | flowing properties (Brabender unit) | tapped density (g/ml) | bulk density (g/ml) |
|---|---|---|---|---|
| Extract E | >1200 | 2013 | 0.4 | 0.3 |
| Extract F | 22 |  | 0.8 | 0.5 |
| Extract G | 575 | 2215 | 0.4 | 0.3 |

The color of pea protein extracts E, F and G was assessed. The results are shown in Table 6.

TABLE 6

| | Color of the powders | | |
|---|---|---|---|
| | L* | a* | b* |
| Extract E | 86.0 | 3.5 | 21.9 |
| Extract F | 83.7 | 4.6 | 22.1 |
| Extract G | 85.5 | 2.3 | 21.9 |

The pH and gel strength at pH 6 of each extract were measured. The results are shown in Table 7.

TABLE 7

|  | Natural pH | Gel strength pH 6 (g) |
|---|---|---|
| Extract E | 7.8 | 330 |
| Extract F | 5.4 | <50 |
| Extract G | 6.3 | 220 |

Figure 5:
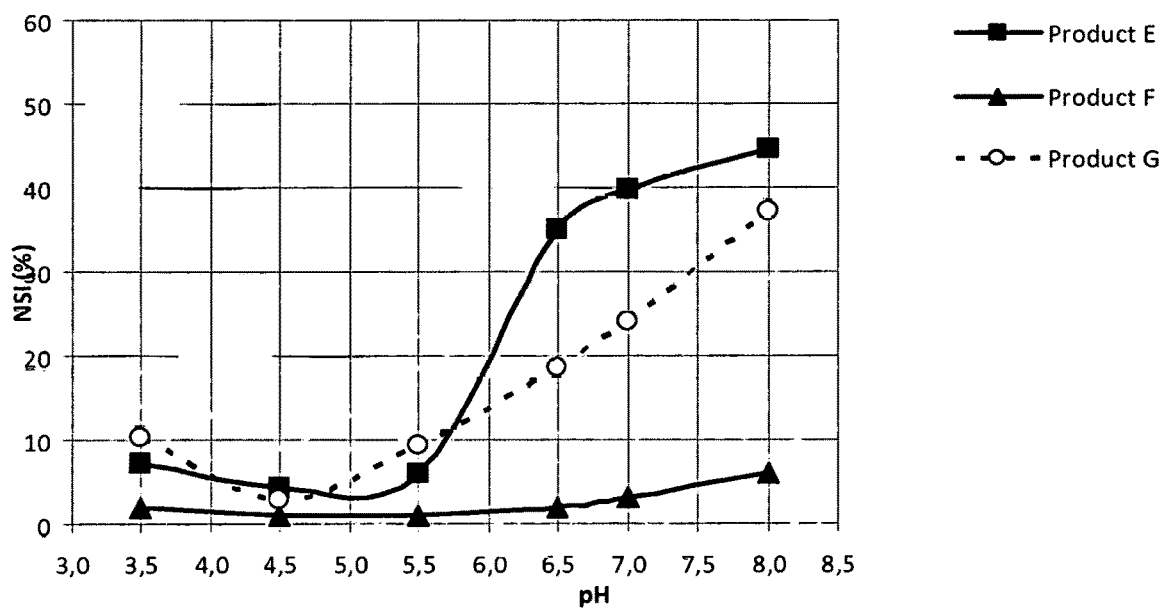
FIG. 5 represents a graph plotting the Nitrogen Solubility Index profile expressed as a function of the pH for each extract E to G.

The nitrogen solubility index (NSI) of each extract as a function of pH is given in Table 8 and is shown in FIG. 5.

TABLE 8

| | Nitrogen solubility index (%) | | | | | |
|---|---|---|---|---|---|---|
| Product | pH 3.5 | pH 4.5 | pH 5.5 | pH 6.5 | pH 7 | pH 8 |
| E | 7.0 | 4.2 | 6.0 | 34.9 | 39.8 | 44.5 |
| F | 2.0 | 1.0 | 1.0 | 2.0 | 3.0 | 6.0 |
| G | 10.3 | 3.0 | 9.2 | 18.5 | 24.0 | 37.2 |

The viscosity measured for each extract at different pH is given in Table 9.

TABLE 9

| | Viscosity (cP) | | | | | |
|---|---|---|---|---|---|---|
| Product | pH 7.5 | pH 6.4 | pH 6.2 | pH 6 | pH 5.8 | pH 4 |
| E | 5779 | 8260 | 9313 | 13227 | 16240 | 905 |
| F | 38 | 52 | 54 | 59 | 65 | 129 |
| G | 1592 | 1769 | 1040 | 1491 | 3893 | 461 |

The sensory characteristic of each extract was determined after dispersion in tap water at 4 wt % and the results are given in Table 10.

TABLE 10

| | Observations |
|---|---|
| Extract E | Slight smell of peas, yellow color, slightly foaming, slightly bitter and astringent. |
| Extract F | Very light smell of peas, very sandy, liquid, bitter, taste quite soft (attack not too strong), not very vegetal |
| Extract G | Pea odor, sandy, slightly astringent, slightly bitter and acid |

Example 4

Use of Pea Proteins According to the Invention in Wine Fining

Wine fining is performed in order to decrease turbidity and to improve brightness and taste.

A solution of positively charged protein (pH<pHi) is added to the wine (pH 2.8 to 4.0). In presence of negatively charged wine particles, electric charges are neutralized and stable hydrophilic colloids became unstable resulting in their precipitation.

Fining agents commonly used in wine filing are gelatin, egg albumin, casein, or vegetable proteins. Fining adjuvants such as silica (silicon dioxide) or tannins are also often used.

Different types of pea proteins were evaluated at two different concentrations (5 g/hl and 10 g/hl) in 12°-alcoholic solutions, pH 3.2, 4° C., in the presence of tannins or $SiO_2$. Absorbance of the solutions was measured after resting (from 1 h to 96 h).

Process was as follows: In a 2 L beaker, 1750 g of water (=1750 ml) was added. A volumetric flask was filled with 250 ml of ethanol 96°. The ethanol was added to the water and thoroughly mixed. The pH of the resulting solution was adjusted to 3.2 with HCl 1M (weight was noted). The tannins or silicon dioxide were added to the solution, mixed thoroughly. The solution was covered, and let to rest for 1 h. The pea proteins were added and that constituted incubation start time (t=0 h). The solution was then stored at 4° C.

Sampling: was preformed as follows; a plastic syringe was filled with 30 ml of the solution, taken in the middle of the beaker without stirring the solution, a cell for measuring the absorbance was filled with the solution. The absorbance at 420 nm was recorded using a spectrometer. The solution was then filtered using a 0.45 μm Whatman filter. The absorbance of the filtrate was measured at 420 nm.

The turbidity was measured using the following equation:

Turbidity=absorbance before filtration−absorbance after filtration

1. Protein Concentrations of 5 and 10 g/Hl with Tannins as Adjuvants

Several solutions were prepared. Tannins were used at a concentration of 0.3 ml/l.

Blanco T (also referred as Control T) was the negative control with tannins (without any fining agents). Tannins was a ready to use solution: Solution ST from Institut Oenologique de Champagne consisting of a solution of tannic acid (CAS number: 1401-55-4) and copper sulfate.

Perle T was the positive control with tannins (also referred as Perle), and further containing as fining agent 0.115 g/hl Colle Perle (hydrolyzed gelatin from Institut Oenologique de Champagne).

Extract E and F as prepared in Example 3 were used as pea proteins.

Solution A comprised Blanco T solution and pea protein from extract E.

Solution B comprised Blanco T solution and pea protein from extract F.

Figure 6:
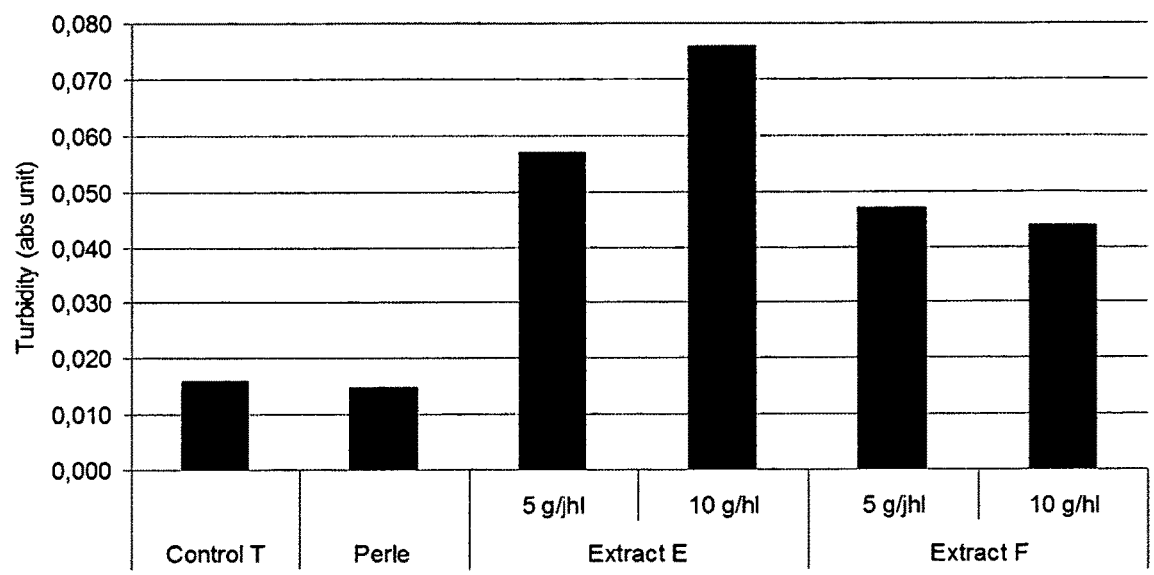
FIG. 6 represents a graph plotting the turbidity of different solutions comprising tannins after incubation for 96 h at 4° C.
Figure 7:
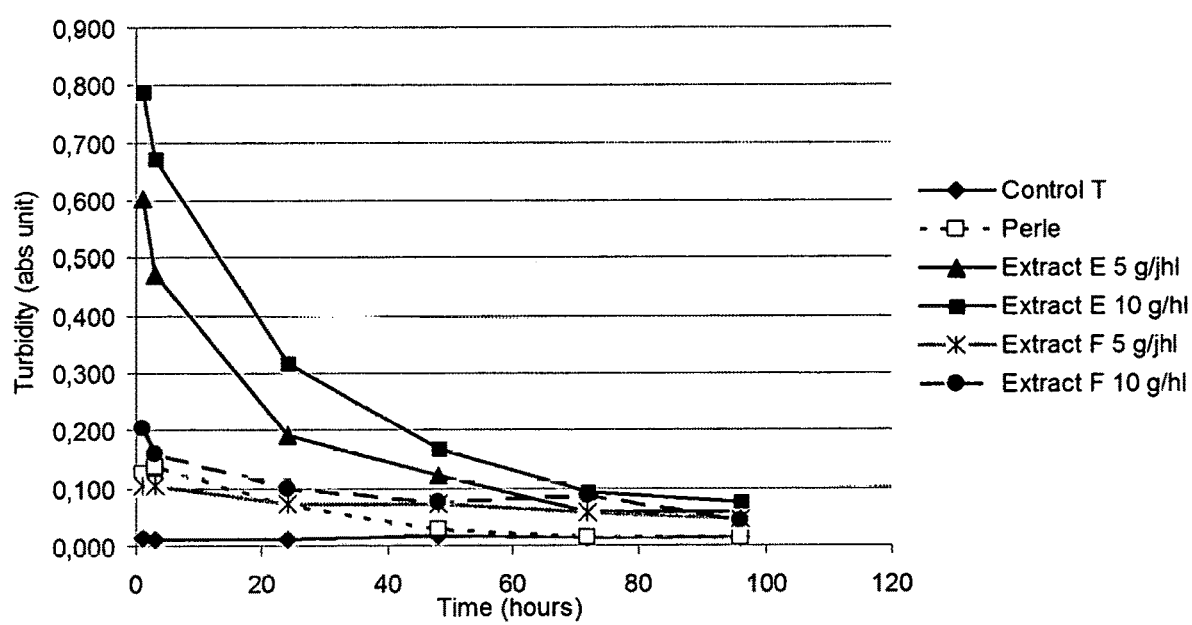
FIG. 7 represents a graph plotting the turbidity of different solutions comprising tannins as a function of incubation time at 4° C.

The turbidity of solutions after different incubation time at 4° C. was measured as described above. The results are shown in Table 11 and FIG. 7. The turbidity of the solutions after 96 h incubation is shown in FIG. 6.

TABLE 11

| (hours) | Blanco T | Perle T | 5 g pea prot/hl | | 10 g pea prot/hl | |
|---|---|---|---|---|---|---|
| | | | A | B | A | B |
| 1 | 0.014 | 0.124 | 0.603 | 0.106 | 0.790 | 0.203 |
| 3 | 0.013 | 0.138 | 0.472 | 0.105 | 0.672 | 0.159 |
| 24 | 0.012 | 0.071 | 0.192 | 0.074 | 0.318 | 0.099 |
| 48 | 0.017 | 0.030 | 0.121 | 0.072 | 0.170 | 0.075 |
| 72 | 0.016 | 0.015 | 0.057 | 0.057 | 0.092 | 0.086 |
| 96 | | | 0.057 | 0.047 | 0.076 | 0.044 |

2. Protein Concentration of 5 g/hl with $SiO_2$ as Adjuvant $SiO_2$ was used at 0.6 ml/l.

Blanco S (also referred as Control S) was the negative control with $SiO_2$ (without any fining agents)

Perle S was the positive control with $SiO_2$ and containing 0.115 g/hl Colle Perle (hydrolyzed gelatin provided by Institut Oenologique de Champagne)

Extract E and F as prepared in Example 3 were used as pea proteins.

Solution A1 comprised Blanco S solution and pea protein from extract E.

Figure 8:
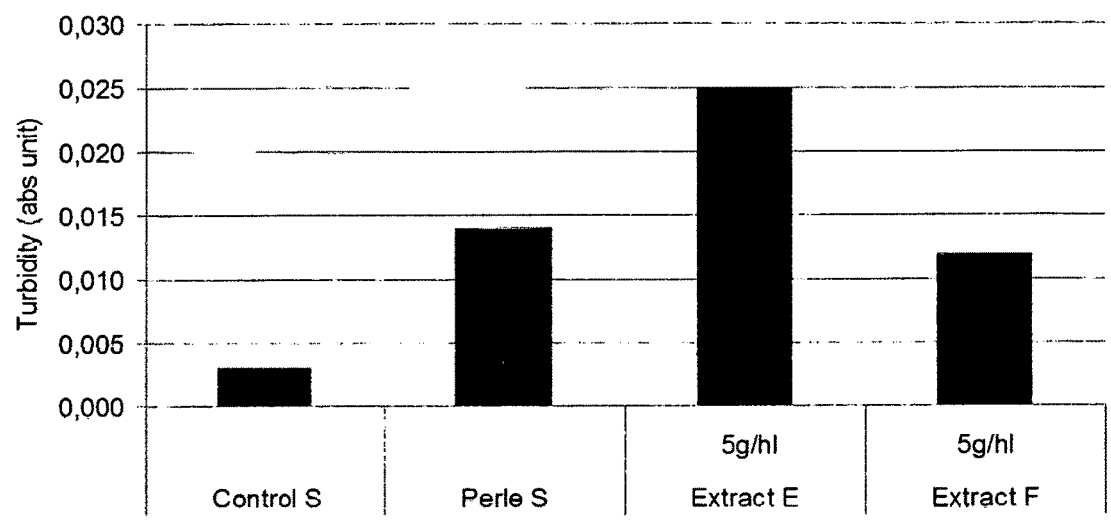
FIG. 8 represents a graph plotting the turbidity of different solutions comprising $SiO_2$ after incubation for 96 h at 4° C.
Figure 9:
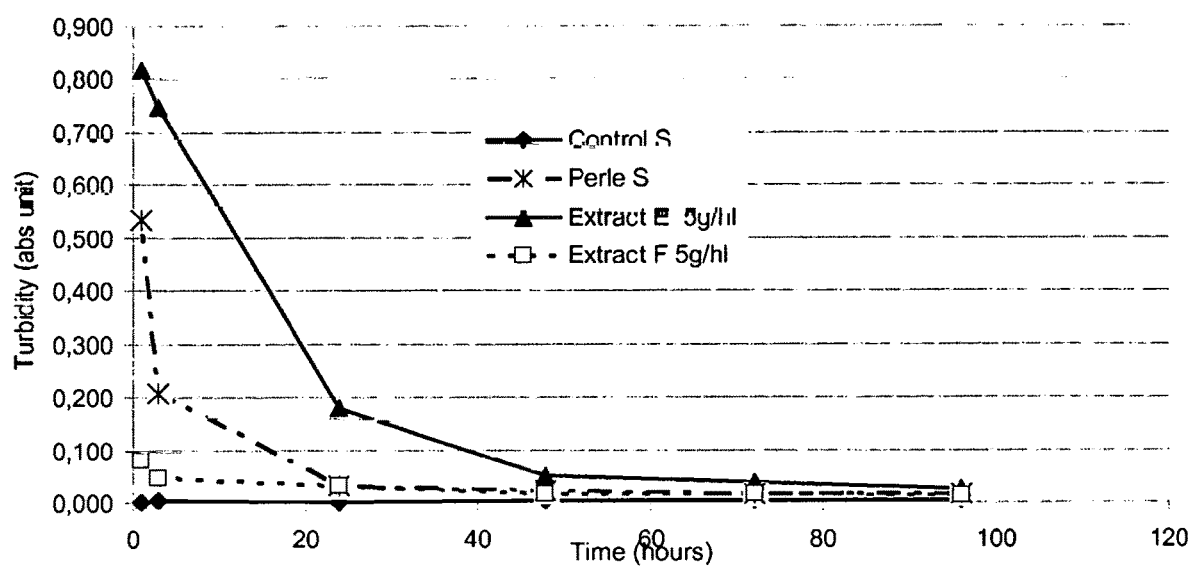
FIG. 9 represents a graph plotting the turbidity of different solutions comprising $SiO_2$ as a function of incubation time at 4° C.

Solution B1 comprised Blanco S solution and pea protein from extract F. The turbidity of the solutions after different incubation time at 4° C. was measured as described above. The results are shown in Table 12 and FIG. 9. The turbidity of the solutions after 96 h incubation is shown in FIG. 8.

TABLE 12

| | | | 5 g pea protein/hl | |
|---|---|---|---|---|
| (hours) | Blanco S | Perle S | A1 | B1 |
| 1 | 0.001 | 0.532 | 0.816 | 0.080 |
| 3 | 0.002 | 0.205 | 0.746 | 0.046 |
| 24 | 0.001 | 0.031 | 0.179 | 0.030 |
| 48 | 0.002 | 0.021 | 0.050 | 0.015 |
| 72 | 0.003 | 0.014 | 0.038 | 0.015 |
| 96 | | | 0.025 | 0.012 |

3. Effect of Adjuvants at Protein Concentration of 5 g/hl

Figure 10:
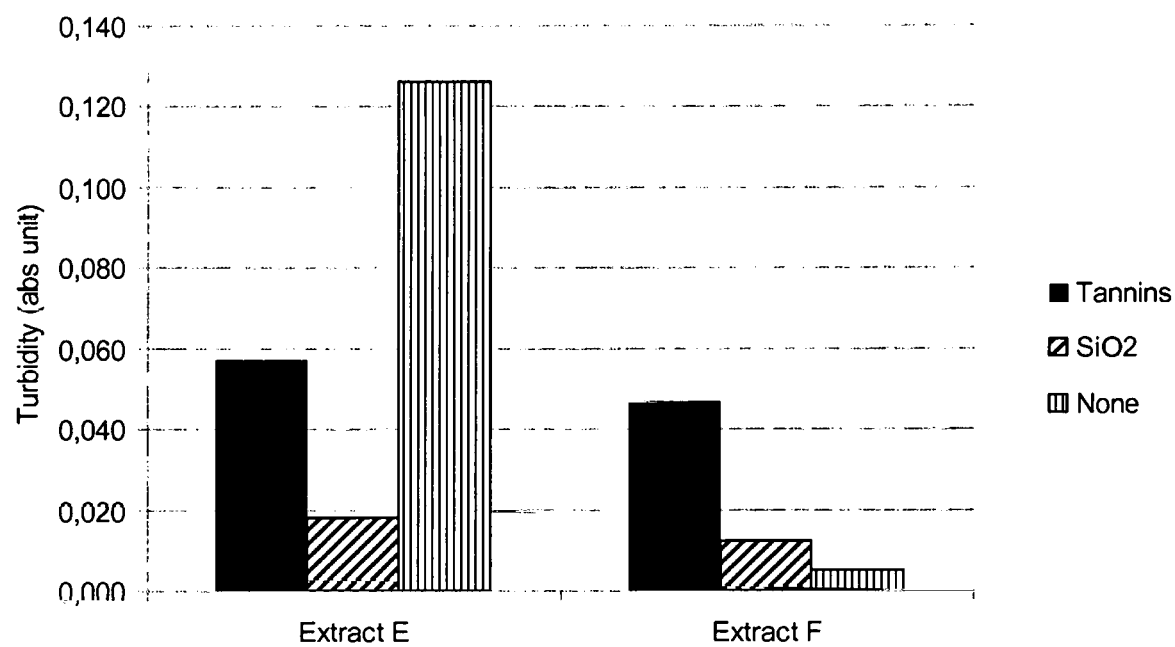
FIG. 10 represents a graph plotting the turbidity of different solutions after incubation for 96 h at 4° C.

Table 13 and FIG. 10 show the effect of the different adjuvants tested in 1 and 2 after 96 h of incubation at 4° C., compared to solutions which contained only the proteins and no adjuvants (none).

None: pea proteins at 5 g/hl in 12°-alcoholic solutions, pH 3.2, 4° C. prepared as follows: In a 2 L beaker, 1750 g of water (=1750 ml) was added. A volumetric flask was filled with 250 ml of ethanol 96°. The ethanol was added to the water and thoroughly mixed. The pH of the resulting solution was adjusted to 3.2 with HCl 1M (weight was noted). The pea proteins wore added. The solution was then stored at 4° C.

TABLE 13

| | 5 g pea prot/hl | |
|---|---|---|
| Adjuvant | Solution containing extract E | Solution containing extract F |
| Tannins | 0.057 | 0.047 |
| $SiO_2$ | 0.025 | 0.012 |
| None | 0.126 | 0.005 |

4. Comparison with Other Pea Proteins (without Adjuvants)

Solution A2 comprised 12°-alcoholic solution and pea protein from extract E.

Solution B2 comprised 12°-alcoholic solution and pea protein from extract F.

Solution C1 to F1 comprised 12°-alcoholic solution and commercial pea proteins.

Figure 11:
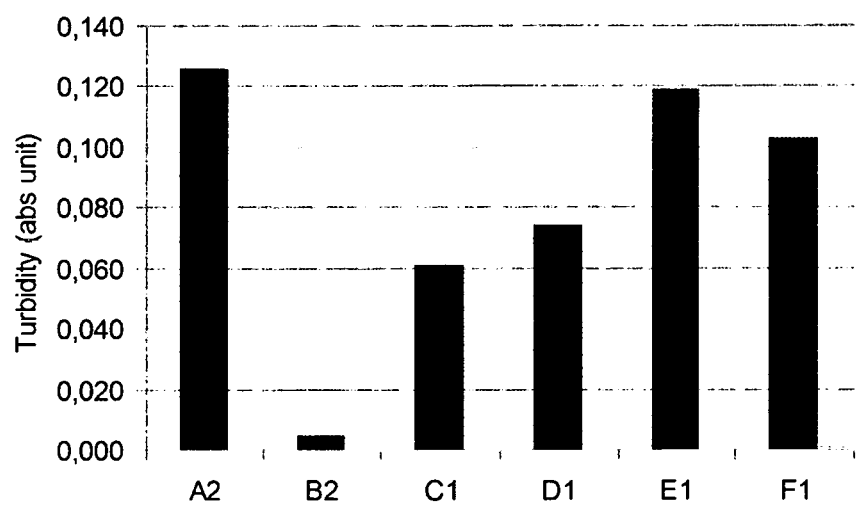
FIG. 11 represents a graph plotting the turbidity of different pea protein solutions after incubation for 96 h at 4° C.

The different extracts are represented in Table 14. The turbidity of the solutions was measured after different incubation time. The effect on turbidity is indicated in Table 15 and FIG. 11.

TABLE 14

| Code | Product | Batch |
|---|---|---|
| A2 | Extract E | |
| B2 | Extract F according to the invention | |
| C1 | Nutripea AD | 08/41.07.05 |
| D1 | Nutralys F85M | W272C |
| E1 | Nutralys F85F | W179E |
| F1 | Nutralys S85F | W037f |

TABLE 15

| | 5 g pea prot/hl | | | | | |
|---|---|---|---|---|---|---|
| (h) | A | B | C | D | E | F |
| 1 | 0.299 | 0.042 | 0.148 | 0.091 | 0.128 | 0.162 |
| 3 | 0.253 | 0.036 | 0.127 | 0.080 | 0.125 | 0.148 |
| 24 | 0.195 | 0.013 | 0.084 | 0.083 | 0.109 | 0.130 |
| 48 | 0.174 | 0.008 | 0.067 | 0.079 | 0.110 | 0.119 |
| 72 | 0.160 | 0.007 | 0.059 | 0.075 | 0.103 | 0.113 |
| 96 | 0.148 | 0.005 | 0.061 | 0.074 | 0.103 | 0.119 |

Example 5

Food Products Comprising Pea Proteins According to the Invention

Inclusion of pea proteins in various food products was evaluated.

1. Biscuits

Doughs for biscuit were prepared. Extract E (not according to the invention) and extract F (according to the invention) as prepared in Example 3 were used as pea proteins. Tests were performed to evaluate the pH of the biscuit dough prepared with Extract E, and/or to modify the pH of dough prepared with Extract F and different acidity correcting agents and raising agents.

1a) Dough was prepared as shown in Table 16

TABLE 16

| Ingredients | Trial1 | Trial2 |
|---|---|---|
| Vegetable fat (Palm) | 6.49 | 6.49 |
| Icing sugar (5% starch) | 10.38 | 10.38 |
| Glucose syrup 38 DE | 1.48 | 1.48 |
| Salt | 0.26 | 0.26 |
| Sorbitol syrup | 1.11 | 1.11 |
| Mix for 2 minutes on first gear (106 rpm) | | |
| Water | 30.63 | 30.63 |
| Ammonium bicarbonate | 0.20 | 0.20 |

TABLE 16-continued

| Ingredients | Trial1 | Trial2 |
|---|---|---|
| Sodium bicarbonate | 0.20 | 0.20 |
| Adding water in two steps and Mixing for 2 × 1 minute at 106 rpm | | |
| Wheat flour | 37.12 | 37.12 |
| Sodium pyrophosphate | 0.13 | 0.13 |
| Extract E | 12.00 | |
| Extract F | | 12.00 |
| Mixing for 1 minute at 106 rpm and for 15 seconds at 196 rpm | | |
| Weight(g) | 100.00 | 100.00 |

An analysis of the dough is given in Table 17.

TABLE 17

| | Trial 1 | Trial 2 |
|---|---|---|
| pH dough | 7.3 | 6.42 |
| Observations process | Dough texture paste was soft enough, laminating was sufficient | Dough texture was softer, laminating was more difficult |
| $A_w$ biscuits (%) (water activity after 1 day) | 15.5 | 17.6 |

1b) Dough was prepared as shown in Table 18.

A dough (Table 18) was prepared in which the quantity of water added in the dough prepared with extract F was reduced, an optimal water reduction was found to be 3%, and a dough with excellent texture and laminating capabilities was obtained. For dough prepared with extract E it was found that it was not possible to reduce the water content as the dough becomes too hard.

TABLE 18

| Ingredients | Trial3 | Trial4 |
|---|---|---|
| Vegetable fat (Palm) | 6.49 | 6.49 |
| Icing sugar (5% starch) | 10.38 | 10.38 |
| Glucose syrup 38 DE | 1.48 | 1.48 |
| Salt | 0.26 | 0.26 |
| Sorbitol syrup | 1.11 | 1.11 |
| Butter flavor | 0.05 | 0.05 |
| Mix 2 minutes 1st gear | | |
| Water | 30.63 | 27.63 |
| Ammonium bicarbonate | 0.20 | 0.20 |
| Sodium bicarbonate | 0.20 | 0.20 |
| Adding water in two step and Mixing 2 × 1 minute at 106 rpm | | |
| Wheat flour | 37.07 | 40.07 |
| Sodium pyrophosphate | 0.13 | 0.13 |
| Extract E | 12.00 | |
| Extract F | | 12.00 |
| Mixing 1 minute 1st gear (106 rpm) and 15 seconds 2nd gear (196 rpm) | | |
| Weight(g) | 100.00 | 100.00 |

An analysis of the dough is given in Table 19

TABLE 19

| dough analysis | Trial 3 | Trial 4 |
|---|---|---|
| dough pH | 7.3 | 6.3 |
| dough hardness | 160 | 171 |

Biscuits were prepared using the dough of trial 3 and 4. They are baked in a Eloma Backmaster oven at 150° C. for 20 minutes and cooled down at room temperature before being packed. An analysis of biscuits prepared with the respective doughs trial 3 (biscuit A) and trial 4 (biscuit B) is shown in Table 20.

TABLE 20

| Biscuits analysis | | Biscuit A | Biscuit B |
|---|---|---|---|
| Spreadability in the oven | Length (mm) | 57.5 | 57.4 |
| | Width (mm) | 54.2 | 53.0 |
| Water activity | After 1 day | 26.2 | 18.0 |
| | After 30 days | 32.6 | 25.7 |
| | After 60 days | 31.3 | 34.8 |
| | After 90 days | 39.7 | 37.0 |
| Dry matter (%) | After 1 day | 95.7 | 96.9 |
| | After 30 days | 94.9 | 96.0 |
| | After 60 days | 95.8 | 95.5 |
| | After 90 days | 95.3 | 95.0 |
| Hardness (g) | After 1 day | 4114 | 3281 |
| | After 30 days | 4950 | 3017 |
| | After 60 days | 3756 | 2837 |
| | After 90 days | 4000 | 3056 |

TABLE 20-continued

| Biscuits analysis | | Biscuit A | Biscuit B |
|---|---|---|---|
| Crispness | After 1 day | 12.1 | 18.5 |
| | After 30 days | 13.8 | 16.2 |
| | After 60 days | 12.6 | 12.4 |
| | After 90 days | 13.6 | 10.6 |
| Sensory analysis | After 7 days | Hard texture, slightly vegetable | Less hard, crispy, nice sweetness, slightly vegetable |

2. Bread Enriched with Protein

Breads were prepared using either a pea protein extract G as prepared in Example 3, or pea protein extract F. Bread recipes are provided in Table 21. Besides identical doughs prepared with the pea proteins according to the invention (Extract F) and the pea proteins not according to the invention (G), several adaptations were made (lowering of water content by 5% for F with or without pH adjustment of the dough; as well as lowering of the water content for G).

TABLE 21

| | Extract G | Extract F | F - 5% water | Extract F - 5% water + pH adjustment | | | Extract G - 2% water |
|---|---|---|---|---|---|---|---|
| Ingredients | Trial 1 | Trial 2 | Trial 3 | Trial 4 | Trial 5 | Trial 6 | Trial 7 |
| Water | 53.46 | 53.46 | 48.46 | 48.46 | 48.46 | 48.46 | 51.46 |
| Dehydrated yeast | 0.76 | 0.76 | 0.76 | 0.76 | 0.76 | 0.76 | 0.76 |
| Yeast was dissolved in water in a spiral kneader | | | | | | | |
| Wheat flour | 18.33 | 18.33 | 23.33 | 23.03 | 23.03 | 23.03 | 20.33 |
| Wheat's gluten | 15.28 | 15.28 | 15.28 | 15.28 | 15.28 | 15.28 | 15.28 |
| Emulsifier for bread | 0.08 | 0.08 | 0.08 | 0.08 | 0.08 | 0.08 | 0.08 |
| Bakery enzyme | 0.01 | 0.01 | 0.01 | 0.01 | 0.01 | 0.01 | 0.01 |
| Calcium propionate | 0.08 | 0.08 | 0.08 | 0.08 | 0.08 | 0.08 | 0.08 |
| Extract G | 11.00 | | | | | | 11.00 |
| Extract F | | 11.00 | 11.00 | 11.00 | 11.00 | 11.00 | |
| Trisodium citrate | | | | 0.30 | | | |
| Tripotassium citrate | | | | | 0.30 | | |
| Trisodium phosphate | | | | | | 0.30 | |
| Kneading for 7 minutes at 1st gear | | | | | | | |
| Salt | 1.00 | 1.00 | 1.00 | 1.00 | 1.00 | 1.00 | 1.00 |
| Kneading for 7 minutes 2nd gear | | | | | | | |
| Weight (g) | 100.00 | 100.00 | 100.00 | 100.00 | 100.00 | 100.00 | 100.00 |

Mixer used was a Spiral kneader (type Vema QR24). After kneading, the dough was taken out of the kneader and left resting for 10 minutes. The dough was divided into 500 g dough rolls, which were made first round and then elongated by hands. The bread was placed in pre-oiled metallic tins and stored for 1 hour and 15 minutes in a leavening controlled cabinet (t° 32° C.).

Oven: the bread were baked at 200° C. for 60 minutes in a deck oven (Salva Modular). 20 minutes before the end of the baking, the steam extraction was opened. The bread were then cooled down to room temperature and packed in appropriate packaging.

Dough was prepared according to the above recipes of table 21 and evaluated as Indicated in Table 22.

TABLE 22

| | Extract G | Extract F | Extract F - 5% water | Extract F - 5% water + pH adjustment | | | Extract G - 2% water |
|---|---|---|---|---|---|---|---|
| Analyses | Trial 1 | Trial 2 | Trial 3 | Trial 4 | Trial 5 | Trial 6 | Trial 7 |
| pH of the dough | 5.99 | 5.43 | 5.41 | 5.49 | 5.52 | 5.95 | 5.96 |
| Feasibility of making bread | OK | difficult | OK | OK | OK | OK | OK |

It was observed that the dough prepared with pea proteins extract F, when the water content was reduced, the dough was less sticky, had a good elasticity, and was easier to work with. For dough prepared with extract G, it was not possible to reduce the water content with more than 2%, the dough becoming too hard otherwise.

Figure 12:
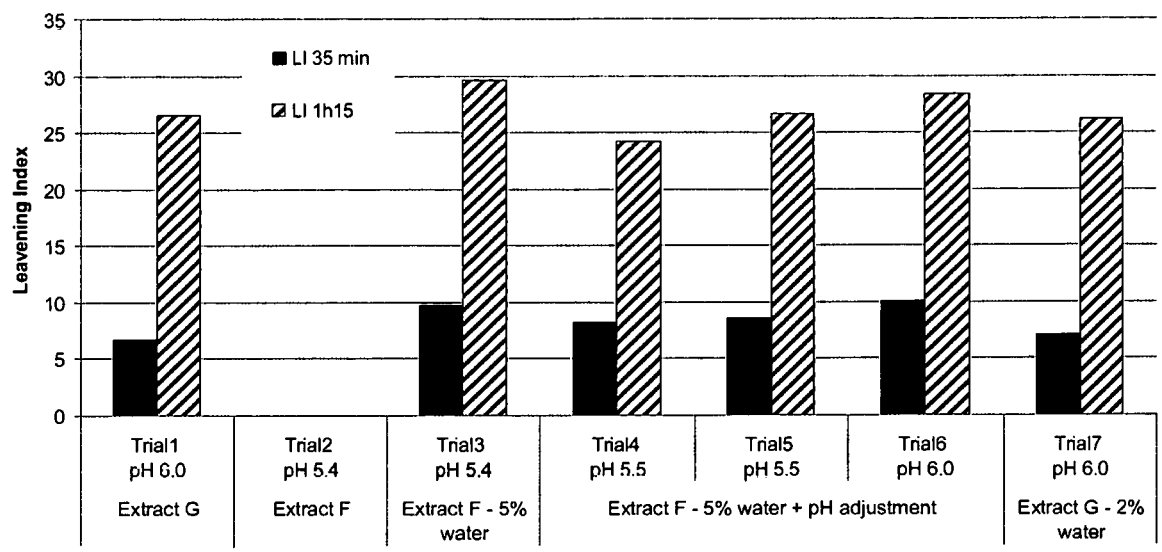
FIG. 12 represents a graph plotting the leavening index of different dough prepared with pea protein extracts.

The leavening index of the dough was measured. Table 23 and FIG. 12 show the leavening index for the respective doughs.

TABLE 23

| Analyses | Extract G Trial 1 | Extract F Trial 2 | Extract F - 5% water Trial 3 | Extract F - 5% water + pH adjustment Trial 4 | Trial 5 | Trial 6 | Extract G - 2% water Trial 7 |
|---|---|---|---|---|---|---|---|
| Leavening index (35 min) | 6.75 | — | 9.70 | 8.31 | 8.66 | 10.04 | 7.10 |
| Leavening index (1 h 15) | 26.50 | — | 29.61 | 24.25 | 26.67 | 28.40 | 26.15 |

Figure 13:
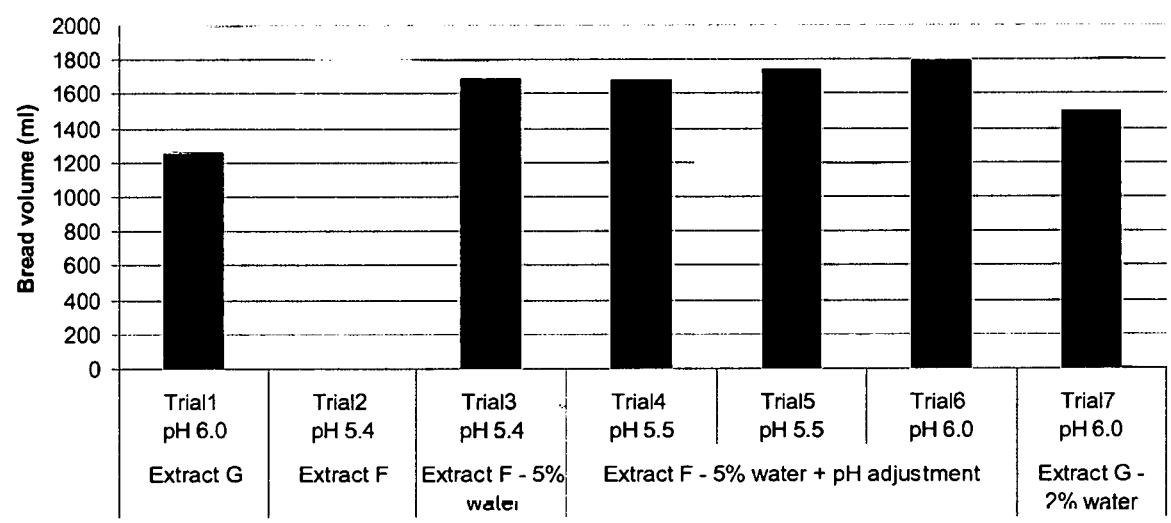
FIG. 13 represents a graph plotting the bread volume of the bread prepared in example 5.
Figure 14:
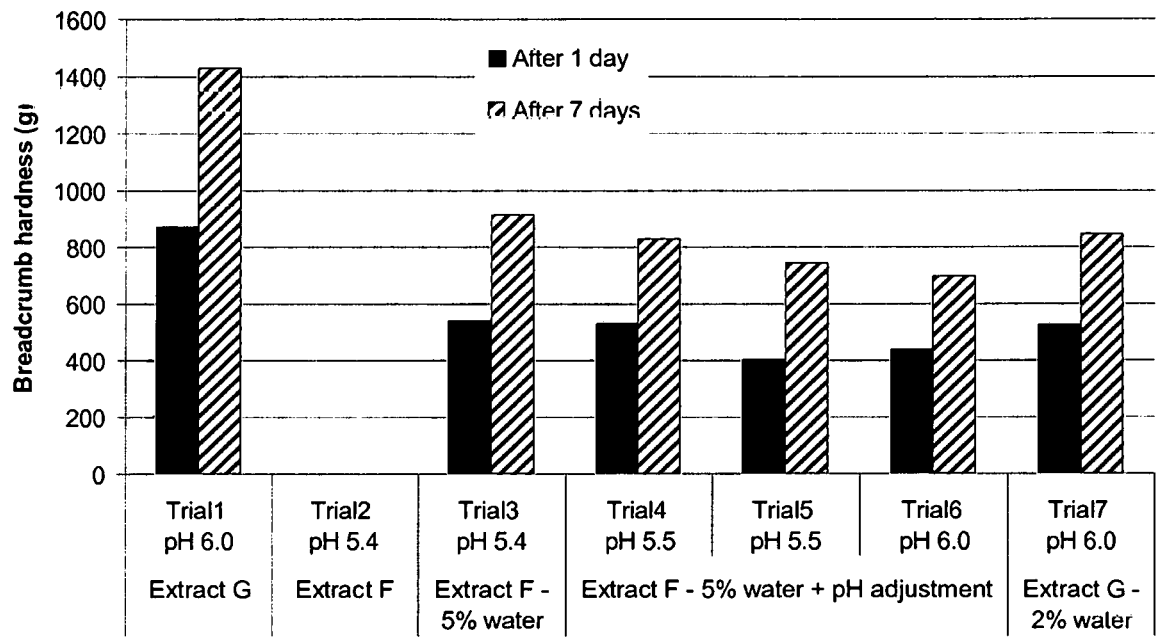
FIG. 14 represents a graph plotting the breadcrumb hardness of the bread prepared in example 5.

The quality of the bread prepared was evaluated. The results are shown in Table 24. Bread volume and breadcrumb hardness measured are shown in FIGS. 13 and 14, respectively.

TABLE 24

| Analyses | Extract G Trial 1 | Extract F Trial 2 | Extract F - 5% water Trial 3 | Extract F - 5% water + pH adjustment Trial 4 | Trial 5 | Trial 6 | Extract G - 2% water Trial 7 |
|---|---|---|---|---|---|---|---|
| Bread volume (ml) | 1259 | | 1692 | 1684 | 1744 | 1793 | 1502 |
| water activity (%) Day 1 | 97.4 | | 97.5 | 96.8 | 97.0 | 96.6 | 96.0 |
| water activity (%) Day 7 | 97.7 | | 96.7 | 95.6 | 95.7 | 93.3 | 95.8 |
| Delta Aw (D7 – D1) | 0.3 | nd | −0.8 | −1.2 | −1.3 | −3.3 | −0.2 |
| Dry matter (%) Day 1 | 51.8 | | 56.9 | 57.2 | 58.0 | 57.4 | 51.9 |
| Dry matter (%) Day 7 | 54.5 | | 61.8 | 61.9 | 62.1 | 66.2 | 58.7 |
| Delta Dry matter (D7 – D1) | 2.7 | nd | 4.9 | 4.7 | 4.1 | 8.8 | 6.8 |
| Breadcrumb hardness (g) Day 1 | 873 | | 545 | 532 | 406 | 439 | 525 |
| Breadcrumb hardness (g) Day 7 | 1430 | | 913 | 830 | 741 | 696 | 847 |

3. Fudge Bars

Fudge bars were prepared using Extract E and F as prepared in Example 3. Fudge bar recipes are shown in Table 25.

TABLE 25

| Ingredients | A | B | B + adjustment of pH with sodium phosphate |
|---|---|---|---|
| Inverted sugar syrup | 17.22 | 17.22 | 16.42 |
| Extract E | 15.00 | — | — |
| Extract F | — | 15.00 | 15.00 |
| Milk proteins-Nutrilac DR-7015V | 12.00 | 12.00 | 12.00 |
| Oligofructose syrup-Fibrulose L85 | 11.10 | 11.10 | 11.10 |
| Glucose syrup 38 DE | 10.00 | 10.00 | 10.00 |
| Calcium caseinate-Protilight | 5.00 | 5.00 | 5.00 |
| Sorbitol syrup | 3.00 | 3.00 | 3.00 |
| Dried cranberries | 3.00 | 3.00 | 3.00 |
| Sunflower oil | 2.20 | 2.20 | 2.20 |
| Glycerin | 2.00 | 2.00 | 2.00 |
| Hydrogenated vegetable fat | 2.00 | 2.00 | 2.00 |
| Calcium citrate | 1.6611 | 1.6611 | 1.6611 |
| Maltodextrines 18 DE | 1.072 | 1.072 | 1.072 |
| Sodium phosphate | — | — | 0.80 |
| Magnesium citrate | 0.4672 | 0.4672 | 0.4672 |
| Salt | 0.15 | 0.15 | 0.15 |
| Soy lecithin | 0.10 | 0.10 | 0.10 |
| Raspberry aroma-Raspberry 54428 A7 | 0.03 | 0.03 | 0.03 |
| Dark chocolate (coating) | 14.00 | 14.00 | 14.00 |
| Total (g) | 100 | 100 | 100 |

Process for preparing the bars was as follows
Melting the fat at 45° C. in a water bath
Mixing the syrups and adding the fat
Mixing the powders in a Hobart
Adding the syrups and stirring for a few minutes until a homogeneous paste was obtained
the dough was placed in a plastic bag and spread, letting rest overnight
Cutting the bars and coating them with chocolate It has been observed that mixture (B) containing Extract F according to the invention takes less time to homogenize than mixture (A), about 2 minutes less.

Figure 15:
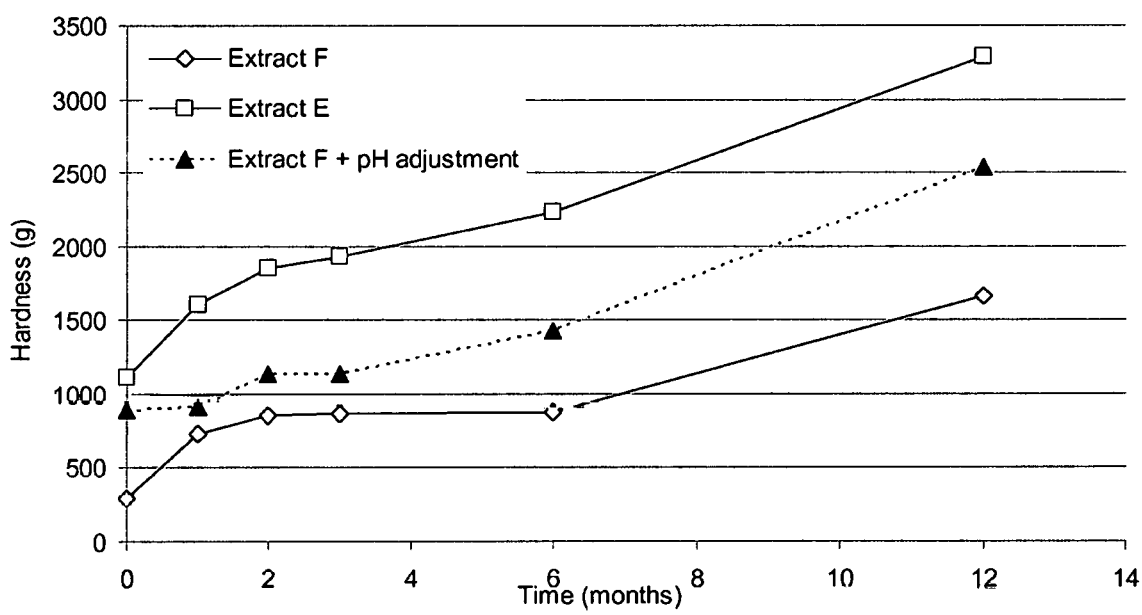
FIG. 15 represents a graph plotting the bars hardness as a function of shelf life of the bars prepared in example 5.

The pH, Aw (water activity), and hardness of the respective fudge bars over time (months) were measured and the results are illustrated respectively in Tables 26, 27, and 28. Fudge bar hardness was also measured and the results are shown in FIG. 15.

TABLE 26

| pH | A | B | B + adjustment of pH |
|---|---|---|---|
| T0 | 6.19 | 5.83 | 6.26 |
| Month 1 (M1) | 6.11 | nd | nd |
| Month 2 (M2) | nd | 5.79 | nd |
| Month 3 (M3) | 6.34 | 5.89 | 6.13 |
| Month 6 (M6) | 6.27 | 5.52 | 6.05 |
| Month 12 (M12) | nd | nd | nd |

TABLE 27

| Aw | A | B | B + adjustment of pH |
|---|---|---|---|
| T0 | 0.654 | 0.686 | 0.635 |
| M1 | 0.656 | 0.678 | 0.673 |
| M2 | 0.655 | 0.673 | 0.635 |
| M3 | 0.660 | 0.677 | 0.653 |
| M6 | 0.647 | 0.659 | 0.634 |
| M12 | nd | 0.666 | nd |

TABLE 28

| Hardness | A | B | B + adjustment of pH |
|---|---|---|---|
| T0 | 1106 | 290 | 883 |
| M1 | 1610 | 724 | 908 |
| M2 | 1853 | 849 | 1132 |
| M3 | 1929 | 865 | 1133 |
| M6 | 2228 | 873 | 1427 |
| M12 | 3284 | 1664 | 2532 |

The sensory analysis of the respective fudge bars is illustrated in Table 29.

TABLE 29

| time | A | B | B + adjustment of pH |
|---|---|---|---|
| T0 | Good taste of red fruits; hard | Good taste of red fruits, soft, sandy | Good taste of red fruits, soft, sandy |
| M1 | hard+ | hard; sandy | hard; sandy |
| M2 | hard++ | hard; sandy | hard; sandy |
| M3 | hard++ | hard; sandy | softer than A, slightly sandy |
| M6 | very hard and dry | nd | softer than A, chewy, slightly sandy |
| M12 | hard+++ | hard; sandy | |

Example 6

Characterization of an Extract According to an Embodiment of the Invention (without Fermentation Step)

Step 1—Preparation of the Pea Protein Concentrates:

Peas harvested dry, herein referred as "dry peas" (having a dry matter content (based on weight) of about 87%) were sieved and destoned by passage through a destoner. Subsequently, the peas were dehulled in a dehuller.

The peas were grinded dry to obtain a pea flour. Drinkable water was added to the pea flour such that the final composition had a dry matter content of about 25% (on weight basis). Subsequently, the pH was adjusted to about 8 by addition of sodium hydroxide.

After pH adjustment, the pea paste was subjected to centrifugal decantation. The supernatant containing proteins and soluble impurities (also referred herein as aqueous composition comprising pea proteins) had a dry matter content of about 4% (on weight basis).

The aqueous composition comprising pea proteins was subsequently subjected to heat treatment at 75° C. for 15 sec in a plate heat exchanger.

Subsequently, the pea proteins were concentrated by isoelectric precipitation. Hereto, the pH of the aqueous composition comprising pea proteins was adjusted to 4.8 with sulfuric acid. Separation of the precipitated/aggregated proteins was performed by centrifugal decantation. The resulting pea proteins concentrate was obtained as an aqueous slurry having a dry matter content of about 25% (based on weight).

Step 2—Preparation of Pea Protein Extracts from the Concentrates of Step 1:

Extract (H) was obtained by adjusting the dry matter content of the aqueous slurry obtained in step 1 to about 18% (on weight basis) after water addition; followed by adjustment of the pH of the slurry with sodium hydroxide until a pH of about 5.4 was reached; and subsequent heat treatment at a temperature of about 85° C. for about 7 minutes; and then spray drying the slurry so as to obtain a powder having a dry matter content of about 95% (weight basis).

Extract (I) was obtained by adjusting the dry matter content of the aqueous slurry obtained in step 1 of about 17% (on weight basis) after water addition; followed by adjustment of the pH of the slurry with sodium hydroxide until a pH of about 5.4 was reached; and subsequent heat treatment realized by direct steam injection at a temperature of about 140° C. for about 4 seconds; and then spray drying the slurry at 90° C. so as to obtain a powder having a dry matter content of about 96% (weight basis).

The gel strength, tapped and bulked density, flowability and wettability of the protein extracts (H) and (I) were measured. The results are shown in Table 30.

TABLE 30

| Extract Units | pH — | Gel strength (pH6) (g) | Tapped density (g/mL) | Bulk density (g/mL) | Flowability (Brabender unit) | Wettability (sec) |
|---|---|---|---|---|---|---|
| H | 5.6 | <50 | 0.6 | 0.5 | 643 | 6 |
| I | 5.6 | <50 | 0.6 | 0.5 | 732 | 4 |

Figure 16:
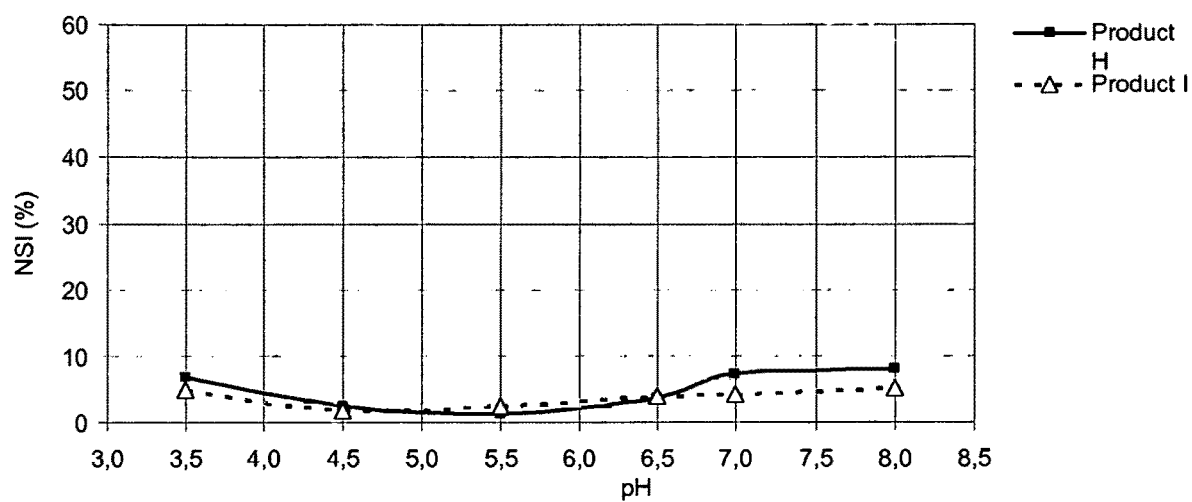
FIG. 16 represents a graph plotting the nitrogen solubility index profile as a function of the pH for each extract H and I.
Figure 17:
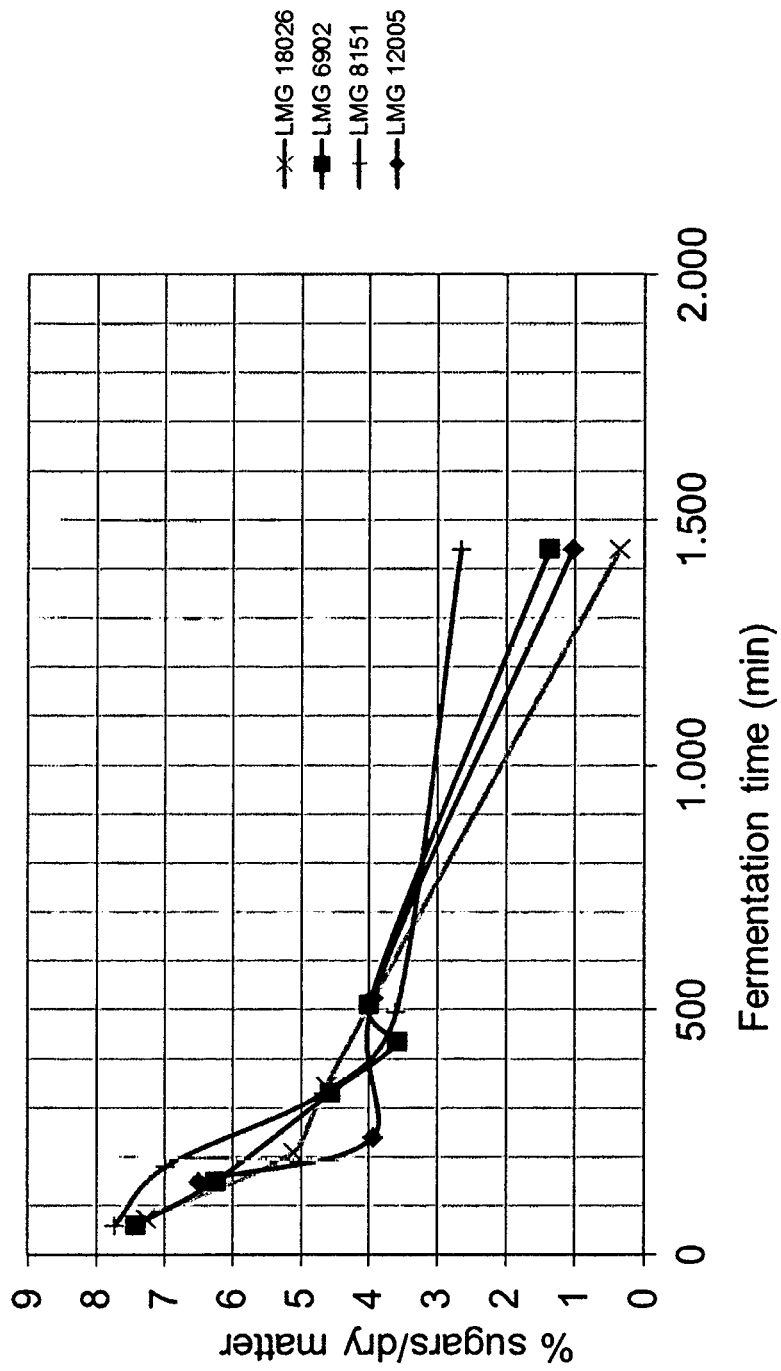
FIG. 17 represents a graph plotting the concentration of sugar/dry matter in % as a function of the fermentation time for fermented peas with *Lactobacillus fermentum* LMG 6902, *Lactobacillus fermentum* LMG 18026, *Lactobacillus* Crispatus LMG 12005 or *Lactobacillus Acidophilus* LMG 8151.
Figure 18:
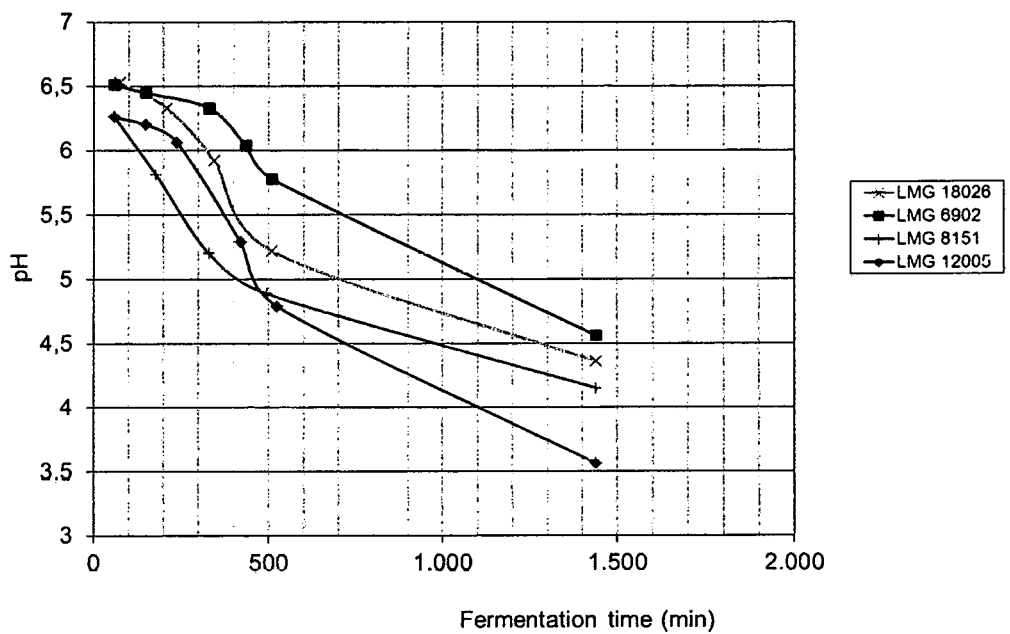
FIG. 18 represents a graph plotting the pH of the dehulled peas (7A) fermented with *Lactobacillus fermentum* LMG 6902, *Lactobacillus fermentum* LMG 18026, *Lactobacillus* Crispatus LMG 12005 or *Lactobacillus Acidophilus* LMG 8151 and the pH of the aqueous solution (juice) (7B) as a function of the fermentation time.
Figure 18:
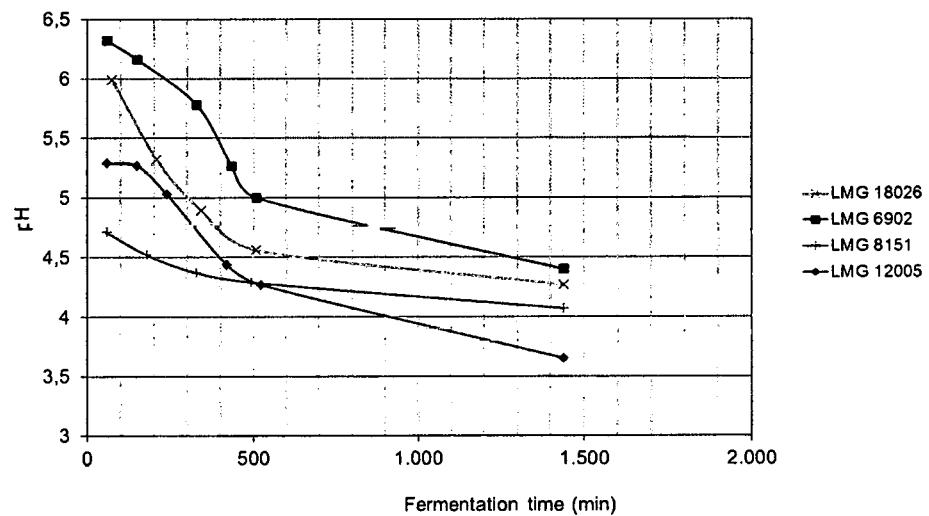
Figure 19:
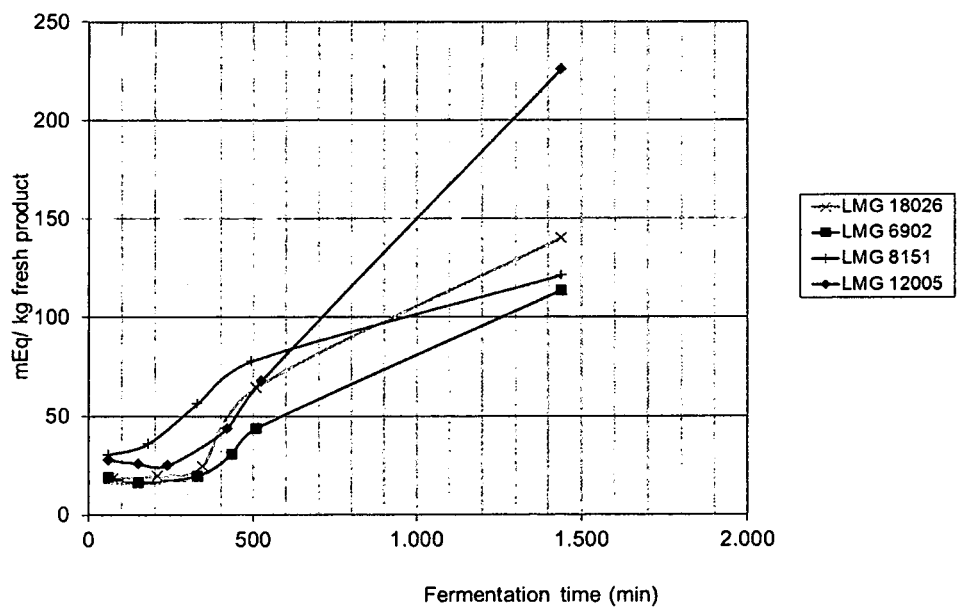
FIG. 19 represents a graph plotting the acidity of the dehulled peas (8A) fermented with *Lactobacillus fermentum* LMG 6902, *Lactobacillus fermentum* LMG 18026, *Lactobacillus* Crispatus LMG 12005 or *Lactobacillus Acidophilus* LMG 8151 and the acidity of the aqueous solution (juice) (8B) as a function of the fermentation time.
Figure 19:
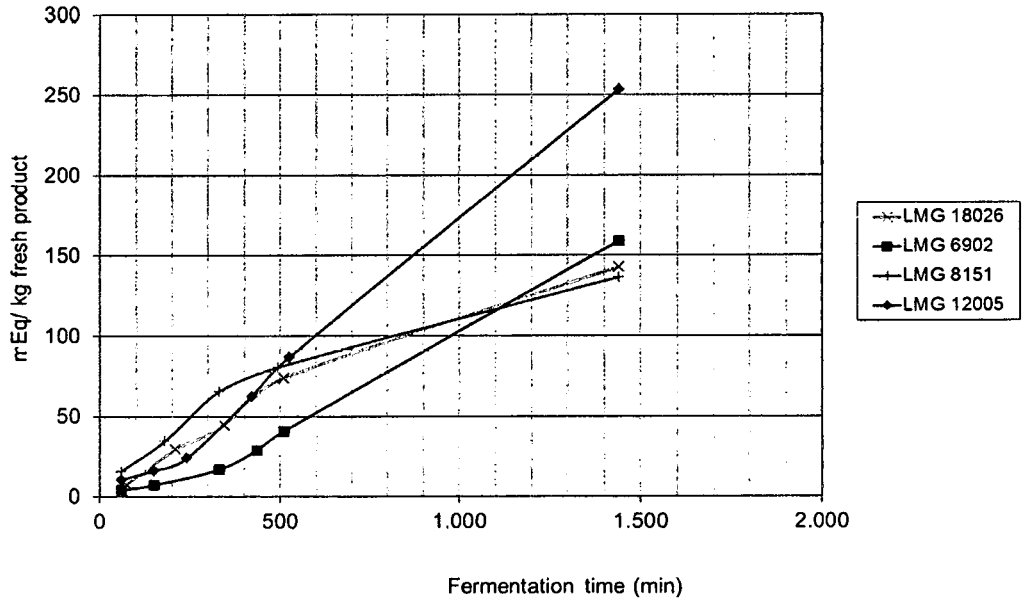
Figure 20:
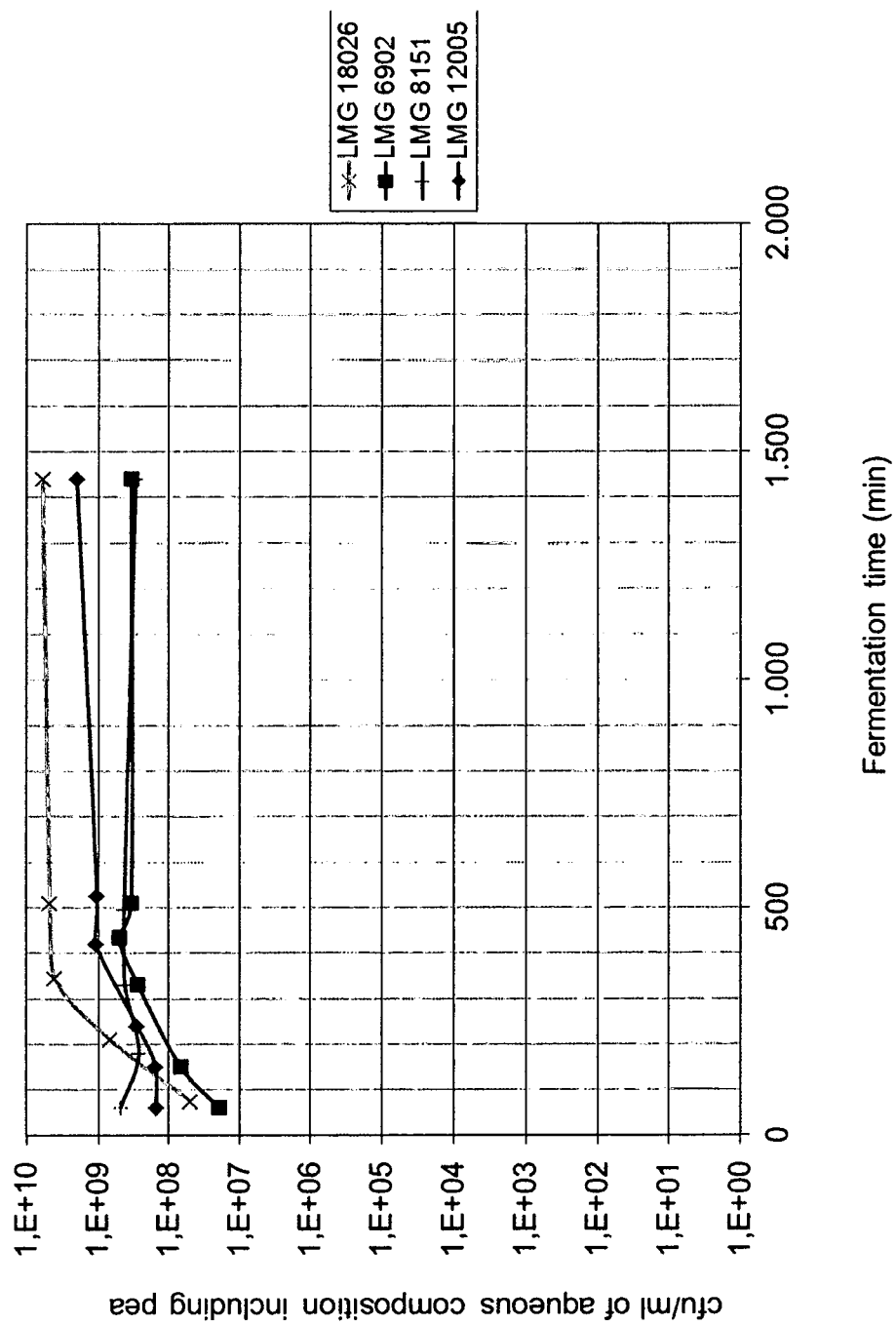
FIG. 20 represents a graph plotting the lactic acid bacteria (*Lactobacillus fermentum* LMG 6902, *Lactobacillus fermentum* LMG 18026, *Lactobacillus* Crispatus LMG 12005 or *Lactobacillus Acidophilus* LMG 8151) concentration of the aqueous solution (juice) as a function of the fermentation time.

The nitrogen solubility index (NSI) of both extracts as a function of pH is given in Table 31 and shown in FIG. 16.

TABLE 31

| | Nitrogen solubility index (%) | | | | | |
|---|---|---|---|---|---|---|
| Product | pH 3.5 | pH 4.5 | pH 5.5 | pH 6.5 | pH 7 | pH 8 |
| H | 6.8 | 2.5 | 1.2 | 3.6 | 7.2 | 8.0 |
| I | 4.9 | 1.7 | 2.3 | 3.8 | 4.0 | 5.1 |

The viscosity measured for both extracts at different pH is given in Table 32.

TABLE 32

| | Viscosity (cP) | | | | |
|---|---|---|---|---|---|
| Product | pH 7.5 | pH 6.4 | pH 6.2 | pH 6 | pH 5.8 | pH 4 |
| H | 28 | 20 | 16 | 16 | 16 | 14 |
| I | 355 | 192 | 153 | 158 | 93 | 73 |

Example 7

Comparative Studies of Peas Fermented with Different *Lactobacillus* strains (*Lactobacillus fermentum* LMG 6902, *Lactobacillus fermentum* LMG 18026, *Lactobacillus Crispatus* LMG 12005 or *Lactobacillus Acidophilus* LMG 8151)

Peas harvested dry, herein referred as "dry peas" (having a dry matter content (based on total weight of dry peas) of about 87% were sieved and destoned by passage through a destoner. Subsequently, the peas were dehulled in a dehuller.

The peas were next subjected to fermentation with lactic acid bacteria (*Lactobacillus* fermentum LMG 6902, *Lactobacillus fermentum* LMG 18026, *Lactobacillus Crispatus* LMG 12005 or *Lactobacillus Acidophilus* LMG 8151). Hereto 2000 g peas were soaked in 3663 g sterilized domineralized water at a temperature of 40° C., in a vessel. The fermentation medium comprising the recited bacterial strains was added in the same time. The vessel was in a thermostated bath and a pump, in order to recirculating the aqueous phase at about 250 ml/min, was added.

For *Lactobacillus fermentum* LMG 6902 and *Lactobacillus fermentum* LMG 18026 (both were obtained from BCCM/LMG Laboratorium voor Microbiologie, Universiteit Gent (UGent) Belgium), the fermentation medium was prepared as it is described in the procedure provided by the BCCM (F109C Revival of freeze-dried cultures; recommended modium 66). 37 ml of the fermentation medium was then added to the vessel.

For *Lactobacillus crispatus* LMG 12005 (50 Bn) and *Lactobacillus Acidophilus* LMG 8151 (100 Bn) (both were obtained from THT s.a. Gembloux, Belgium), the fermentation medium was prepared by putting 37 g of *Lactobacillus* flakes directly in the vessel.

Peas were subjected to fermentation in the presence of about $10^8$ cfu of lactic acid bacteria per ml of aqueous composition comprising peas. Fermentation was effected in a closed vessel without degassing at a temperature of about 40° C.

FIGS. 17-20 respectively illustrate the evolution of sugar content, pH, acidity, and lactic acid bacterial concentration as a function of fermentation time.

The invention claimed is:

1. A method for extracting pea proteins, comprising in the indicated order the steps of:
    (a) providing an aqueous composition comprising pea proteins, obtained by fractionation of milled peas;
    (b) isolating said pea proteins from said aqueous composition comprising pea proteins by isoelectric precipitation and separation of said pea proteins;
    (c) obtaining said isolated pea proteins as an aqueous slurry by maintaining or adjusting the pH ranging from 4.0 to 5.8, comprising a dry matter content of 10 to 40 wt % and comprising at least 60 wt. % of protein based on the total dry matter of the aqueous slurry; and
    (d) subjecting said aqueous slurry having a pH ranging from 4.0 to 5.8 to a temperature ranging from 115° C. to 210° C. for a time ranging from 15 s to 0.01 s; at a temperature ranging from 95° C. to 115° C. for a time ranging from 5 min to 15 s; at a temperature ranging from 75° C. to 95° C. for a time ranging from 15 min to 5 min; at a temperature ranging from 75° C. to 110° C. for a time ranging from 10 min to 2 min; at a temperature ranging from 80° C. to 100° C. for a time ranging from 8 min to 5 min; or at a temperature ranging from 130° C. to 150° C. for a time ranging from 8 s to 1 s;
    wherein said pea proteins have a nitrogen solubility index at pH 7.0 of at most 15%, as measured on an aqueous composition comprising 3 wt. % of said pea protein composition based on the total weight of the aqueous composition.

2. The method according to claim 1, wherein isolating pea proteins from said aqueous composition of step (b), comprises concentrating said pea proteins.

3. The method according to claim 1, wherein step (b) comprises adjusting the pH of said aqueous composition comprising pea proteins to a value ranging from 4.0 to 5.8, or from 4.5 to 5.5.

4. The method according to claim 1, wherein step (c) comprises adjusting or maintaining the pH of the aqueous slurry to a value ranging from 4.5 to 5.5.

5. The method according to claim 1, wherein said aqueous composition comprising pea proteins in step (a) has a pH of at least 6, or ranging from 6.0 to 9.0, or ranging from 6.5 to 8.5.

6. The method according to claim 1, wherein prior to step (a) an aqueous composition comprising peas is subjected to fermentation.

7. The method according to claim 6, wherein said fermentation is performed in the presence of one or more *Lactobacillus* sp.

8. The method according to claim 1, wherein prior to or during step (b) said aqueous composition comprising pea proteins, or said pea proteins are subjected to a heat treatment.

9. Pea proteins produced by the method according to claim 1.

10. Pea protein composition, comprising at least 60 wt. % of protein based on the total dry matter of the composition, wherein said pea protein composition has a nitrogen solubility index at pH 7.0 of at most 15%, as measured on a aqueous composition comprising 3 wt. % of said pea protein composition based on the total weight of the aqueous composition.

11. Pea protein composition according to claim 10, wherein said composition has a pH ranging from 4.0 to 5.8, as measured at room temperature on 10 g of pea protein composition suspended in 90 g of water.

12. The method according to claim 8, wherein the heat treatment is pasteurization.

13. The method according to claim 6, wherein said fermentation is in the presence of lactic acid bacteria.

* * * * *